(12) United States Patent  (10) Patent No.: US 8,411,547 B2
Yamasaki et al.  (45) Date of Patent: Apr. 2, 2013

(54) INFORMATION RECORDING MEDIUM, INFORMATION SUPPLY SYSTEM, AND OPTICAL INFORMATION DEVICE

(75) Inventors: Fumitomo Yamasaki, Nara (JP); Kanji Wakabayashi, Kyoto (JP); Yoshiaki Komma, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/242,056

(22) Filed: Sep. 23, 2011

(65) Prior Publication Data

US 2012/0075983 A1 Mar. 29, 2012

Related U.S. Application Data

(62) Division of application No. 13/217,787, filed on Aug. 25, 2011, which is a division of application No. 11/940,799, filed on Nov. 15, 2007, now Pat. No. 8,031,574.

(30) Foreign Application Priority Data

Nov. 17, 2006 (JP) ................................. 2006-311256
Dec. 8, 2006 (JP) ................................. 2006-331535

(51) Int. Cl.
 *G11B 7/00* (2006.01)
(52) U.S. Cl. ..................... 369/94; 369/44.27; 369/272.1
(58) Field of Classification Search .................... None
 See application file for complete search history.

(56) References Cited

U.S. PATENT DOCUMENTS

| | | | |
|---|---|---|---|
| 6,061,322 A | 5/2000 | Jain et al. | |
| 6,083,598 A * | 7/2000 | Ohkubo et al. | 428/64.1 |
| 7,813,230 B2 * | 10/2010 | Uchida | 369/44.25 |
| 8,009,524 B2 | 8/2011 | Seo et al. | |
| 2004/0196769 A1 | 10/2004 | Nakano et al. | |
| 2006/0179448 A1 | 8/2006 | Smith et al. | |
| 2007/0007357 A1 | 1/2007 | Dubs | |
| 2007/0041288 A1 * | 2/2007 | Chen et al. | 369/44.26 |
| 2008/0025183 A1 | 1/2008 | Nakahara et al. | |

FOREIGN PATENT DOCUMENTS

| | | |
|---|---|---|
| JP | 11-250497 | 9/1999 |
| JP | 2005-093013 | 4/2005 |
| JP | 2006-196039 | 7/2006 |
| JP | 2006-236509 | 9/2006 |

OTHER PUBLICATIONS

U.S. Office Action issued Feb. 7, 2012 in U.S. Appl. No. 13/217,787.

(Continued)

*Primary Examiner* — Joseph Haley
(74) *Attorney, Agent, or Firm* — Wenderoth, Lind & Ponack, L.L.P.

(57) ABSTRACT

An information recording medium includes a first information recording layer and a second information recording layer. The first information recording layer is formed at a laser beam entrance surface, and is configured so that information can be recorded thereupon and/or reproduced therefrom using a first objective lens having a numerical aperture NA1 and laser beam of a wavelength λ1. The second information recording layer is formed so as to have a distance to the laser beam entrance surface of 0.05 mm to 1.2 mm and is configured so that information can be recorded thereupon and/or reproduced therefrom using a second objective lens having a numerical aperture NA2 and laser beam of a wavelength λ2. When a diffraction limit δ2, determined by numerical aperture NA2 and wavelength λ2, is taken as δ2=0.61×λ2/NA2, a track pitch Tp1 of a track formed on the first information recording layer is Tp1<δ2.

9 Claims, 30 Drawing Sheets

OTHER PUBLICATIONS

F. Zijp et al., "Near field read-out of a 50 GB first-surface disk with NA=1.9 and a proposal for a cover-layer incident, dual-layer near field system", Proceedings of the SPIE, SPIE-INT, vol. 5380, No. 1, Bellingham, WA 2004, pp. 209-233.

U.S. Office Action issued Jul. 10, 2012 in U.S. Appl. No. 13/217,787, which claims priority to the same foreign applications as the present application.

* cited by examiner

INFORMATION RECORDING MEDIUM, INFORMATION SUPPLY SYSTEM, AND OPTICAL INFORMATION DEVICE

This is a Rule 1.53(b) Divisional of application Ser. No. 13/217,787, filed Aug. 25, 2011 which is a Divisional of application Ser. No. 11/940,799, filed Nov. 15, 2007 now U.S. Pat. No. 8,031,574.

BACKGROUND OF THE INVENTION

1. Field of the Invention

The present invention relates to technology regarding the compatibility between CDs, DVDs, Blu-ray Discs, HD DVDs and next-generation high-density optical disks such as, near-field optical recording.

2. Description of the Related Art

With the practical application of blue-violet semiconductor lasers, Blu-ray Discs (abbr. "BD" hereinafter), which are high-density, large-capacity optical information recording media (called "optical disks" hereinafter) of the same size as CDs (Compact Discs) and DVDs (Digital Versatile Discs), have in recent years come into actual use. The BD is an optical disk that records or reproduces information using a blue-violet laser beam source. A HD DVD, which also uses a blue-violet laser beam source, has also recently come into use.

A CD is an optical disk having a transparent substrate 1.2 mm in thickness, with a single-layer storage capacity of approximately 650 MByte. The laser beam used for recording or reproduction of a CD has a wavelength of approximately 780 nm, and the NA (numerical aperture) of the objective lens is 0.45.

In order to record or reproduce information onto or from an optical disk of higher density, it is necessary to reduce the diameter of the beam spot condensed by the objective lens. Here, in order to reduce the diameter of the beam spot, it is necessary to shorten the wavelength λ and increase the numerical aperture NA of the objective lens. However, increasing the numerical aperture NA of the objective lens leads to an increase in coma aberration arising due to tilting of the transparent substrate. This coma aberration increases proportionally to a cube of the numerical aperture. The coma aberration is also proportional to the thickness of the transparent substrate. Therefore, the thickness of the transparent substrate may be reduced in order to suppress coma aberration.

A DVD is an optical disk having a transparent substrate 0.6 mm in thickness, with a single-layer storage capacity of approximately 4.7 Gbyte. The laser beam used for recording or reproduction of a DVD has a wavelength of approximately 650 nm, and the numerical aperture NA of the objective lens is 0.60. In a DVD, two 0.6 mm-thick substrates are layered together, and thus the total thickness of the optical disk is 1.2 mm, or the same as a CD.

A BD is an optical disk having a transparent substrate approximately 0.1 mm in thickness, with a single-layer storage capacity of approximately 25 Gbyte. The laser beam used for recording or reproduction of a BD has a wavelength of approximately 405 nm, and the numerical aperture NA of the objective lens is 0.85. As shown in FIG. 10, an optical disk 600 according to the BD format specifications is configured having a recording layer 651 provided on a 1.1 mm-thick disk substrate 602, with a 0.1 mm-thick transparent cover layer 601 affixed so as to cover the recording layer 651. The total thickness of an optical disk according to the BD format specifications is 1.2 mm, or the same as a CD. Recording to or reproducing from the recording layer 651 is performed using an objective lens 671 having a numerical aperture NA of 0.85, where laser beam 681 is condensed onto the recording layer 651 from the transparent cover layer 601 side.

With BDs, an increase in coma aberration caused by using short-wavelength laser beam and a high-NA objective lens is suppressed by reducing the thickness of the transparent cover layer 601, through which the laser beam 681 passes, to approximately 0.1 mm.

Meanwhile, an HD DVD is an optical disk having a single-layer storage capacity of approximately 15 Gbyte, for which the numerical aperture NA of the objective lens is 0.65. Similar to a DVD, in an HD DVD, two 0.6 mm-thick substrates are layered together, and thus the total thickness of the optical disk is 1.2 mm, or the same as a CD.

There are three types in each of these optical disk formats: a read-only type using prepits as the recording layer; a write-once, read-many type using a pigment film as the recording layer and capable of being written to only once; and finally, a rewriteable type, which uses a phase-change film as the recording layer.

As described thus far, optical disks, at present, include CDs, DVDs, BDs, and HD DVDs, each having a different configuration. Optical disk configurations that ensure compatibility between optical disk types, such as, for example, between BD and HD DVD, have been disclosed in JP2006-196039A, JP2006-236509A, Published U.S. Patent Application No. 2006/0179448, and so on.

FIG. 11 schematically shows a cross-section of an optical disk 19000 compliant with both the BD and HD DVD format specifications.

The optical disk 19000 is configured so as to include a 0.1 mm-thick transparent cover layer 19010, on which is formed a BD recording layer 19510 compliant with the BD format specifications; a 0.5 mm-thick intermediate layer 19020 on the cover layer 19010; and on the intermediate layer an HD DVD recording layer 19520 which is, compliant with the HD DVD format specifications. Here, when recording to or reproducing from the BD recording layer 19510, 405 nm-wavelength laser beam 19810 is condensed onto the BD recording layer 19510 from the transparent cover layer 19010 side using an objective lens 19710 that has a numerical aperture NA of 0.85. On the other hand, when recording to or reproducing from the HD DVD recording layer 19520, 405 nm-wavelength laser beam 19820 is condensed onto the HD DVD recording layer 19520 from the transparent cover layer 19010 side using an objective lens 19720 that has a numerical aperture NA of 0.65.

Incidentally, with the demand for high-capacity, high-density optical disks increasing, the development of optical disks that can meet these demands is being pursued. For example, it is known that using near-field light, in which the propagation distance is shorter than the wavelength of the light, makes it possible to reduce the diameter of the beam spot to a fraction of the wavelength, thus allowing recording or reproduction at higher densities. The technology represented by FIG. 12 can be given as an example of recording using near-field light. Here, an objective lens 871, known as a solid immersion lens (SIL) and having a numerical aperture NA of approximately 1.5 to 2.5, is used. Laser light 881 is irradiated into the objective lens 871, and near-field light that emerges from the bottom surface of the objective lens 871 is condensed onto a recording layer 851 formed on the surface of an optical disk 800; whereby recording or reproduction is performed in this manner. Meanwhile, FIG. 13 shows a Super-RENS (Super-Resolution Near-Field Structure) system, in which a layer called a super-resolution film 961 is formed close to a recording layer 951 of the optical disk. The Super-RENS system is a system that records information to or reproduces information from the nearby recording layer 951 using near-field light obtained by irradiating laser beam 981 onto the super-resolution film 961 through an objective lens 971.

Conventional technology has proposed optical disks that are compliant with both the BD and HD DVD format specifications. However, optical disks and the like that are compliant with both conventional format specifications such as CDs, DVDs, Blu-ray Discs, and HD DVDs and format specifications of next-generation high-density optical disks such as the abovementioned near-field optical recording system are not yet known. Furthermore, conventional optical disk drives are not capable of recording/reproducing to/from next-generation high-density optical disks. Therefore, even if next-generation high-density optical disks are developed, users who have optical disk drives capable only of recording/reproduction to/from conventional optical disks will not be able to use such high-density optical disks.

SUMMARY OF THE INVENTION

Having been conceived in light of the aforementioned problems, it is an object of the present invention to provide an information recording medium capable of compliance with both conventional optical disk format specifications and format specifications of a next-generation high-density optical disk, or an information recording medium capable of compliance with differing format specifications within next-generation high-density optical disk format specifications, as well as an information supply system utilizing such an information recording medium and an optical information device therefor.

The information recording medium of the present invention is an information recording medium onto which information is to be recorded and/or from which information is to be reproduced using laser beam, the information recording medium comprising: a first information recording layer formed at a laser beam entrance surface and configured so that information can be recorded thereupon and/or reproduced therefrom using a first objective lens having a first numerical aperture NA1 and laser beam of a first wavelength $\lambda 1$; and a second information recording layer formed so as to have a distance to the laser beam entrance surface is 0.05 mm to 1.2 mm and configured so that information can be recorded thereupon and/or reproduced therefrom using a second objective lens having a second numerical aperture NA2 and laser beam of a second wavelength $\lambda 2$, wherein when a diffraction limit $\delta 2$, determined by the numerical aperture NA2 and the second wavelength $\lambda 2$, is taken as $\delta 2 = 0.61 \times \lambda 2 / NA2$, a track pitch Tp1 of a track formed on the first information recording layer is Tp1<$\delta 2$.

Preferably, in the information recording medium of the present invention, the first information recording layer has a first transmissible-reflective layer; and the first transmissible-reflective layer is formed so that a reflectance R12 of the second wavelength $\lambda 2$ with respect to the first transmissible-reflective layer and a transmittance T12 of the second wavelength $\lambda 2$ with respect to the first transmissible-reflective layer satisfy the relationship $T12^2 \geq R12$.

Even more preferably, the first numerical aperture NA1 is greater than or equal to 0.9. Additionally, the first information recording layer may be formed so that the distance to the laser beam entrance surface is 0.001 mm to 0.01 mm. Preferably, the first information recording layer is an information recording layer having a configuration capable of recording and/or reproduction using near-field light. Additionally, the second information recording layer may be an information recording layer having a configuration capable of recording and/or reproduction using near-field light with high-resolution film. Also, the second information recording layer may comprise a plurality of information recording layers. The information recording medium of the present invention may further comprise a third information recording layer, wherein the third information recording layer is an information recording layer of different format specifications than the second information recording layer.

The information recording medium of the present invention may also comprise a label surface on the opposite side of the laser beam entrance surface.

Preferably, in the information recording medium of the present invention, a thickness from the laser beam entrance surface to an opposite surface of the information recording medium is 1.1 mm to 1.3 mm.

Furthermore, in the information recording medium of the present invention, it is preferable that the first information recording layer is a semi-transmissible reflective layer configured to allow some of laser beam to pass through while reflecting the rest; and the semi-transmissible reflective layer has a reflectance of at least 4% with respect to the first wavelength $\lambda 1$ and a transmittance of at least 20% with respect to the second wavelength $\lambda 2$. Also, the first wavelength $\lambda 1$ and the second wavelength $\lambda 2$ differ; and the semi-transmissible reflective layer has a reflectance of no more than 6% with respect to the second wavelength $\lambda 2$.

Additionally, it is preferable that the information recording medium of the present invention is read-only; and the information having the same content but of different quality is recorded onto the first information recording layer and the second information recording layer respectively.

Moreover, preferably, in the information recording medium of the present invention, the content and rate of compression of the information recorded onto the first information recording layer are the same as the content and rate of compression of the information recorded onto the second information recording layer.

Preferably, in the information recording medium of the present invention, the distance from the second information recording layer to the laser beam entrance surface is set in a range of 0.54 mm to 0.65 mm; an amount of data recorded onto the first information recording layer and the second information recording layer is no more than 15 Gbyte for each of the layers; and the second information recording layer is single-layer. Alternatively, wherein the distance from the second information recording layer to the laser beam entrance surface may be set in a range of 0.06 mm to 0.11 mm; an amount of data recorded onto the first information recording layer and the second information recording layer may be no more than 25 Gbyte for each of the layers; and the second information recording layer may be single-layer. Or, the distance from the second information recording layer to the laser beam entrance surface may be set in a range of 0.06 mm to 0.11 mm; an amount of data recorded onto the first information recording layer and the second information recording layer may be greater than 25 Gbyte but no more than 50 Gbyte for each of the layers; and the second information recording layer may be dual-layer.

Alternatively, in the information recording medium of the present invention, the content of the information recorded onto the first information recording layer is the same as the content of the information recorded onto the second information recording layer; and the rate of compression of the information recorded onto the second information recording layer is greater than the rate of compression of the information recorded onto the first information recording layer. Preferably, a recording capacity of the first information recording layer is greater than 50 Gbyte.

The information supply system of the present invention is operable to record and supply information having identical content to the first information recording layer and the second information recording layer of the aforementioned information recording medium.

The optical information device of the present invention is operable to record information to and/or reproduce information from an information recording medium, the information recording medium including a first information recording layer formed at a laser beam entrance surface and/or a second information recording layer with a distance of 0.05 mm to 1.2 mm to the laser beam entrance surface, and comprises: a laser unit operable to oscillate laser beam of a first wavelength $\lambda 1$ and laser beam of a second wavelength $\lambda 2$; a first objective lens having a first numerical aperture NA1 and operable to cause the laser beam of the first wavelength $\lambda 1$ to be irradiated onto the first information recording layer; a second objective lens having a second numerical aperture NA2 and operable to cause the laser beam of the second wavelength $\lambda 2$ to be irradiated onto the second information recording layer; and a recording/reproduction control unit operable to drive the first objective lens or the second objective lens and execute recording and/or reproduction of information to/from the first and second information recording layers of the information recording medium, wherein the first numerical aperture NA1 is greater than or equal to 0.9; the second numerical aperture NA2 is less than 0.9; the recording/reproduction control unit includes a determination portion operable to drive the first objective lens and determine whether or not the first information recording layer of the information recording medium is present; the recording/reproduction control unit drives the first objective lens and records information to and/or reproduces information from the first information recording layer in the case where the determination portion has determined that the first information recording layer is present; and the recording/reproduction control unit drives the second objective lens and records information to and/or reproduces information from the second information recording layer in the case where the determination portion has determined that the first information recording layer is not present.

Preferably, in the optical information device of the present invention, the recording/reproduction control unit determines whether or not the first information recording layer of the information recording medium is present based on a result of focus servo pull-in by the first objective lens.

Also, preferably, the optical information device of the present invention is operable to record information to and/or reproduce information from an information recording medium that includes a third information recording layer with a distance of 0.05 mm to 1.2 mm to the laser beam entrance surface, and further comprises: a third objective lens having a third numerical aperture NA3 and operable to cause laser beam of a third wavelength $\lambda 3$, oscillated by the laser unit, to be irradiated onto the third information recording layer, wherein the third numerical aperture NA3 is less than 0.85; the recording/reproduction control unit further drives the second objective lens and determines, using the determination portion, whether or not the second information recording layer of the information recording medium is present; and the recording/reproduction control unit drives the third objective lens and records information to and/or reproduces information from the third information recording layer in the case where the determination portion has determined that the second information recording layer is not present.

The optical disk of the present invention is configured to allow laser beam to enter from a specific entrance surface thereof and reproduce information, and comprises: a first-type information recording layer for which a distance to a laser beam entrance surface thereof is set in a range of 0.06 mm to 0.11 mm; and a second-type information recording layer for which a distance to a laser beam entrance surface thereof is set in a range of 0.54 mm to 0.65 mm, wherein both the content and rate of compression of the information recorded onto the first-type information recording layer are the same as the content and rate of compression of the information recorded onto the second information recording layer.

Another optical information device of the present invention comprises: an optical head device including a blue light source, a red light source, an objective lens operable to converge light emitted from the blue light source onto a first-type information recording layer of an optical disk, the optical disk having the first-type information recording layer for which a distance to a surface thereof is set in a range of 0.06 mm to 0.11 mm, and a light detector operable to receive light reflected after being converged onto a recording layer of the optical disk by the objective lens and perform photoelectric conversion converting the received light into an electric signal; a motor operable to rotate the optical disk; and an electric circuit operable to receive a signal obtained by the optical head device, and control and drive at least the motor, optical lens, and laser beam sources based on the signal, wherein light is caused to be emitted from the blue light source provided in the optical head device upon an instruction for optical disk reproduction being outputted from the electric circuit; the distance from the surface to an adjacent recording layer is measured; and in the case where it is determined that a reflective layer is present at a distance of approximately 0.1 mm from the surface, the optical disk is determined to be a first-type optical disk, a focus servo is applied to the recording layer thereof, and reproduction of the first-type optical disk is commenced; in the case where it is determined that a reflective layer is not present at a distance of approximately 0.1 mm from the surface, light is caused to be emitted from the red light source, and the distance from the surface to the adjacent recording layer is measured; and in the case where it is determined that a reflective layer is present at a distance of approximately 0.6 mm from the surface, the optical disk is determined to be a DVD, a focus servo is applied to the recording layer thereof, and reproduction of the DVD is commenced.

DESCRIPTION OF THE PREFERRED EMBODIMENTS

Preferred embodiments of the present invention shall be described with reference to FIGS. 1 through 9.

1. First Embodiment

1.1. Configuration of Optical Disk

Figure 1:
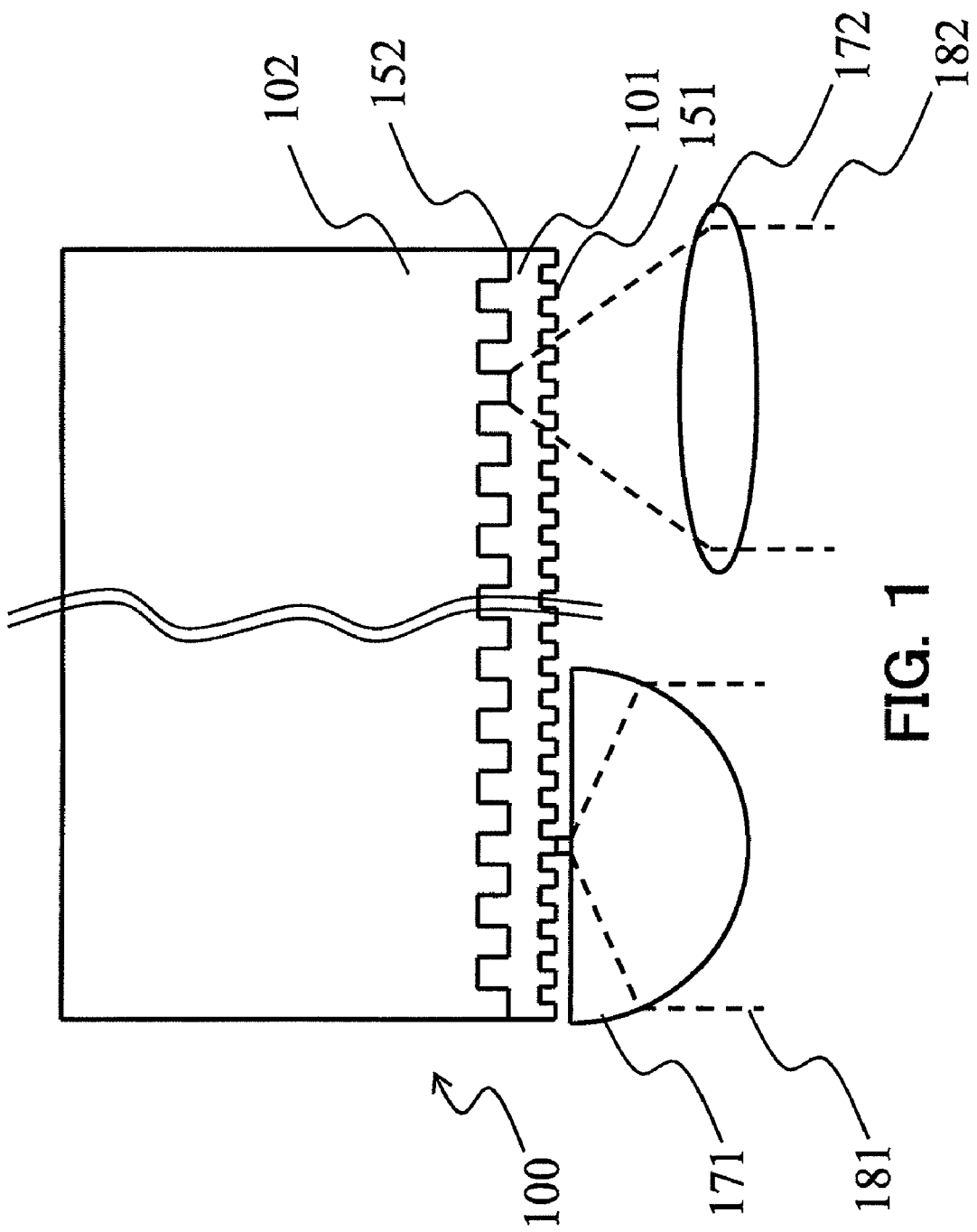
FIG. 1 is a diagram schematically illustrating a cross-section of an optical disk according to a first embodiment of the present invention.

FIG. 1 is a diagram schematically illustrating a cross-section of an optical disk according to a first embodiment of the present invention.

An optical disk 100 has a configuration in which a first recording layer 151, a first transparent substrate 101, a second recording layer 152, and a second substrate 102 are laminated together.

The first recording layer 151 is a recording layer used for recording or reproducing information using the near-field optical recording system, which represents a type of next-generation high-density optical disk. The first recording layer 151 is formed in accordance with predetermined format specifications at a laser beam entrance surface, which is equivalent to the surface of the optical disk 100.

Here, the phrase "formed at the laser beam entrance surface" is intended to include a recording layer having a distance of approximately 1 μm to 10 μm to the laser beam entrance surface. Furthermore, it should be noted that information is recorded to or reproduced from the first recording layer 151 using an objective lens 171 having a numerical aperture NA1 of approximately 1.5 to 2.5, as shall be mentioned later.

The track pitch Tp1 of the first recording layer 151 is formed, for example, so as to be less than the diffraction limit δ2, when the diffraction limit δ2, determined by a numerical aperture NA2 of an objective lens 172 and a wavelength λ2 of a second laser beam 182, is δ2=0.61×λ2/NA2.

The second recording layer 152 has a pitted pattern formed in accordance with conventional optical disk format specifications (such as, for example, BD and HD DVD). A recording film, reflective film, and so on are formed in the first recording layer 151 and second recording layer 152. A substrate made of a resin such as polycarbonate can be used for the first transparent substrate 101. Furthermore, as long as it has a thickness of approximately 100 μm, the first transparent substrate 101 does not necessarily have to be a substrate per se. For example, the first transparent substrate 101 may be formed through spin coating of an ultraviolet-hardened resin.

Here, it is preferable to set the thickness of the first transparent substrate 101 in order to ensure compatibility with an optical disk drive. The second recording layer 152 is a recording layer compliant with the BD format specifications. The second laser beam 182 has a wavelength of 405 nm, and the second objective lens 172 has a numerical aperture NA2 of 0.85. In this case, the thickness of the first transparent substrate 101 is set to be approximately 0.1 mm. If, however, the second recording layer 152 is a recording layer compliant with the HD DVD format specifications, the wavelength of the second laser beam 182 is 405 nm, and the numerical aperture NA2 of the second objective lens 172 is 0.65. In this case, the thickness of the first transparent substrate 101 is set to be approximately 0.6 mm.

In general, the total thicknesses of optical disks are set so as to be almost equal, in order to ensure compatibility for chucking and so on. For example, the total thicknesses of CDs, DVDs, BDs, and HD DVDs are all set at 1.2 mm. Therefore, it is preferable, in the optical disk 100 according to the first embodiment of the present invention, for the second substrate 102 to have a thickness of approximately 1.1 mm in the case where the second recording layer 152 is compliant with the BD format specifications and the first transparent substrate 101 is 0.1 mm thick, so that the total thickness of the optical disk is 1.2 mm. Furthermore, it is preferable for the second substrate 102 to have a thickness of approximately 0.6 mm in the case where the second recording layer 152 is compliant with the HD DVD format specifications and the first transparent substrate 101 is 0.6 mm thick, so that the total thickness of the optical disk is 1.2 mm.

The transparent adhesive layer used for adhering the substrates to one another is not discussed in this first embodiment of the present invention. In the case where the transparent adhesive layer is of a thickness that cannot be ignored, it is preferable to make the second substrate 102 thinner by the thickness amount of the transparent adhesive layer. The same applies to the following embodiments as well.

In this manner, with the optical disk 100 according to the first embodiment of the present invention, adjusting the thickness of the second substrate 102 so that the total thickness of the optical disk is 1.2 mm results in an optical disk that can be chucked even in an optical disk drive compatible only with the BD format specifications or an optical disk drive compatible with only the HD DVD format specifications.

It should be noted that in the first embodiment of the present invention, recording to or reproducing from the second recording layer 152 is carried out from the first recording layer 151 side. Recording to or reproducing from the second recording layer 152 is performed with laser beam being irradiated from the first recording layer 151 side and passing through the first recording layer 151. Therefore, it is preferable for the first recording layer 151 to be a light-transmissible recording layer. Specifically, it is preferable for the transmissible-reflective layer of the recording layer to be formed so as to have the reflectance R12 with the wavelength $\lambda 2$ of the second laser beam 182 and the transmittance T12 with the same wavelength $\lambda 2$ satisfying the following relationship:

$$T12^2 \geq R12$$

To be more specific, it is preferable for the first recording layer 151 to be formed so that the reflectance of the first recording layer 151 with respect to the wavelength of the first laser beam 181 that records to or reproduces from the first recording layer 151 is greater than or equal to 4%, so that a sufficient amount of reflected light can be obtained from the first recording layer 151. It is also necessary for the second laser beam 182, which records to and reproduces from the second recording layer 152, to pass through the first recording layer 151 and reach the second recording layer 152. Accordingly, it is preferable for the transmittance of the first recording layer 151 with respect to the wavelength of the second laser beam to be greater than or equal to 20%.

Here, in the case where the wavelength of the first laser beam 181, which records to and reproduces from the first recording layer 151, and the wavelength of the second laser beam 182, which records to and reproduces from the second recording layer 152, differ from one another, if the reflectance of the light-transmissible first recording layer 151 with respect to the wavelength of the second laser beam 182 is less than or equal to 6%, it is almost the same as the reflectance of the surface of a conventional optical disk. This makes it possible to record to or reproduce from such a disk using a conventional optical disk drive without any trouble, and is thus preferable.

Note that the first recording layer 151 and second recording layer 152 of the optical disk 100 may be any of the following three types: read-only; write-once and read-many; or rewriteable.

Figure 2:
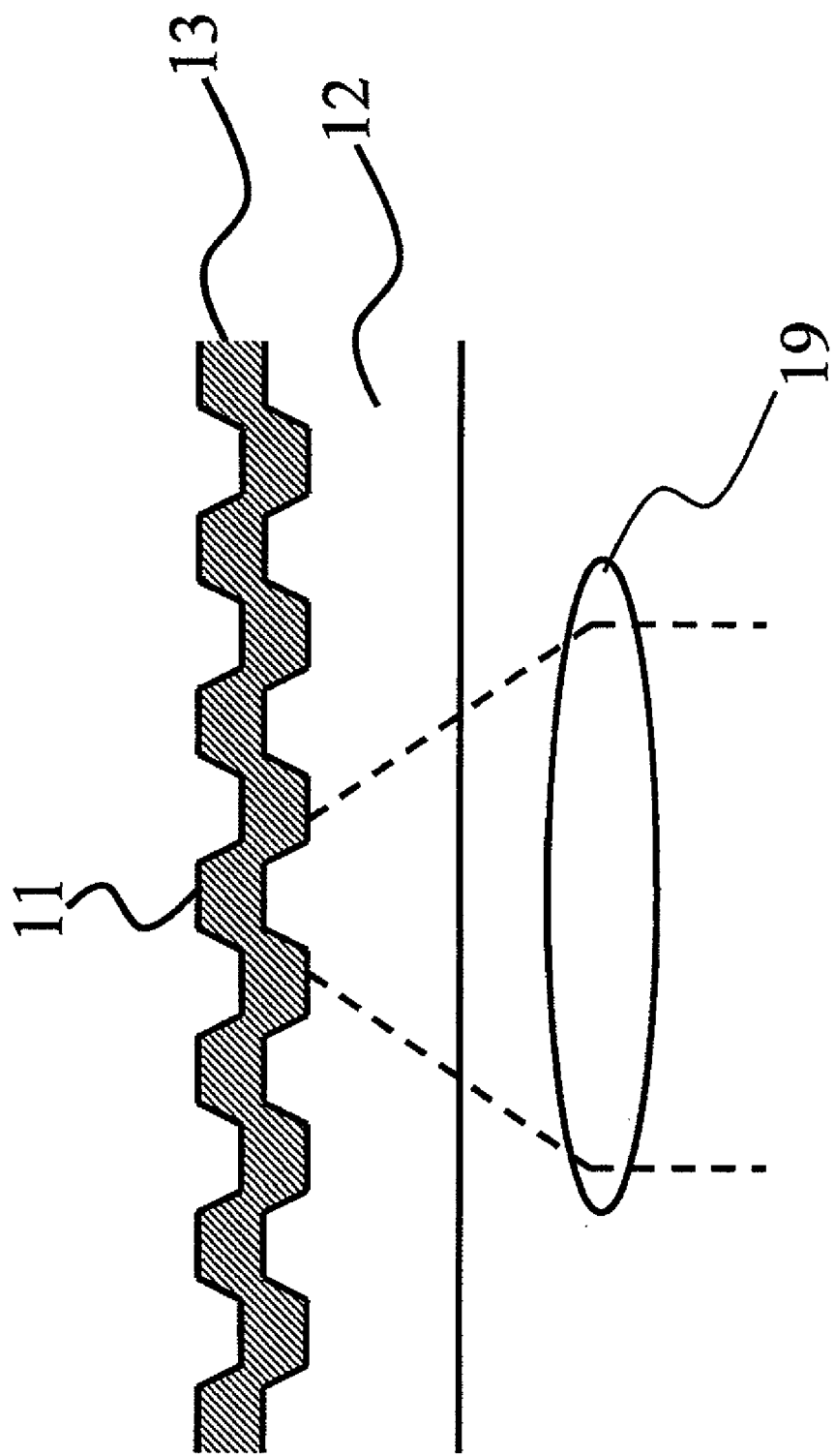
FIG. 2 is a cross-sectional view illustrating an outline of a configuration of a read-only type recording layer.

For example, FIG. 2 schematically illustrates a cross-section of a read-only type recording layer. As shown in FIG. 2, the read-only type recording layer has a configuration in which a reflective film 13 such as Al is formed on a transparent substrate 12 that is provided with prepits 11. Laser light is condensed on the reflective film 13 by an objective lens 19, thereby reproducing from the prepits 11.

Figure 3:
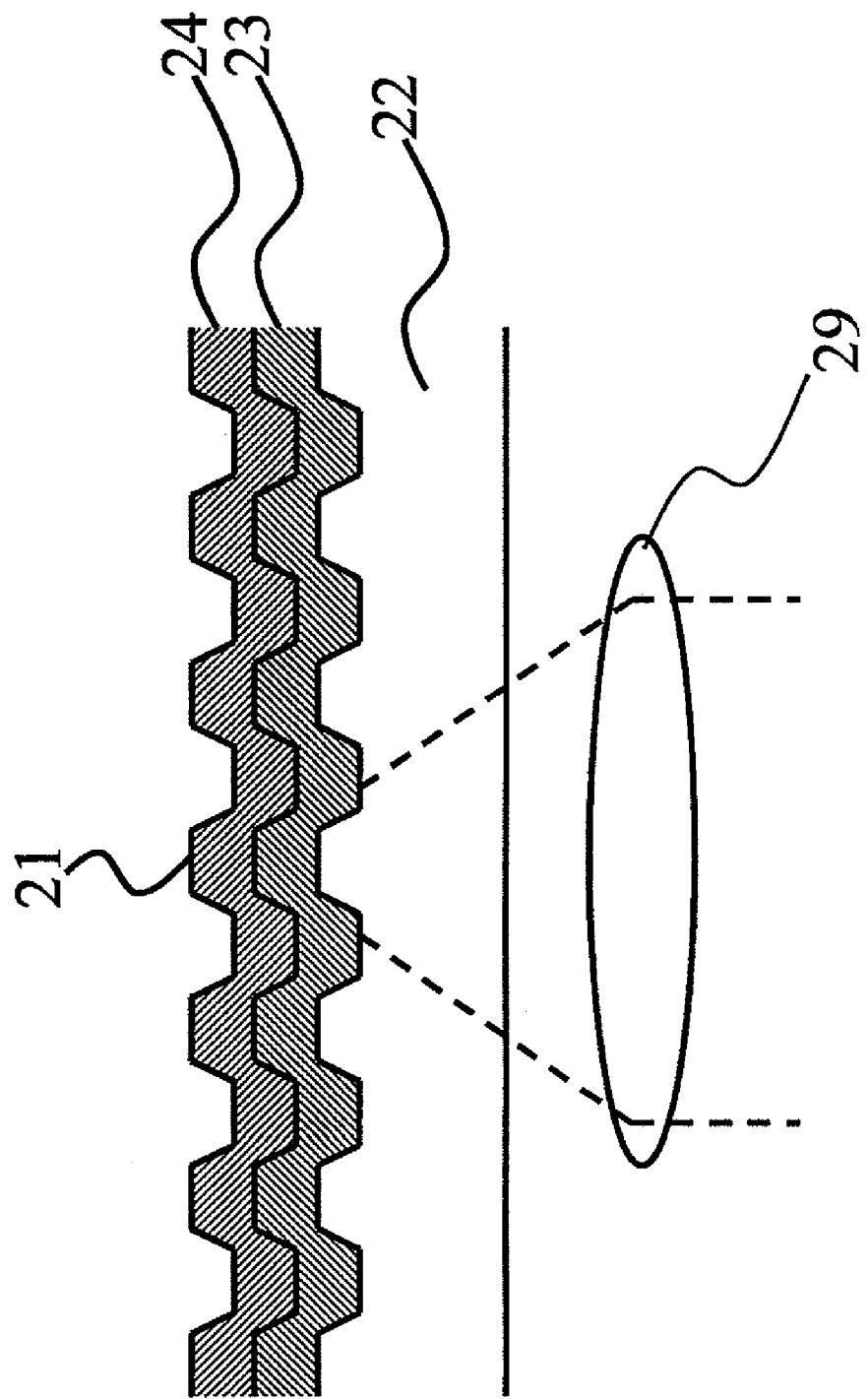
FIG. 3 is a cross-sectional view illustrating an outline of a configuration of a write-once, read-many type recording layer.

FIG. 3 schematically illustrates a cross-section of a write-once, read-many type recording layer. As shown in FIG. 3, the write-once, read-many type recording layer has a configuration in which a recording layer made up of a phase-change film 23 such as TeOx and a reflective film 24 is formed on a transparent substrate 22 in which guide grooves 21 are provided. Laser light is condensed on the recording layer by an objective lens 29, and recording and reproduction of information is carried out thereby.

Figure 4:
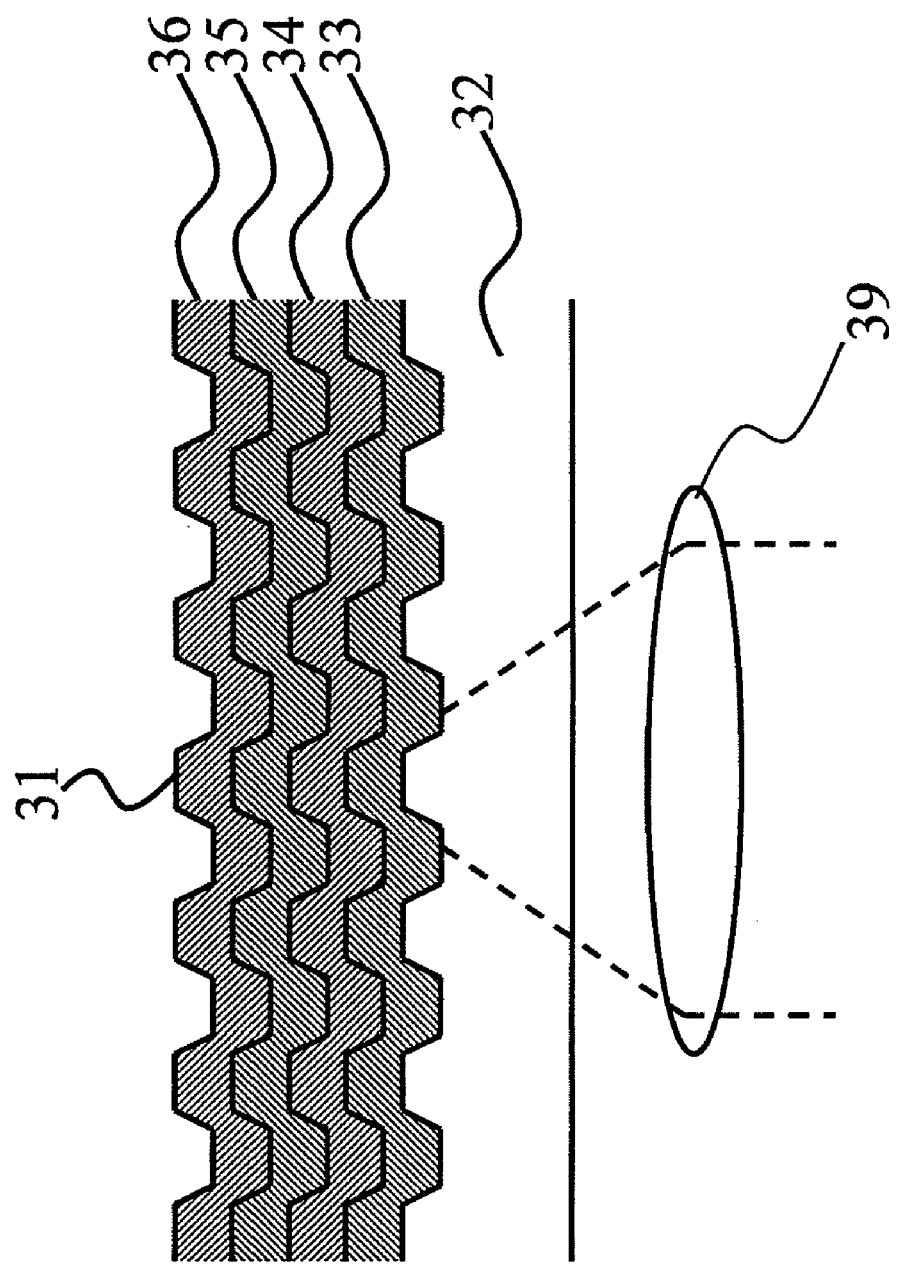
FIG. 4 is a cross-sectional view illustrating an outline of a configuration of a rewriteable type recording layer.

FIG. 4 schematically illustrates a cross-section of an optical disk having a rewriteable type recording layer.

As shown in FIG. 4, the rewriteable type recording layer has a configuration in which a recording film made up of a transparent dielectric film 33 such as $ZnS-SiO_2$, a phase-change recording film 34 such as GeSbTe, a transparent dielectric film 35 such as $ZnS-SiO_2$, and a reflective film 36 such as Al is formed on a transparent substrate 32 in which guidance grooves 31 are provided. Laser light is condensed on the recording layer by an objective lens 39, and recording and reproduction of information is carried out thereby.

Although the aforementioned three types of recording layers, or the read-only type, write-once, read many-type, and rewriteable type, exist, the following descriptions shall be provided without differentiating between these three types of optical disks.

1.2. Recording/Reproduction Method

A method for recording to or reproducing from the optical disk 100 according to the first embodiment of the present invention shall be described hereinafter.

This optical disk 100 can be recorded to or reproduced from by both an optical disk drive capable only of recording/reproduction using a near-field light recording system and an optical disk drive capable only of recording/reproduction using a conventional optical disk system (for example, BD, HD DVD, DVD, CD, and so on).

First, if the optical disk 100 is inserted into an optical disk drive capable only of recording/reproduction using a near-field light recording system, the optical disk drive detects the first recording layer 151 formed at the surface of the optical disk 100 by bringing the objective lens of an optical pickup included in the drive close to the optical disk 100. Then, information is recorded to or reproduced from the first recording layer 151 through focus servo pull-in with respect to the detected first recording layer 151 and furthermore through the operation of a tracking servo.

Next, if the optical disk 100 is inserted into an optical disk drive capable only of recording/reproduction using a conventional optical disk type (for example, BD, HD DVD, DVD, CD, and so on), the objective lens of an optical pickup included in the drive is brought close to the optical disk 100. Then, the optical disk drive determines that the first recording layer 151 formed at the surface of the optical disk is a surface of a conventional optical disk, and brings the objective lens even closer to the optical disk 100. Then, the second recording layer 152 is detected, and information is recorded to or reproduced from the detected second recording layer 152 through focus servo pull-in and furthermore through the operation of a tracking servo.

Furthermore, as shall be discussed later, this optical disk 100 can be recorded to or reproduced from by a drive compatible with both near-field light recording system optical disks and conventional optical disks, such as that shown in FIG. 5.

Figure 12:
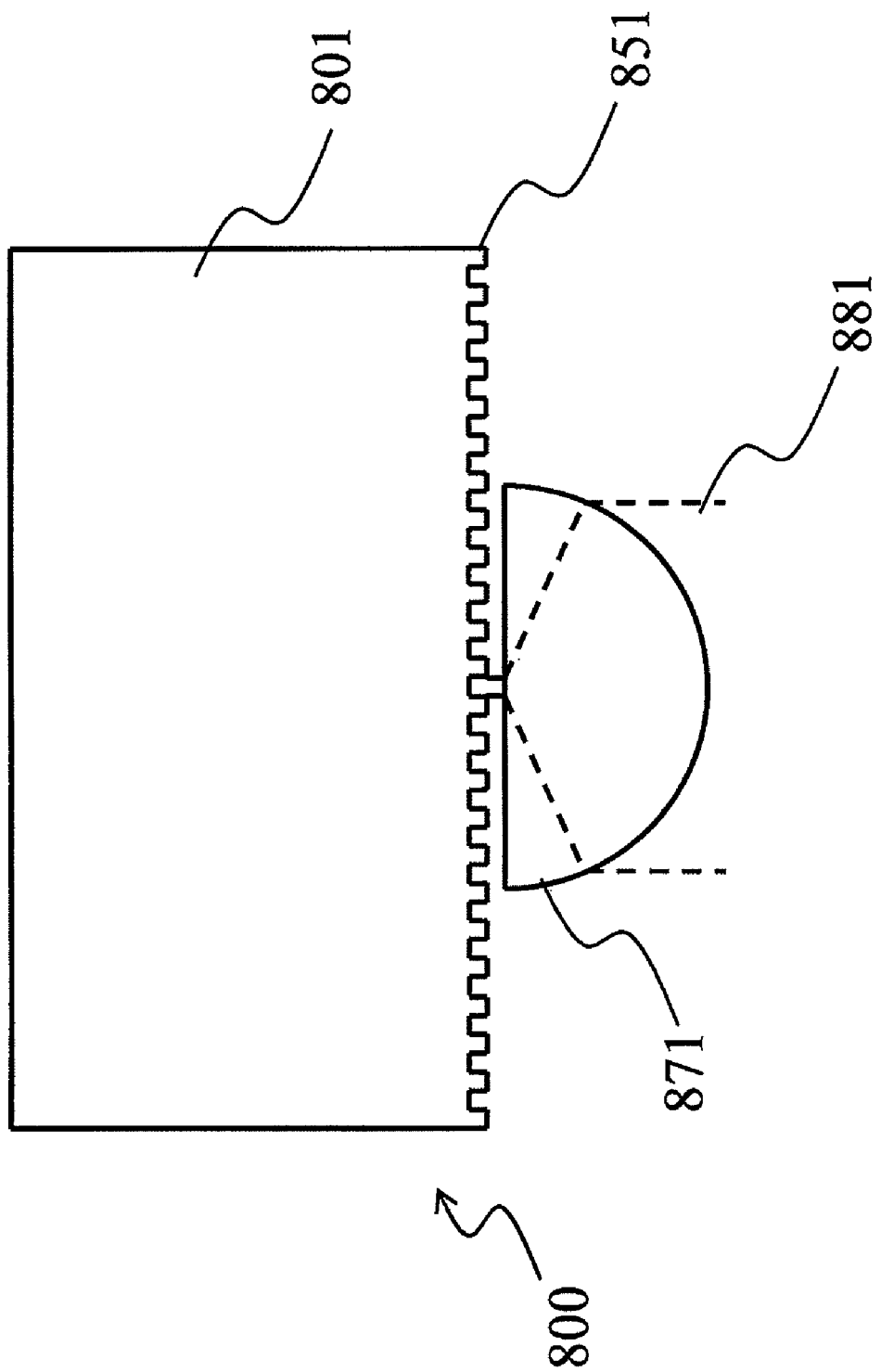
FIG. 12 is a diagram illustrating the principle of an optical disk according to the SIL system.
Figure 13:
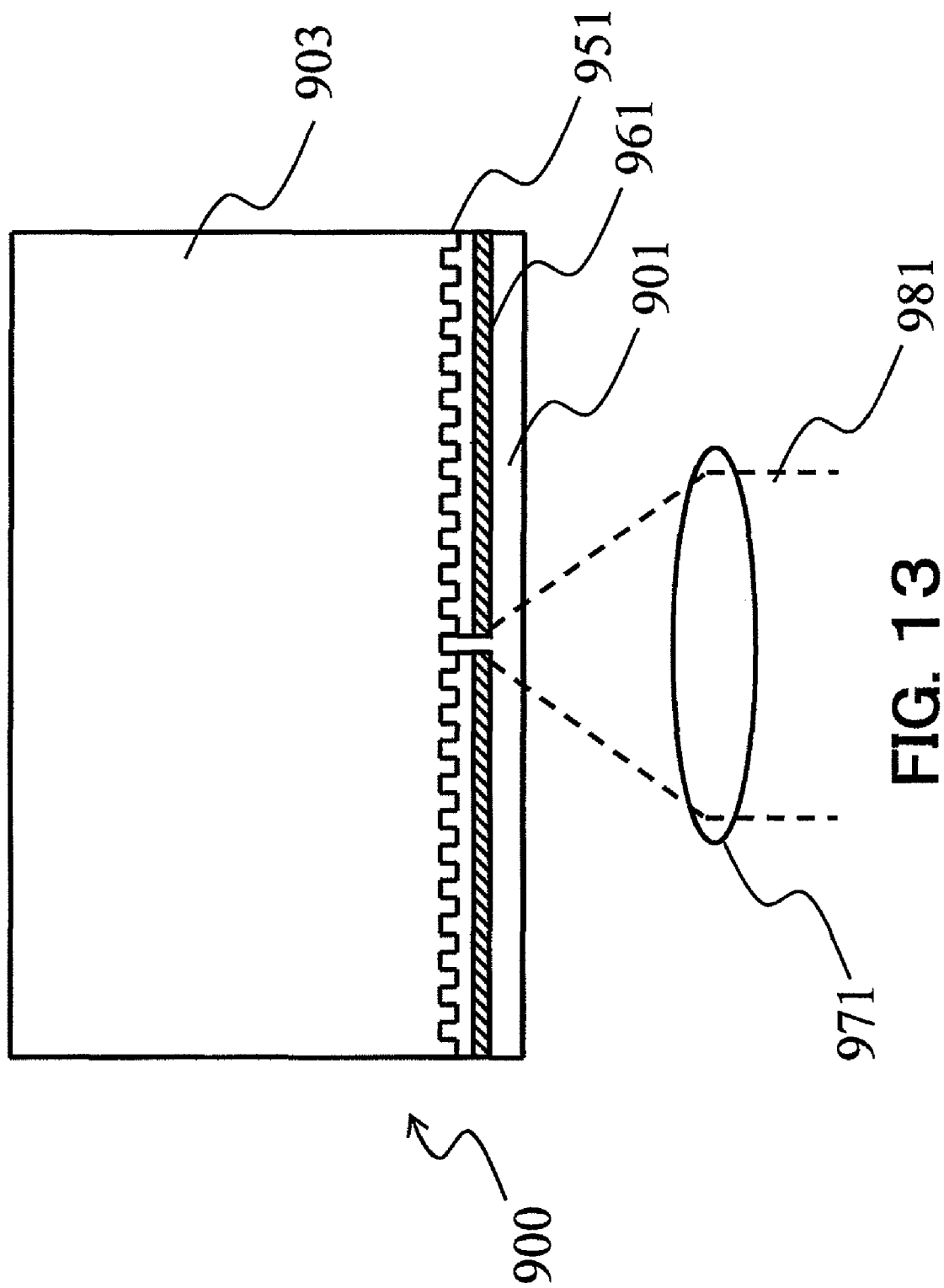
FIG. 13 is a diagram illustrating the principle of an optical disk according to the Super-RENS system.

For example, even if an optical disk 800 provided only with a recording layer compatible only with near-field light recording, such as that shown in FIG. 12, is mistakenly inserted into an optical disk drive capable only of recording/reproduction of a conventional optical disk, a recording layer 851 formed at the surface of the optical disk 800 will only be determined to be the surface of a conventional optical disk. Here, the optical disk drive moves the objective lens closer still to the optical disk 800 in order to perform focus servo pull-in. However, because the optical disk 800 has no other recording layers aside from the recording layer 851 formed at the surface of the disk, the objective lens is moved closer to the disk without focus servo pull-in being performed. As a result, there is the possibility that the objective lens and the recording layer 851 collide with one another. The recording layer 851 for near-field light recording is formed at the surface of the optical disk 800, and thus recording/reproduction may suffer from major problems if the recording layer 851 collides with the objective lens and is subjected to physical damage.

However, with the optical disk 100 according to the first embodiment of the present invention, focus servo pull-in can be performed with respect to the second recording layer 152, even if the optical disk 100 is inserted into an optical disk drive capable of recording/reproducing only a conventional disk as described above. This has a noteworthy effect of preventing the objective lens and the surface of the first recording layer 151 from colliding with one another.

1.3. Optical Information Device

Figure 5:
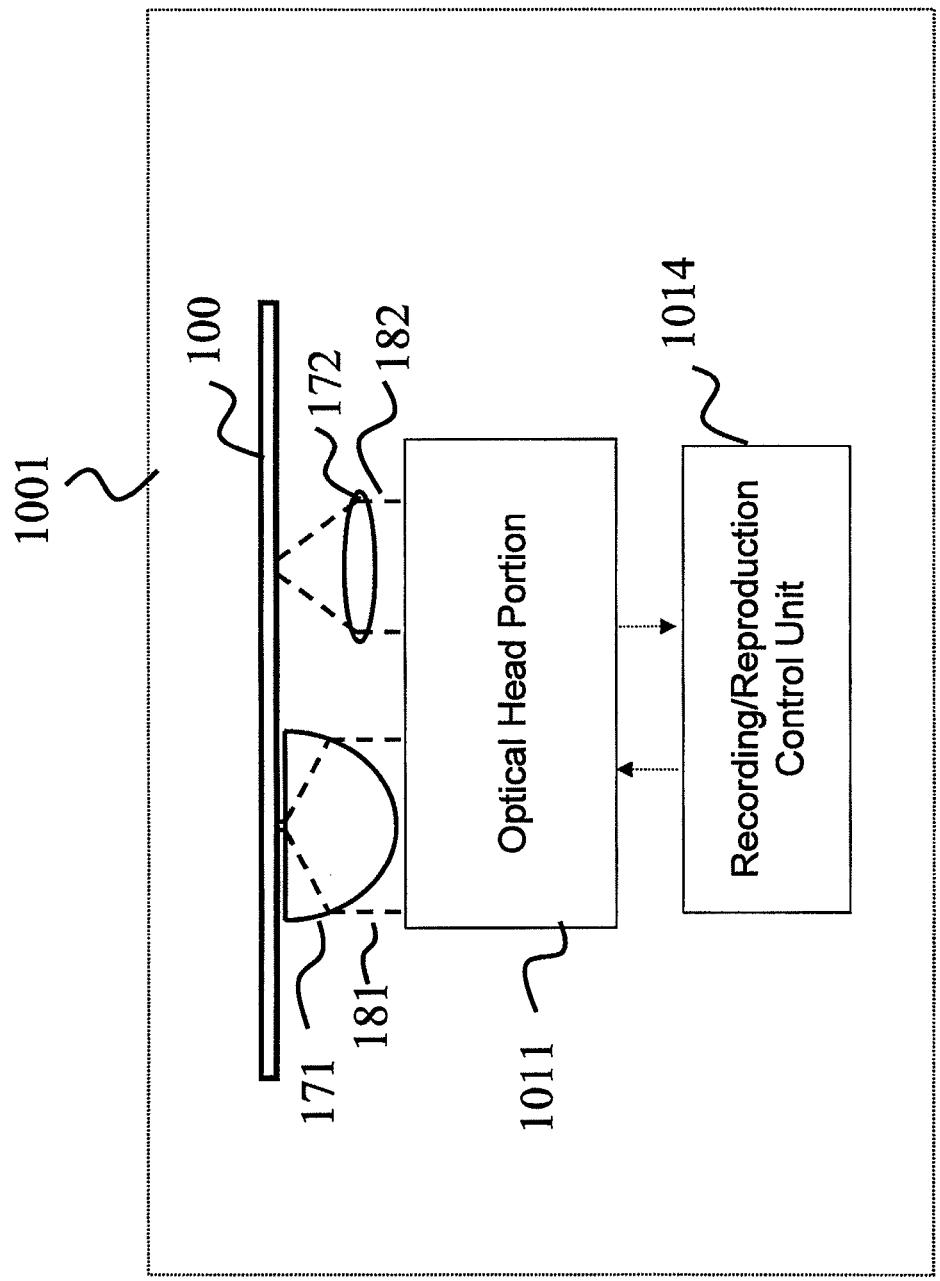
FIG. 5 is a diagram schematically illustrating an optical information device according to the present invention.

FIG. 5 is a diagram illustrating an outline of an optical disk drive serving as an optical information device for recording to or reproducing from the optical disk 100 according to the first embodiment.

An optical disk drive 1001 includes two objective lenses 171 and 172, an optical pickup, an optical head unit including a driving unit and the like (not shown) for the optical head, and a recording/reproduction control unit 1014, which is a control circuit for performing recording and reproduction and the like based on information obtained via a photoelectric converter. The first objective lens 171 is an SIL with a numerical aperture NA1 greater than or equal to 0.9, but preferably in the range of approximately 1.5 to 2.5. The numerical aperture NA2 of the second objective lens 172 is approximately 0.85.

First, an optical head unit 1011 drives the objective lens 171 so that the first laser beam 181 is irradiated from the first recording layer 151 side, as shown in FIG. 1. The first laser beam 181 is condensed onto the first recording layer 151 by the first objective lens 171. Recording information to the first recording layer 151 or reproduction of information recorded onto the first recording layer 151 is performed using near-field light emerging from the bottom surface of the SIL.

Similarly, the optical head unit 1011 drives the objective lens 172 so that the second laser beam 182 is irradiated from the first recording layer 151 side. The second laser beam 182 is condensed onto the second recording layer 152 by the second objective lens 172, whereby recording of information to the second recording layer 152 or reproduction of information recorded onto the second recording layer 152 is performed.

Note that this optical disk drive 1001 is compatible with both an optical disk compliant only with the conventional format specifications and an optical disk compliant only with the near-field light recording system.

Descriptions shall first be provided regarding the case where an optical disc compliant only with conventional format specifications, such as, for example, an optical disk having only the second recording layer 152 shown in FIG. 1, is inserted into the disk drive. First, the optical head unit 1011 shown in FIG. 5 drives the objective lens 171 so that the first laser beam 181 is irradiated from the first recording layer 151 side. The first laser beam 181 is condensed onto a first recording layer 151 by the first objective lens 171. However, because a first recording layer 151 such as that shown in FIG. 1 is not formed here, the tracking servo pull-in naturally cannot be performed even if focus servo pull-in is possible. In this case, the recording/reproduction control unit 1014 determines that there is no first recording layer 151 based on, for example, a modulating signal obtained as a result of the focus servo pull-in, and causes the optical head unit 1011 to stop the driving of the objective lens 171 based on that determination. Then, the optical head unit 1011 drives the objective lens 172 so that the second laser beam 182 is irradiated. Recording information to the second recording layer 152 or reproducing information recorded onto the second recording layer 152 is performed by condensing the second laser beam 182 onto the second recording layer 152 using the second objective lens 172, performing focus servo pull-in, and furthermore operating the tracking servo.

Next, descriptions shall be provided regarding operations in the case where an optical disc compliant only with a near-field light recording system, such as, for example, the optical disk 800 shown in FIG. 12, is inserted into the disk drive. The optical head unit 1011 shown in FIG. 5 drives the objective lens 171 so that the first laser beam 181 is irradiated from the first recording layer 851 side. The first laser beam 181 is condensed onto the first recording layer 851 by the first objective lens 171. Recording information to the first recording layer 851 or reproduction of information recorded onto the first recording layer 851 is performed using near-field light emerging from the bottom surface of the SIL. In this case, information is recorded to or reproduced from the first recording layer, and thus the aforementioned determination made by the recording/reproduction control unit 1014 is not carried out, and the optical head unit 1011 finishes the operation.

1.4. Optical Disk Manufacturing Method

Next, a manufacturing method of the optical disk 100 serving as an embodiment of the present invention shall be described.

The first optical disk 100 can be manufactured by attaching the first transparent substrate 101 on which is formed the first recording layer 151 to the second substrate 102 on which is formed the second recording layer 152 using an adhesive. For example, in the case where the first recording layer 151 is to be compliant with near-field recording format specifications using an SIL, and the second recording layer 152 is to be compliant with the BD format specifications, the thicknesses of the first transparent substrate 101 and the second substrate 102 are approximately 0.1 mm and 1.1 mm, respectively.

Furthermore, as another method for manufacturing the above optical disk, the second substrate 102 may be attached to the second recording layer 152 side of the first substrate 101 using a transparent adhesive after the first recording layer 151 and the second recording layer 152 are respectively formed at both surfaces of the first transparent substrate 101. In this case, the recording information, pitted pattern for tracking, and so on can be formed on both surfaces of the first transparent substrate 101 at once, which simplifies the forming process.

1.5. Variations

Thus far, in the first embodiment of the present invention, the first recording layer 151 has been described as a recording layer for recording/reproduction using a near-field light recording system, whereas the second recording layer 152 has been described as a recording layer based on the BD or HD DVD format specifications, which are conventional optical disk format specifications. However, the present invention is not intended to be limited hereto. It goes without saying that this embodiment is applicable even in the case where, for example, the second recording layer is a recording layer based on the DVD or CD format specifications.

2. Second Embodiment 2.1. Configuration of Optical Disk

Figure 6:
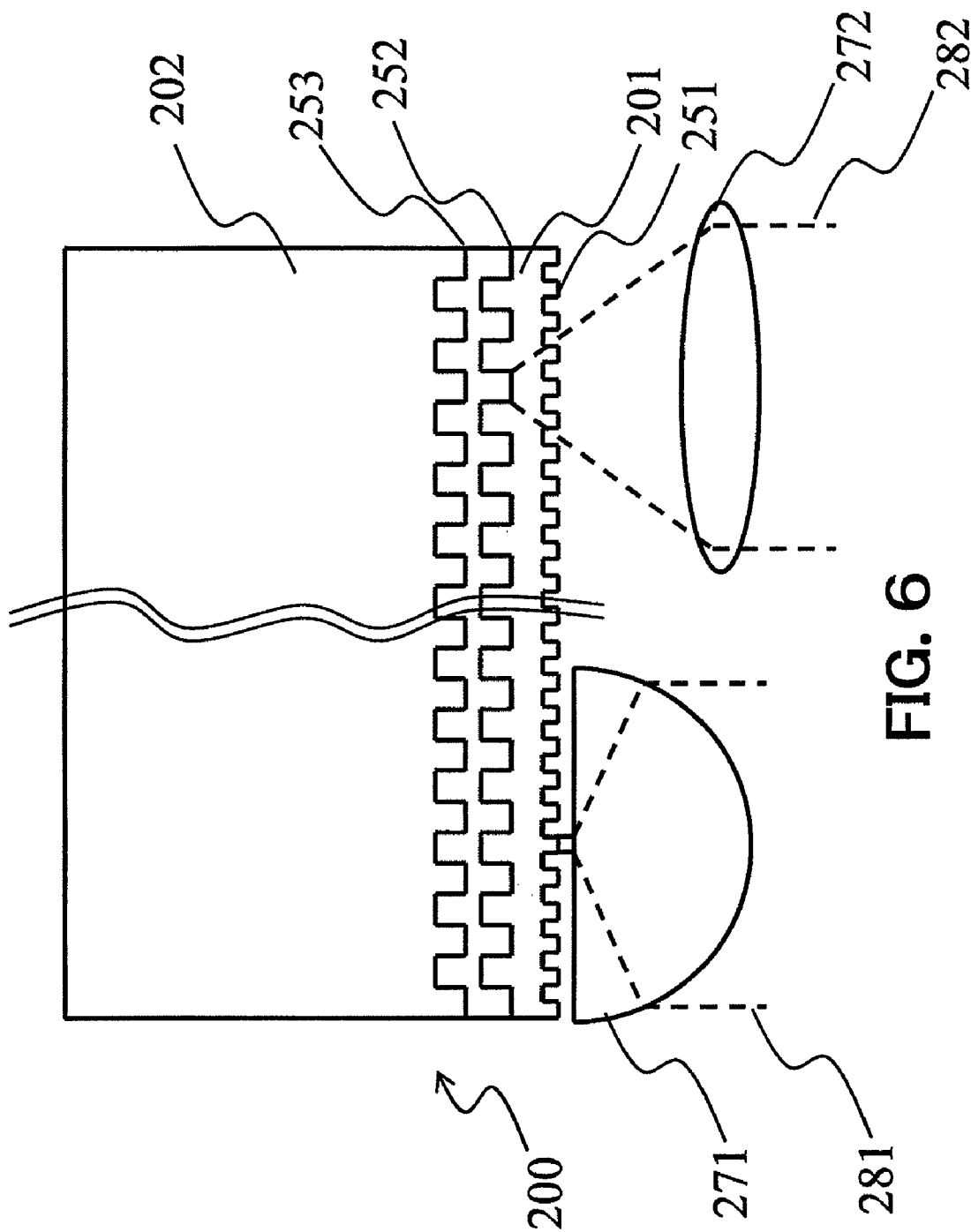
FIG. 6 is a diagram schematically illustrating a cross-section of an optical disk according to a second embodiment of the present invention.

FIG. 6 is a diagram schematically illustrating a cross-section of an optical disk 200 according to a second embodiment of the present invention. The optical disk 200 of the second embodiment differs from the optical disk 100 of the aforementioned first embodiment in that the optical disk 200 has a third recording layer 253.

The optical disk 200 has a configuration in which a first recording layer 251, a first transparent substrate 201, a second recording layer 252, a third recording layer 253, and a second substrate 202 are laminated together.

Similar to the first recording layer 151 in the aforementioned first embodiment, the first recording layer 251 is a recording layer used for recording or reproducing information using the near-field optical recording system, which represents a type of next-generation high-density optical disk. The first recording layer 251 is formed at the surface of the optical disk 200 according to predetermined format specifications.

The second recording layer 252 and third recording layer 253 have pitted patterns formed in accordance with the same conventional optical disk format specifications (such as, for example, BD and HD DVD). Note that a recording film, reflective film, and so on are formed on the first recording layer 251, second recording layer 252, and third recording layer 253.

2.2. Recording/Reproduction Method and Device

A recording and reproduction method and device for the second optical disk 200 according to the second embodiment of the present invention shall be described hereinafter.

As shown in FIG. 6, the first laser beam 281 irradiated from the first recording layer 251 side is condensed upon the first recording layer 251 by the first objective lens 271. The first objective lens 271 is an SIL having a numerical aperture NA1 of approximately 1.5 to 2.5. Recording information to the first recording layer 251 or reproduction of information recorded onto the first recording layer 251 is performed using near-field light emerging from the bottom surface of the SIL.

Similarly, recording to or reproduction from the second recording layer 252 and the third recording layer 253 is carried out from the first recording layer 251 side. Here, recording to or reproduction from the third recording layer 253 is carried out by allowing the second laser beam 282, irradiated from the first recording layer 251 side, to pass through the second recording layer 252. Therefore, the second recording layer 252 in the second optical disk 200 is a light-transmissible recording layer. It is preferable to set the transmissibilities of the second recording layer 252 and the third recording layer 253 respectively so that the amount of the second laser beam 282 that is reflected from each of these layers is approximately the same.

Here, it is preferable to set the thickness of the first transparent substrate 201 in order to ensure the compatibility of the optical disk. For example, if the second recording layer 252 and the third recording layer 253 are recording layers compliant with the BD format specifications, the wavelength of the second laser beam 282 is 405 nm, and the numerical aperture NA2 of the second objective lens 272 is 0.85. The thickness of the first transparent substrate 201 is set to be approximately 0.1 mm.

However, if the second recording layer 252 and the third recording layer 253 are recording layers compliant with the HD DVD format specifications, the second laser beam 282 has a wavelength of 405 nm, the second objective lens 272 has a numerical aperture NA of 0.65, and the thickness of the first transparent substrate 201 is set to be approximately 0.6 mm.

Note that like the optical disk 100 of the aforementioned first embodiment, the optical disk 200 can be recorded to and reproduced from both when inserted into an optical disk drive capable of recording/reproducing only conventional optical disks and when inserted into an optical disk drive capable of recording/reproduction only using a near-field light recording system.

Furthermore, similar to the aforementioned first embodiment, the optical disk 200 is capable of being recorded to or reproduced from using an optical disk drive such as that shown in FIG. 5.

2.3. Optical Disk Manufacturing Method

Next, a manufacturing method of the optical disk 200 of the second embodiment of the present invention shall be described.

The second optical disk 200 can be manufactured in the following manner: the first recording layer 251 and the second recording layer 252 are respectively formed on both sides of the first transparent substrate 201 so that the second recording layer 252 is on the side of the third recording layer 253, and the first transparent substrate 201 is attached to the second substrate 202, on which is formed the third recording layer 253, using a transparent adhesive. For example, in the case where the first recording layer 251 is to be compliant with near-field recording format specifications using an SIL, and the second recording layer 252 and third recording layer 253 are to be compliant with the BD format specifications, the thicknesses of the first transparent substrate 201 and the second substrate 202 are approximately 0.1 mm and 1.1 mm, respectively.

Furthermore, another method of manufacturing the second optical disk is possible, whereby the optical disk is manufactured in the following manner: the first transparent substrate 201, on which the first recording layer 251 has been formed through injection molding or a photopolymer method is attached, using an adhesive, to the second substrate 202, on which the second recording layer 252 and third recording layer 253 have been formed through injection molding or a photopolymer method.

3. Third Embodiment 3.1. Configuration of Optical Disk

Figure 7:
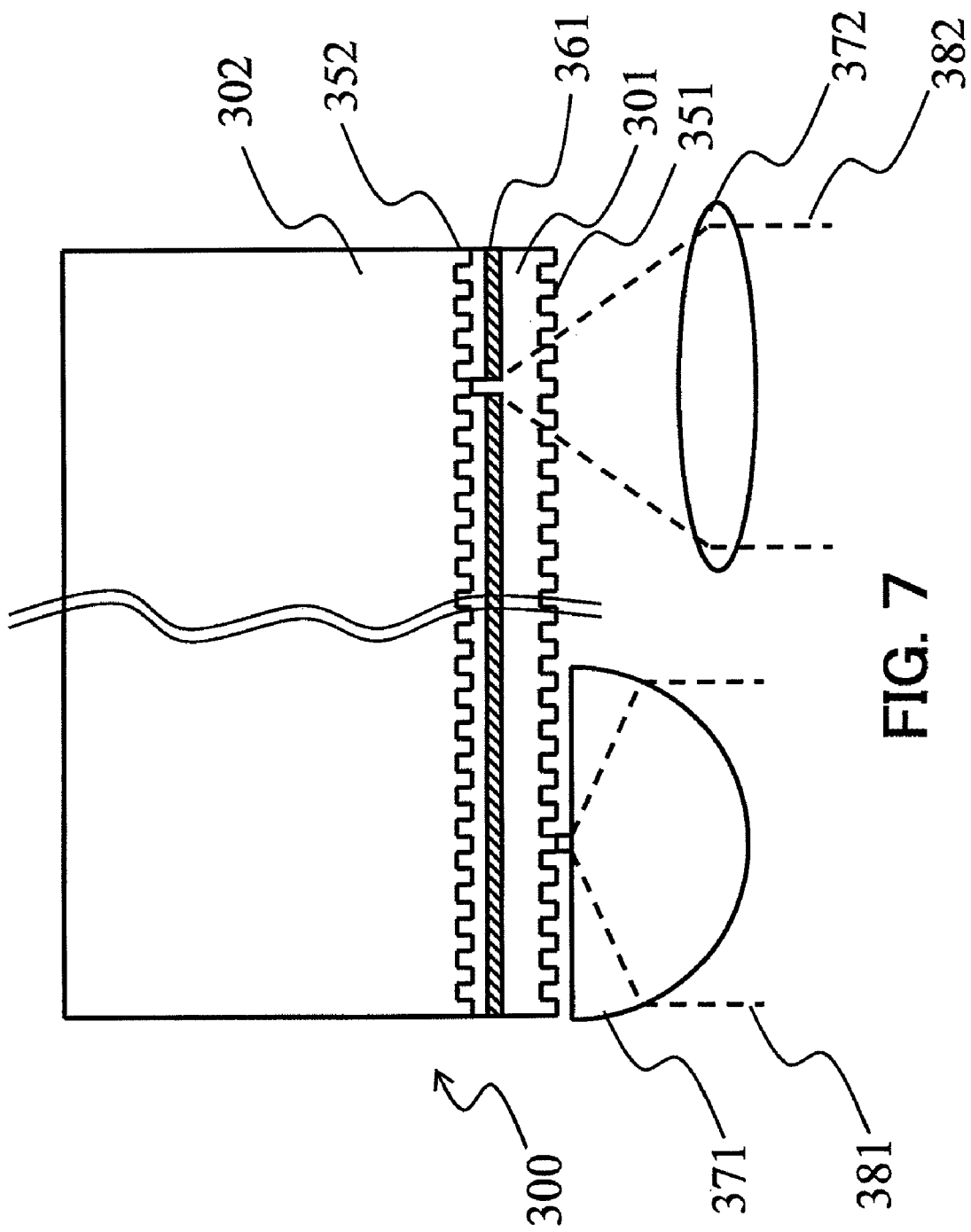
FIG. 7 is a diagram schematically illustrating a cross-section of an optical disk according to a third embodiment of the present invention.

FIG. 7 is a diagram schematically illustrating a cross-section of an optical disk 300 according to a third embodiment of the present invention. The optical disk 300 of the third embodiment has the same configuration as the optical disk 100 of the aforementioned first embodiment, save for the fact that a nonlinear optical layer is provided on the side of the second recording layer into which light enters.

As shown in FIG. 7, the optical disk 300 has a configuration in which a first recording layer 351, a first transparent substrate 301, a nonlinear optical film 361, a second recording layer 352, and a second substrate 302 are laminated together.

It is possible to use, as the nonlinear optical film 361, a thin film of ZnO, CeOx, TiOx, or the like in which the refractive index, light transmittance, and light reflectance change with a rise in temperature caused by irradiation of laser beam 382, or a thin film of PtOx, AgOx, or the like with which the Super-RENS effect increasing the amount of reflected light in the minim region due to the near-field effect can be utilized. Providing such a nonlinear optical film 361 makes it possible to implement super-resolution recording/reproduction, in which recording or reproduction of only part of the information within the beam spot formed by condensing the laser beam 382 is possible. This in turn makes it possible to realize twice the recording capacity of a normal optical disk.

3.2. Recording/Reproduction Method and Device

A recording/reproduction method and device for the optical disk 300 according to the third embodiment of the present invention shall be described hereinafter.

First, descriptions shall be provided regarding the case where the optical disk 300 is inserted into an optical disk drive capable only of recording/reproduction using a near-field light recording system. This optical disk drive detects the first recording layer 351 formed at the surface of the optical disk 300 by bringing the objective lens of an included optical pickup close to the optical disk 300. Then, information is recorded to or reproduced from the first recording layer 351 through focus servo pull-in with respect to the detected first recording layer 351 and furthermore through the operation of a tracking servo.

Next, descriptions shall be provided regarding the case where the optical disk 300 is inserted into an optical disk drive capable only of recording/reproduction of a Super-RENS type optical disk. This optical disk drive brings the objective lens of an included optical pickup close to the optical disk 300. Then, the optical disk drive determines that the first recording layer 351 formed at the surface of the optical disk is a surface of a Super-RENS type optical disk, and brings the objective lens even closer to the optical disk 300. Then, the second recording layer 352 is detected and information is recorded to or reproduced from the detected second recording layer 352 through focus servo pull-in and furthermore through the operation of a tracking servo.

For example, if the optical disk 800 provided only with a recording layer compatible with near-field light recording, such as that shown in FIG. 12, is mistakenly inserted into an optical disk drive capable only of recording/reproduction of a Super-RENS type optical disk, the recording layer 851 formed at the surface of the optical disk 800 will be determined to be the surface of a Super-RENS type optical disk. Here, the optical disk drive moves the objective lens closer still to the optical disk 800 in order to perform focus servo pull-in. However, because the optical disk 800 has no other recording layers aside from the recording layer 851, there is the possibility that the objective lens and the recording layer 851 collide with one another. The recording layer 851 for near-field light recording is formed at the surface of the optical disk 800, and thus the recording layer 851 may be subjected to physical damage if the recording layer 851 and the objective lens collide. As a result, there is the possibility that major problems arise in the recording/reproduction.

However, with the optical disk 300 according to the third embodiment of the present invention, focus servo pull-in can be sufficiently performed with respect to the second recording layer 352, even if the optical disk 300 is inserted into an optical disk drive capable of recording/reproduction of only a Super-RENS type optical disk such as mentioned above. This has a noteworthy effect of preventing the objective lens and the surface of the first recording layer 351 from colliding with one another.

Furthermore, similar to the aforementioned first embodiment, the optical disk 300 is capable of being recorded to or reproduced from using an optical disk drive such as that shown in FIG. 5.

4. Fourth Embodiment 4.1. Configuration of Optical Disk

Figure 8:
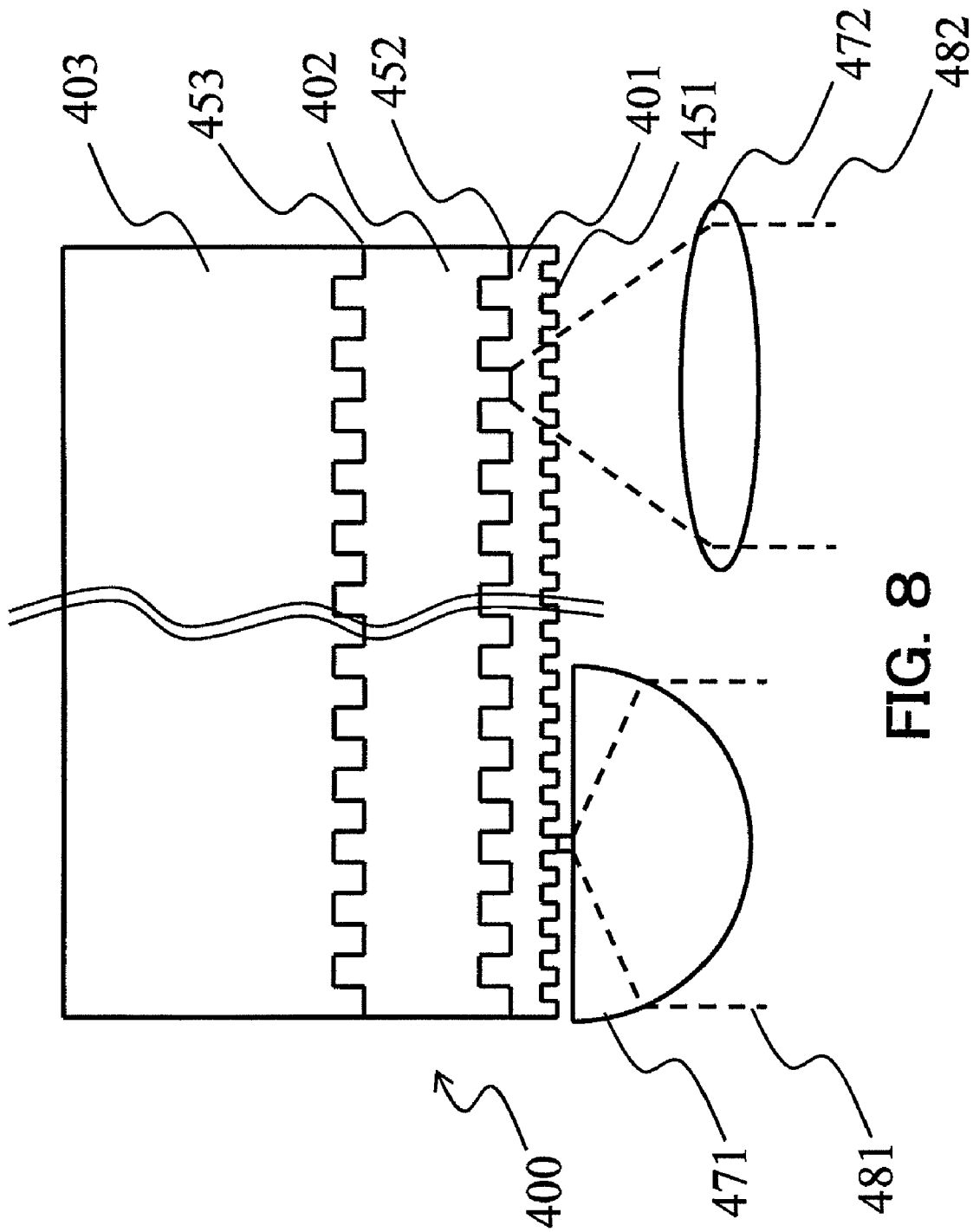
FIG. 8 is a diagram schematically illustrating a cross-section of an optical disk according to a fourth embodiment of the present invention.

FIG. 8 is a diagram schematically illustrating a cross-section of an optical disk according to a fourth embodiment of the present invention. An optical disk 400 has a configuration in which a first recording layer 451, a first transparent substrate 401, a second recording layer 452, a second transparent substrate 402, a third recording layer 453, and a third substrate 403 are laminated together. The first recording layer 451 is a recording layer used for recording or reproducing information using a near-field optical recording system, which represents a type of next-generation high-density optical disk. The first recording layer 451 is formed at the surface of the optical disk 400 according to predetermined format specifications.

The second recording layer 452 and third recording layer 453 have pitted patterns formed in accordance with differing conventional optical disk format specifications (such as, for example, BD for the second recording layer and HD DVD for the third recording layer). Note that a recording film, reflective film, and so on are formed on the first recording layer 451, second recording layer 452, and third recording layer 453.

Here, it is preferable to set the thicknesses of the first transparent substrate 401 and the second transparent substrate 402 in order to ensure the compatibility of the optical disk of the present invention. For example, if the second recording layer 452 is a recording layer compliant with the BD format specifications and the third recording layer 453 is a recording layer compliant with the HD DVD format specifications, settings are made so that the second laser beam 482 has a wavelength of 405 nm, the second objective lens 472 has a numerical aperture NA of 0.85, and the thickness of the first transparent substrate 401 is approximately 0.1 mm, whereas the third laser beam (not shown) has a wavelength of 405 nm, the third objective lens (not shown) has a numerical aperture NA of 0.65, and the thickness of the second transparent substrate 402 is approximately 0.5 mm. Furthermore, it is preferable for the thickness of the third substrate 403 to be 0.6 mm, so that the total thickness of the optical disk is 1.2 mm.

4.2. Recording/Reproduction Method and Device

A method for recording to or reproducing from the optical disk 200 according to the fourth embodiment of the present invention shall be described hereinafter.

As shown in FIG. 8, the first laser beam 481 irradiated from the first recording layer 451 side is condensed upon the first recording layer 451 by a first objective lens 471. The first objective lens 471 is an SIL having a numerical aperture NA of approximately 1.5 to 2.5. Recording information to the first recording layer 451 or reproduction of information recorded onto the first recording layer 451 is performed using near-field light emerging from the bottom surface of the SIL.

Similarly, recording information to the second recording layer 452 or reproducing information recorded onto the second recording layer 452 is performed by condensing the second laser beam 482, irradiated from the first recording layer 451 side, onto the second recording layer 452 using the second objective lens 472.

Furthermore, recording information to the third recording layer 453 or reproducing information recorded onto the third recording layer 453 is performed by condensing the third laser beam (not shown), irradiated from the first recording layer 451 side, onto the third recording layer 453 using the third objective lens (not shown).

Next, descriptions shall be provided regarding operations of optical disk drives in the case where the fourth optical disk 400 according to the fourth embodiment of the present invention is inserted into various types of optical disk drives.

First, descriptions shall be provided regarding the case where the optical disk 400 is inserted into an optical disk drive capable only of recording/reproduction using a near-field light recording system. This optical disk drive detects the first recording layer 451 formed at the surface of the optical disk 400 by bringing the objective lens of an included optical pickup close to the optical disk 400. Then, information is recorded to or reproduced from the first recording layer 451 through focus servo pull-in with respect to the detected first recording layer 451 and furthermore through the operation of a tracking servo.

Next, descriptions shall be provided regarding the case where the optical disk 400 is inserted into an optical disk drive capable only of recording/reproduction using a conventional optical disk (for example, BD, HD DVD, DVD, CD, and so on). This optical disk drive determines that the first recording layer 451 formed at the surface of the optical disk 400 is a surface of a conventional optical disk by bringing the objective lens of an included optical pickup close to the optical disk 400. Then, the objective lens is brought even closer to the optical disk 400. When the second recording layer 452 or third recording layer 453 is detected, focus servo pull-in is performed with respect to that recording layer, and tracking servo operations are performed. Information is recorded onto or reproduced from the second recording layer 452 or the third recording layer 453 thereby.

With the optical disk 400 according to the fourth embodiment of the present invention, focus servo pull-in can be performed with respect to the second recording layer 452 or the third recording layer 453, even if the optical disk 400 is inserted into the second optical disk drive, capable of recording/reproduction of only a conventional disk, such as that mentioned above. This has a noteworthy effect of preventing the objective lens and the first recording layer 451 on the surface from colliding with one another.

Furthermore, in the case where the second recording layer 452 or third recording layer 453 is a recording layer compliant with the HD DVD format specifications or the DVD format specifications, focus servo pull-in can be performed with respect to the second recording layer 452 or the third recording layer 453, even if the optical disk 400 is inserted into an optical disk drive capable of recording/reproducing only an optical disk according to the DVD format specifications. This has a noteworthy effect of preventing the objective lens and the first recording layer 451 at the surface from colliding with one another.

It should be noted that, similar to the aforementioned first embodiment, the optical disk 400 is capable of being recorded to or reproduced from using an optical disk drive such as that shown in FIG. 5 further provided with the aforementioned third objective lens.

4.3. Variations

Thus far, in the fourth embodiment of the present invention, the first recording layer has been described as a recording layer for recording/reproduction using a near-field light recording system, whereas the second recording layer and third recording layer have been described as recording layers based on the BD or HD DVD format specifications, which are conventional optical disk format specifications. However, the present invention is not intended to be limited thereto. It goes without saying that this embodiment is applicable even if recording layers based on different format specifications are combined, such as, for example, the second recording layer and the third recording layer respectively being BD and HD DVD format specifications, or DVD and CD format specifications, and so on. It also goes without saying that one or more other recording layers based on these format specifications may be provided as well.

5. State of Information on the Optical Disk

Next, descriptions shall be provided regarding the state of information, user data information (called "content" hereinafter) in particular, on the optical disk of the present invention, with reference to the optical disk 100 shown in FIG. 1.

For example, the recording capacities of the first recording layer 151 and second recording layer 152 differ in the optical disk 100 shown in FIG. 1.

To be more specific, the first recording layer 151 is compliant with the format specifications of a next-generation high-density optical disk, and has a recording capacity of more than 50 Gbyte at least. This is a significantly larger recording capacity than the second recording layer 152, which is compliant with conventional optical disk format specifications.

Here, when recording the same information at the same rate of compression onto the first recording layer 151 and the second recording layer 152, the data amount of the first recording layer 151 is determined in accordance with the recording capacity of the second recording layer 152. For example, in the case where the second recording layer 152 is compliant with the HD DVD format specifications, the data amount of the first recording layer 151 is determined to be 15 Gbyte or less. Or, in the case where the second recording layer 152 is compliant with the BD format specifications, the data amount of the first recording layer 151 is determined to be 25 Gbyte or less.

In the case where the second recording layer 152 is multi-layered, the data amount of the first recording layer 151 is determined in accordance with the recording capacity found by totaling the recording capacities of the layers. For example, in the case where the second recording layer 152 is dual-layer and compliant with the HD DVD format specifications, the data amount of the first recording layer 151 is determined to be above 15 Gbyte but not more than 30 Gbyte. Similarly, in the case where the second recording layer 152 has three layers, the data amount of the first recording layer 151 is determined to be above 30 Gbyte but not more than 45 Gbyte, whereas in the case where the second recording layer 152 has four layers, the data amount of the first recording layer 151 is determined to be above 45 Gbyte but not more than 60 Gbyte. In the case where the second recording layer 152 is dual-layer and compliant with the BD format specifications, the data amount of the first recording layer 151 is determined to be above 25 Gbyte but not more than 50 Gbyte.

However, when recording the same information at a different rate of compression onto the first recording layer 151 and the second recording layer 152, both the high-quality content according to the next-generation high-density optical disk and the slightly lower-quality content according to the conventional optical disk format specifications can be recorded onto a single optical disk. Therefore, a user who has an optical disk drive compliant only with recording/reproduction of conventional optical disks can utilize the content recorded onto an optical disk according to the present invention, and should the user obtain an optical disk drive compliant with format specifications of a next-generation high-density optical disk in the future, s/he can make use of the corresponding high-quality content without having to purchase a new optical disk.

Recording of the information as stated here is realized by an information supply system that supplies information and records the information onto the layers of an optical disk.

6. Miscellaneous

Figure 9:
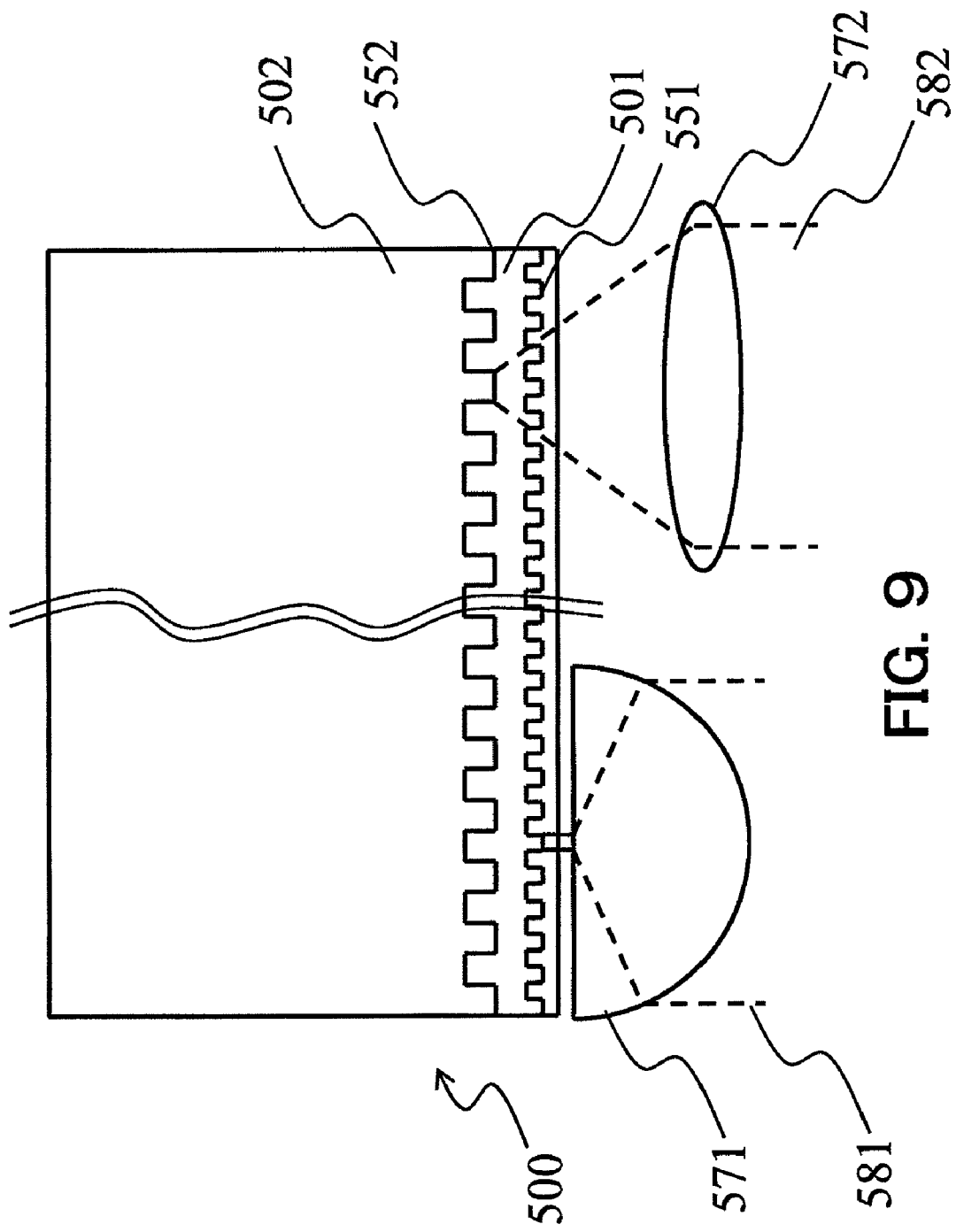
FIG. 9 is a diagram schematically illustrating a cross-section of an optical disk according to another embodiment of the present invention.
Figure 10:
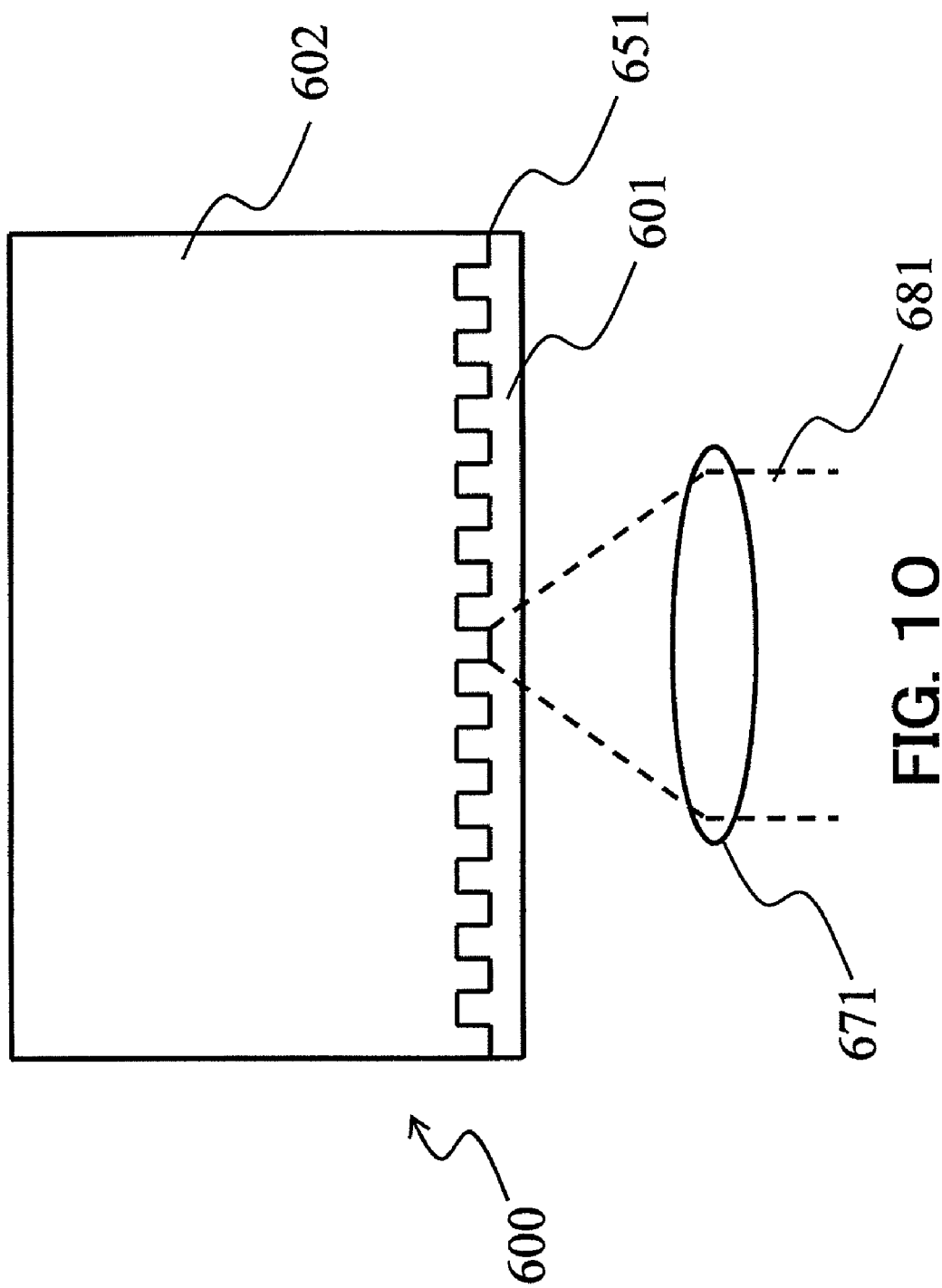
FIG. 10 is a diagram schematically illustrating a cross-section of an optical disk according to the BD format specifications.

It should be noted that a near-field light recording system is also capable of recording to or reproduction from a recording layer where the distance to the surface (laser light entrance surface) is approximately 1 μm to 10 μm. In the aforementioned first through fourth embodiments, descriptions were provided regarding a case where a first recording layer for recording or reproduction using a near-field light recording system is formed at the surface of an optical disk. However, it goes without saying that compatibility with a conventional optical disk, where the distance between a second recording layer 552 and the surface of the optical disk is 0.05 mm to 1.2 mm, or with a Super-RENS type optical disk, can be maintained even in the case where the distance between a first recording layer 551 and the surface of the optical disk is approximately 1 μm to 10 μm, as shown in FIG. 9.

Furthermore, in the first through fourth embodiments, the optical disk is configured so that all laser light enters the disk from one side of the disk, which makes it possible to form a label surface, for displaying information regarding the details of the optical disk and so on, on the surface of the disk opposite to the surface that is the laser light entrance surface. In this case, it is preferable for the thickness from the light entrance surface to the label surface to be in the range of 1.1 mm to 1.3 mm, and is even more preferable for the thickness to be 1.2 mm, so that compatibility with conventional optical disk drives can be maintained.

According to the optical disk of the first, second, and fourth embodiments of the present invention, for example, both the high-quality content according to a next-generation high-density optical disk and the corresponding slightly lower-quality content according to the format specifications of a conventional optical disk can be recorded onto a single optical disk. Therefore, a user who has an optical disk drive compliant only with recording/reproduction of conventional optical disks can utilize the content recorded onto an optical disk according to these embodiments, and should the user obtain an optical disk drive compliant with format specifications of a next-generation high-density optical disk in the future, s/he can make use of the corresponding high-quality content without having to purchase a new optical disk.

Moreover, according to the optical disc of the third embodiment of the present invention, when format specifications of differing next-generation high-density optical disks are present, both content compliant with the format specifications of a first next-generation high-density optical disk (for example, a near-field light recording system utilizing an SIL) and the corresponding content compliant with the format specifications of a second next-generation high-density optical disk (for example, the Super-RENS type) can be recorded onto a single optical disk. Therefore, even users who have an optical disk drive compatible with only one of the abovementioned format specifications can make use of the optical disk according to the third embodiment.

The supplier that supplies the content (information) can also record content compliant with a plurality of format specifications onto a single disk as well, which has an advantage in that it makes it possible to acquire more users. There is a further noteworthy effect that the shelf space for the optical disks can be reduced, making it possible to display more types of optical disks, and making it possible to reduce costs associated with distribution of the optical disks.

Other Features According to the Present Invention

1. Details of the Other Features 1.1. Feature 1

An optical disk that allows laser beam to enter from a specific entrance surface and reproduces information, comprising:

a first-type information recording layer for which the distance to the laser beam entrance surface is set in the range of 0.06 mm to 0.11 mm; and a second-type information recording layer for which the distance to the laser beam entrance surface is set in the range of 0.54 mm to 0.65 mm, wherein both the content and rate of compression of the information recorded onto the first-type information recording layer are the same as the content and the rate of compression of the amount of data recorded onto the second information recording layer.

1.2. Feature 2

The optical disk according to feature 1, wherein the amount of data recorded onto the first-type and second-type information recording layers is less than or equal to 15 Gbyte, and each of the first-type and the second-type information recording layers has only a single layer.

1.3. Feature 3

The optical disk according to feature 1, wherein the amount of data recorded onto the first-type and the second-type information recording layers is greater than 15 Gbyte but less than or equal to 25 Gbyte, the first-type information recording layer has only a single layer, and the second-type information recording layer has only two layers.

1.4. Feature 4

The optical disk according to feature 1, wherein the amount of data recorded onto the first-type and the second-type information recording layers is greater than 25 Gbyte but not greater than 30 Gbyte, and each of the first-type and the second-type information recording layers has only two layers.

1.5. Feature 5

The optical disk according to feature 1, wherein the amount of data recorded onto the first-type and the second-type information recording layers is greater than 30 Gbyte but not greater than 45 Gbyte, the first-type information recording layer has only two layers, and the second-type information recording layer has only three layers.

1.6. Feature 6

The optical disk according to feature 1, wherein the amount of data recorded onto the first-type and the second-type information recording layers is greater than 45 Gbyte but not greater than 50 Gbyte, the first-type information recording layer has only two layers, and the second-type information recording layer has only four layers.

1.7. Feature 7

An optical disk that allows laser beam to enter from a specific entrance surface and reproduces information, comprising:

a first-type information recording layer for which the distance to the laser beam entrance surface is set in the range of 0.06 mm to 0.11 mm; and a second-type information recording layer for which the distance to the laser beam entrance surface is set in the range of 0.54 mm to 0.65 mm, wherein the number of layers of the first-type information recording layer is the same as the number of layers of the second-type information recording layer;

in the case where the amount to be recorded can be contained in the first-type information recording layer but cannot be contained in the second-type information recording layer, information having the same content is recorded onto the first-type information recording layer and the second-type information recording layer by raising the rate of compression of the information recorded into the second-type recording layer higher than the rate of compression of the information recorded into the first-type recording layer.

1.8. Feature 8

The optical disk according to feature 7, wherein the number of layers of the first-type information recording layer and the number of layers of the second-type information recording layer are both 1;

the amount to be recorded onto the first-type recording layer is greater than 15 Gbyte but less than or equal to 25 Gbyte; and information having the same content is recorded onto the first-type information recording layer and the second-type information recording layer by raising the rate of compression of the information recorded into the second-type recording layer higher than the rate of compression of the information recorded into the first-type recording layer.

1.9. Feature 9

The optical disk according to feature 7, wherein the number of layers of the first-type information recording layer and the number of layers of the second-type information recording layer are both 2;

the amount to be recorded onto the first-type recording layer is greater than 30 Gbyte but less than or equal to 50 Gbyte; and information having the same content is recorded onto the first-type information recording layer and the second-type information recording layer by raising the rate of compression of the information recorded into the second-type recording layer higher than the rate of compression of the information recorded into the first-type recording layer.

1.10. Feature 10

An optical disk that allows laser beam to enter and reproduces information, comprising:

a first-type information recording layer for which the distance to a first light entrance surface is set in the range of 0.06 mm to 0.11 mm; and a second-type information recording layer for which the distance to a second light entrance surface on the opposite side of the first light entrance surface is set in the range of 0.54 mm to 0.65 mm, wherein a DVD recording layer is provided between the first-type information recording layer and the second-type information recording layer.

1.11. Feature 11

The optical disk according to feature 10, the optical disk allowing laser beam to enter and reproducing information, comprising:

a first-type information recording layer for which the distance to the first light entrance surface is set in the range of 0.06 mm to 0.11 mm; and a second-type information recording layer for which the distance to the second light entrance surface on the opposite side of the first light entrance surface is set in the range of 0.54 mm to 0.65 mm, wherein a first DVD recording layer and a second DVD recording layer are provided between the first-type information recording layer and the second-type information recording layer, the second DVD recording layer being an upside-down version of the first DVD recording layer.

1.12. Feature 12

The optical disk according to one of features 1 to 11, wherein the red light transmittance of the first-type information recording layer is higher than the blue light transmittance of the first-type information recording layer.

1.13. Feature 13

An optical disk that allows laser beam to enter and reproduces information, comprising:

a first-type information recording layer for which the distance to a first light entrance surface is set in the range of 0.06 mm to 0.11 mm; and a second-type information recording layer for which the distance to a second light entrance surface on the opposite side of the first light entrance surface is set in the range of 0.54 mm to 0.65 mm, wherein a label layer is provided between the first-type information recording layer and the second-type information recording layer.

1.14. Feature 14

The optical disk according to feature 13, wherein the transmittance of visible light of other wavelengths, of the first-type information recording layer or the second-type information recording layer is higher than the blue light transmittance of the first-type information recording layer or the second-type information recording layer.

1.15. Feature 15

An optical disk drive comprising:

an optical head device including a blue light source, a red light source, an objective lens that converges light emitted from the blue light source onto a first-type information recording layer of an optical disk, the optical disk having the first-type information recording layer for which the distance to the surface is set in the range of 0.06 mm to 0.11 mm, and a light detector that receives light reflected after being converged onto a recording layer of the optical disk by the objective lens and performs photoelectric conversion converting the received light into an electric signal;

a motor that rotates the optical disk; and an electric circuit that receives a signal obtained by the optical head device, and controls and drives the motor, optical lens, and laser beam sources based on the signal, wherein light is caused to be emitted from the blue light source provided in the optical head device upon an instruction for optical disk reproduction being outputted from the electric circuit;

the distance from the surface to an adjacent recording layer is measured;

in the case where it is determined that a reflective layer is present at a distance of approximately 0.1 mm from the surface, the optical disk is determined to be a first-type optical disk, a focus servo is applied to the recording layer thereof, and reproduction of the first-type optical disk is commenced;

in the case where it is determined that a reflective layer is not present at a distance of approximately 0.1 mm from the surface, light is caused to be emitted from the red light source, and the distance from the surface to an adjacent recording layer is measured; and in the case where it is determined that a reflective layer is present at a distance of approximately 0.6 mm from the surface, the optical disk is determined to be a DVD, a focus servo is applied to the recording layer thereof, and reproduction of the DVD is commenced.

1.16. Feature 16

A method for reproducing information for an optical disk drive, the device comprising:

an optical head device including a blue light source, a red light source, an objective lens that converges light emitted from the blue light source onto a first-type information recording layer of an optical disk, the optical disk having the first-type information recording layer for which the distance to the surface is set in the range of 0.06 mm to 0.11 mm, and a light detector that receives light reflected after being converged onto a recording layer of the optical disk by the objective lens and performs photoelectric conversion converting the received light into an electric signal;

a motor that rotates the optical disk; and an electric circuit that receives a signal obtained by the optical head device, and controls and drives the motor, optical lens, and laser beam sources based on the signal, and the method comprising:

causing light to be emitted from the blue light source provided in the optical head device upon an instruction for optical disk reproduction being outputted from the electric circuit;

measuring the distance from the surface to an adjacent recording layer;

in the case where it is determined that a reflective layer is present at a distance of approximately 0.1 mm from the surface, determining that the optical disk is a first-type optical disk, applying a focus servo to the recording layer thereof, and commencing reproduction of the first-type optical disk;

in the case where it is determined that a reflective layer is not present at a distance of approximately 0.1 mm from the surface, causing light to be emitted from the red light source, and measuring the distance from the surface to an adjacent recording layer; and in the case where it is determined that a reflective layer is present at a distance of approximately 0.6 mm from the surface, determining that the optical disk is a DVD, applying a focus servo to the recording layer thereof, and commencing reproduction of the DVD.

1.17. Feature 17

An optical disk drive comprising:

an optical head device including a blue light source, a red light source, an objective lens that converges light emitted from the blue light source onto a second-type information recording layer of an optical disk, the optical disk having the second-type information recording layer for which the distance to the surface is set in the range of 0.54 mm to 0.65 mm, and a light detector that receives light reflected after being converged onto a recording layer of the optical disk by the objective lens and performs photoelectric conversion converting the received light into an electric signal;

a motor that rotates the optical disk; and an electric circuit that receives a signal obtained by the optical head device, and controls and drives the motor, optical lens, and laser beam sources based on the signal, wherein light is caused to be emitted from the red light source provided in the optical head device upon an instruction for optical disk reproduction being outputted from the electric circuit;

the distance from the surface to an adjacent recording layer is measured; and in the case where it is determined that a reflective layer is present at a distance of approximately 0.6 mm from the surface, it is further determined whether or not that recording layer is a DVD recording layer based on a signal obtained from the optical head device, and information reproduction is commenced if it is determined that the recording layer is a DVD recording layer, whereas information reproduction is commenced after causing light to be emitted from the blue light source if it is determined that the recording layer is not a DVD recording layer.

1.18. Feature 18

A method for reproducing information for an optical disk drive, the optical disk drive comprising:

an optical head device including a blue light source, a red light source, an objective lens that converges light emitted from the blue light source onto a second-type information recording layer of an optical disk, the optical disk having the second-type information recording layer for which the distance to the surface is set in the range of 0.54 mm to 0.65 mm, and a light detector that receives light reflected after being converged onto a recording layer of the optical disk by the objective lens and performs photoelectric conversion converting the received light into an electric signal;

a motor that rotates the optical disk; and an electric circuit that receives a signal obtained by the optical head device, and controls and drives the motor, optical lens, and laser beam sources based on the signal, the method comprising:

causing light to be emitted from the red light source provided in the optical head device upon an instruction for optical disk reproduction being outputted from the electric circuit;

measuring the distance from the surface to an adjacent recording layer; and in the case where it is determined that a reflective layer is present at a distance of approximately 0.6 mm from the surface, further determining whether or not that recording layer is a DVD recording layer based on a signal obtained from the optical head device, and commencing information reproduction if it is determined that the recording layer is a DVD recording layer, but commencing information reproduction after causing light to be emitted from the blue light source if it is determined that the recording layer is not a DVD recording layer.

1.19. Feature 19

A computer comprising:

the optical disk drive according to feature 15 or 17;

an input device or input terminal for inputting information;

a computation device that performs computation based on information inputted from the input device, information reproduced by the optical disk drive, and the like; and an output device or output terminal for displaying or outputting the information inputted from the input device, information reproduced by the optical disk drive, the results of the computation performed by the computation device, and the like.

1.20. Feature 20

An optical disk player comprising:

the optical disk drive according to feature 15 or 17; and a data-to-image decoder that converts a data signal obtained from the optical disk drive into an image.

1.21. Feature 21

A car navigation system comprising:
the optical disk drive according to feature 15 or 17; and
a data-to-image decoder that converts a data signal obtained from the optical disk drive into an image, and a positional sensor.

1.22. Feature 22

An optical disk recorder comprising:
the optical disk drive according to feature 15 or 17; and
an image-to-data encoder that converts image data into data to be recorded by the optical disk drive.

1.23. Feature 23

A vehicle comprising the optical disk drive according to feature 15 or 17, a vehicle body in which the optical disk drive is installed, and a power generation portion for generating power to move the vehicle body.

1.24. Feature 24

An optical information device comprising the optical disk drive according to feature 15 or 17, and an arithmetic circuit configured to perform an arithmetic operation on or convert information retrieved by the optical disk drive.

2. Descriptions of the Features

Digital Versatile Disks (DVDs) are known as optical disks capable of recording a large amount of data, recording digital information at a recording density of approximately six times that of Compact Disks (CDs). In recent years, a rise in the amount of information to be recorded to optical disks has led to demand for disks with even higher capacity. In order to provide an optical disk with high capacity, it is necessary to increase the information recording density by reducing the size of a beam spot formed by light irradiated onto the optical disk when recording information onto the optical disk and when reproducing information that has been recorded onto the optical disk. The size of the beam spot can be reduced by shortening the wavelength of the laser beam from the light source and increasing the numerical aperture (NA) of the objective lens. DVD uses a light source with a wavelength of 660 nm (red light) and an objective lens with a numerical aperture (NA) of 0.6. Furthermore, BD (Blu-ray Disc), which is already on the market, achieves a recording density five times that of present DVDs by using a blue laser with a wavelength of approximately 405 nm and an objective lens with a NA of 0.85. HD DVD is another example of an optical disk already on the market that uses a blue laser; HD DVD, however, uses an objective lens with a NA of 0.65.

A DVD is an optical disk having a transparent substrate approximately 0.6 mm in thickness, with a single-layer storage capacity of approximately 4.7 Gbyte. The laser beam used for recording or reproduction of a DVD has a wavelength of approximately 660 nm, and the numerical aperture NA of the objective lens is 0.60. In a DVD, two 0.6 mm transparent substrates are layered together, and thus the total thickness of the optical disk is 1.2 mm, or the same as a CD.

A BD is an optical disk having a transparent substrate approximately 0.1 mm in thickness, with a storage capacity of approximately 25 Gbyte per layer. The laser beam used for recording or reproduction of a BD has a wavelength of approximately 405 nm, and the numerical aperture NA of the objective lens is 0.85. A BD has a recording layer provided on a 1.1 mm-thick disk substrate, with a 0.1 mm-thick transparent cover layer affixed so as to cover the recording layer; thus the total thickness of the optical disk is 1.2 mm, or the same as a CD. Recording or reproduction is performed by using an objective lens having a numerical aperture NA of 0.85 to condense blue laser beam onto the recording layer from the side of the 0.1 mm transparent cover layer. With BDs, an increase in coma aberration caused by using short-wavelength laser beam and a high-NA objective lens is suppressed by reducing the thickness of the transparent cover layer, through which the laser beam passes, to approximately 0.1 mm.

Meanwhile, an HD DVD is an optical disk having a single-layer storage capacity of approximately 15 Gbyte, for which the numerical aperture NA of the objective lens is 0.65. Like DVDs, two 0.6 mm transparent substrates are layered together, and thus the total thickness of the optical disk is 1.2 mm, or the same as a CD.

There are three types in each of these optical disk formats: a read-only type, using prepits as the recording layer; a write once, read many type, using a pigment film as the recording layer, and capable of being written to only once; and finally, a rewriteable type, which uses a phase-change film as the recording layer.

Figure 11:
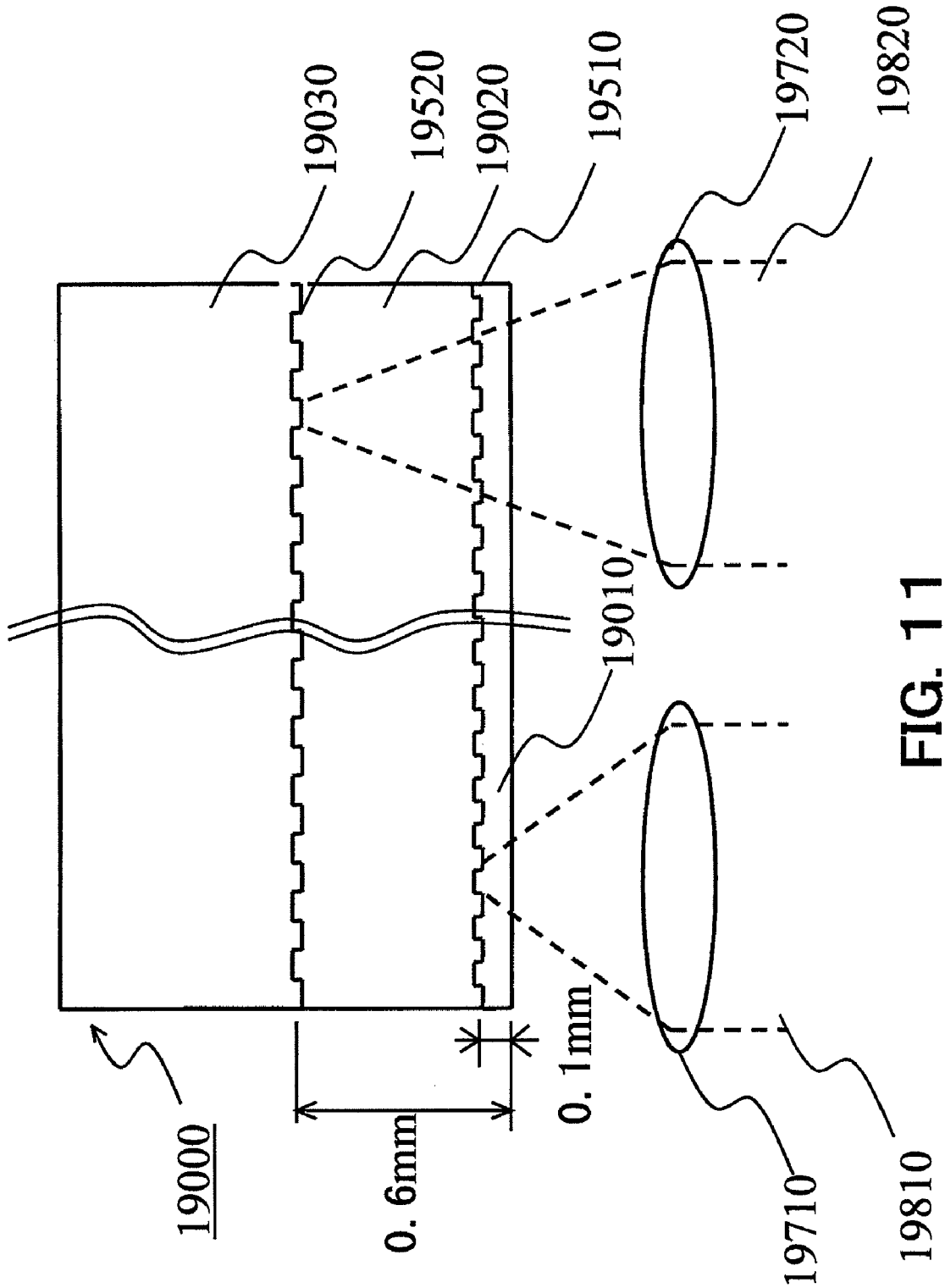
FIG. 11 is a diagram schematically illustrating a cross-section of an optical disk compatible with the BD format specifications and the HD DVD format specifications.

As described thus far, optical disks, at present, include DVDs, BDs, and HD DVDs, each having a different configuration. Optical disk configurations that aim to ensure compatibility between optical disk types, such as, for example, between BD and HD DVD, have been disclosed in JP2006-196039A and Published U.S. Patent Application No. 2006/0179448 (FIG. 11).

Furthermore, an optical disk having a BD formed on one side and an HD DVD formed on the other side has been disclosed in JP2006-236509A.

Conventional optical disks such as these, which are provided with both BD and HD DVD recording layers, have been provided.

Incidentally, one of the advantages expected from an optical disk provided with both recording layers is that both a BD reproduction device and an HD DVD reproduction device will be capable of reproducing information having the same content.

However, the conventional technology has not indicated a specific configuration capable of recording the same information onto both a BD recording layer and an HD DVD recording layer. With a read-only disk, the capacity of a single BD recording layer is 25 Gbyte. However, the capacity of an HD DVD recording layer is only 15 Gbyte. For this reason, there is a problem in that the recording capacities for BDs and HD DVDs differ, and all of the information to be stored in the BD layer may not be able to be stored in the HD DVD layer, depending on the amount of information to be stored in the BD layer.

Furthermore, when an optical disk provided with both BD and HD DVD recording layers goes on the market, there is no indication as to what procedure a BD reproduction device and an HD DVD reproduction device can use to identify an optical disk and perform information reproduction starting with focal control in order to start information reproduction in an efficient manner, and thus there is another problem in that information reproduction may not be possible for a short time.

In order to solve the problems with the conventional art, inventions according to the features are configured as described above. According to this configuration, it is possible to write exactly the same information onto an optical disk provided with the recording layers according to two types of optical disks mentioned hereinafter, and possible to reproduce the same information using either type of reproduction device. Here, the two types of optical disks include a first-type optical disk, such as a BD, having a transparent substrate approximately 0.1 mm thick through which laser beam with a wavelength of approximately 405 nm used for recording or reproduction is passed, and the objective lens used therein having a numerical aperture NA of 0.85; and a second-type optical disk, such as an HD DVD, having a transparent substrate approximately 0.6 mm thick through which laser beam with a wavelength of approximately 405 nm used for recording or reproduction is passed, and the objective lens used therein having a numerical aperture NA of 0.65.

Moreover, reproduction of information can be commenced in a short amount of time through the optical disk determination method of the abovementioned features.

Furthermore, by writing exactly the same information to the respective recording layers of an optical disk provided with recording layers of both the first-type optical disk and second-type optical disk according to the abovementioned features and selling such an optical disk, when selling a single content, a single optical disk may be manufactured and sold to customers who have reproduction devices for each of the types of optical disks rather than preparing separate disks. This makes it possible to reduce shipping costs and display spaces to the bare minimum. On top of this, there is an effect in that customers can purchase the optical disk with confidence regardless of what reproduction device they own.

3. Embodiments According to the Features

Hereinafter, embodiments according to the features shall be described with reference to the diagrams.

3.1. First Embodiment According to the Features

Figure 14:
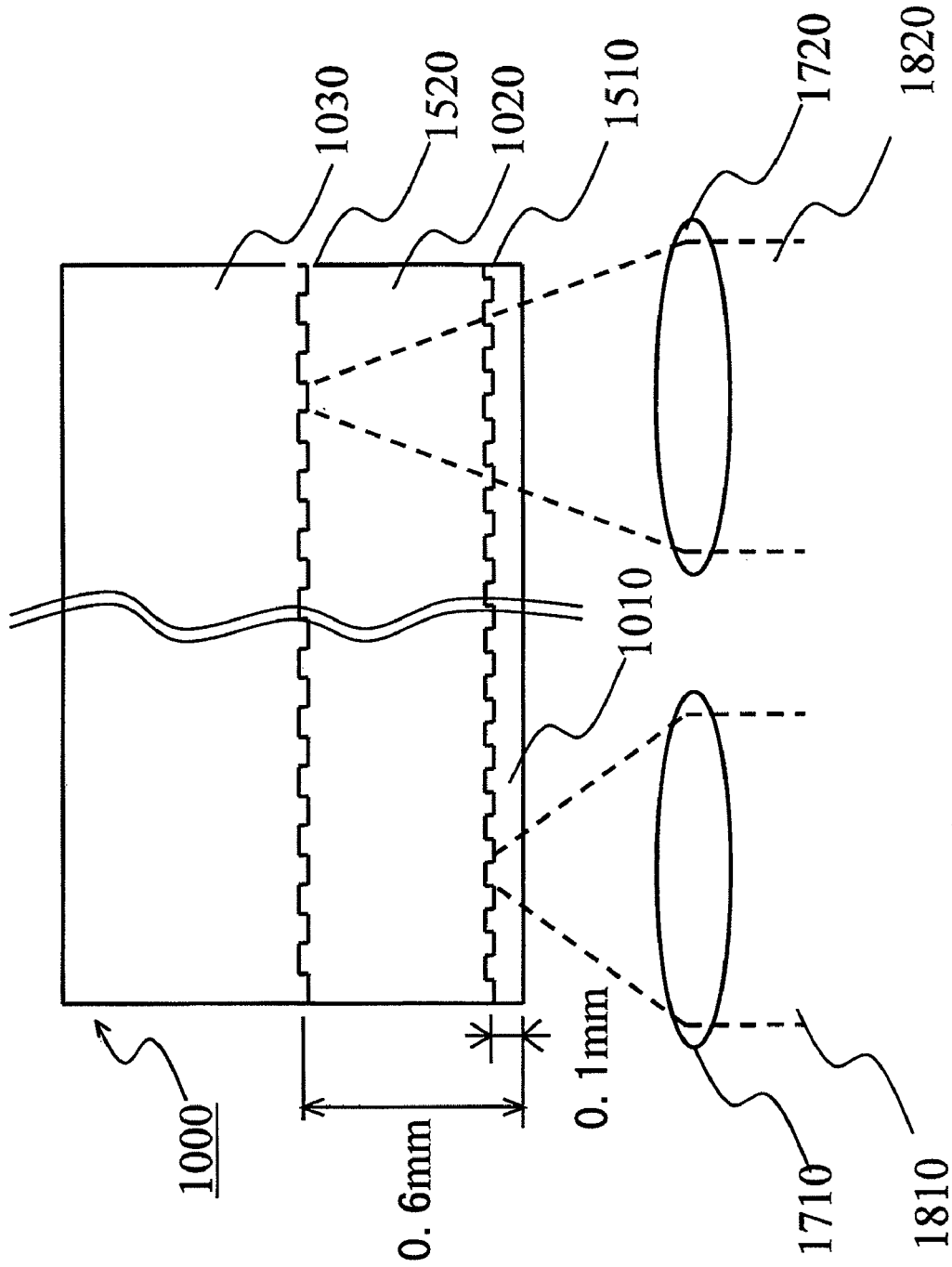
FIG. 14 is a diagram schematically illustrating a cross-section of an optical disk in a first embodiment according to the features.

FIG. 14 is a diagram schematically illustrating a cross-section of an optical disk in a first embodiment according to the features.

A first optical disk 1000 has a configuration in which a first transparent substrate 1010, a first recording layer 1510, a second transparent substrate 1020, a second recording layer 1520, and a third transparent substrate 1030 are laminated together, in order starting with the bottom surface of the disk, as shown in FIG. 14.

Here, the first recording layer 1510 is reproduced by condensing blue laser beam 1810 onto the recording layer through the first transparent substrate, which is in the range of 0.06 to 0.11 mm (hereinafter denoted as 0.1 mm), using an objective lens 1710 having a numerical aperture NA of 0.85. Here, the blue laser beam 1810 is irradiated from the bottom surface shown in the diagram. The first recording layer 1510 has a pitted pattern according to the first-type optical disk, and the recording capacity thereof is approximately 25 Gbyte per layer for a disk approximately 12 cm in diameter.

On the other hand, the second recording layer 1520 is brought to reproduction by condensing blue laser beam 1820 onto the recording layer through the first transparent substrate, which is approximately 0.1 mm, and the second transparent substrate, which is approximately 0.5 mm, or in other words, through a transparent substrate with a total thickness in the range of 0.54 mm to 0.65 mm (hereinafter denoted as 0.6 mm), using an objective lens 1720 having a numerical aperture NA of 0.65. Here, again, the blue laser beam 1820 is irradiated from the bottom surface shown in the diagram. The second recording layer 1520 has a pitted pattern according to the second-type optical disk, and the recording capacity thereof is approximately 15 Gbyte per layer for a disk approximately 12 cm in diameter.

No more than 15 Gbyte of information is recorded to an optical disk configured in this manner. Because up to 15 Gbyte of information can be recorded to the second recording layer according to the second-type optical disk, which has a small capacity, the exact same information can be recorded onto the first recording layer and the second recording layer. The data amount is determined based on the content and the rate of compression. The data amount is the same if the same content is compressed at the same rate of compression. For example, in the case where the data amount obtained when one hour's worth of high-definition video content is compressed at a certain rate of compression is 15 Gbyte, a capacity of 15 Gbyte is required. Even if the content is the same, the amount of data will change if the rate of compression is changed, and thus the quality of the content obtained by decompressing that information will differ. Generally speaking, better-quality content will be obtained after decompression the lower the rate of compression and the higher the data amount of the content is.

It should be noted that the 15 Gbyte upper limit of the recording capacity is determined by the capacity of the second recording layer, and thus the upper limit for information that can be recorded to an optical disk having this configuration can be increased in accordance with the capacity of the second recording layer if the capacity of the second recording layer can be increased to, for example, 17 Gbyte and so on through improvements in the manufacturing precision of the optical disk, the information reproduction device, and so on.

Note that details regarding the information can be displayed in an easy-to-understand manner by printing pictures or characters regarding the content of the information on the top side of the third transparent substrate 1030 in FIG. 14, or in other words, on the top surface.

3.2. Second Embodiment According to the Features

Figure 15:
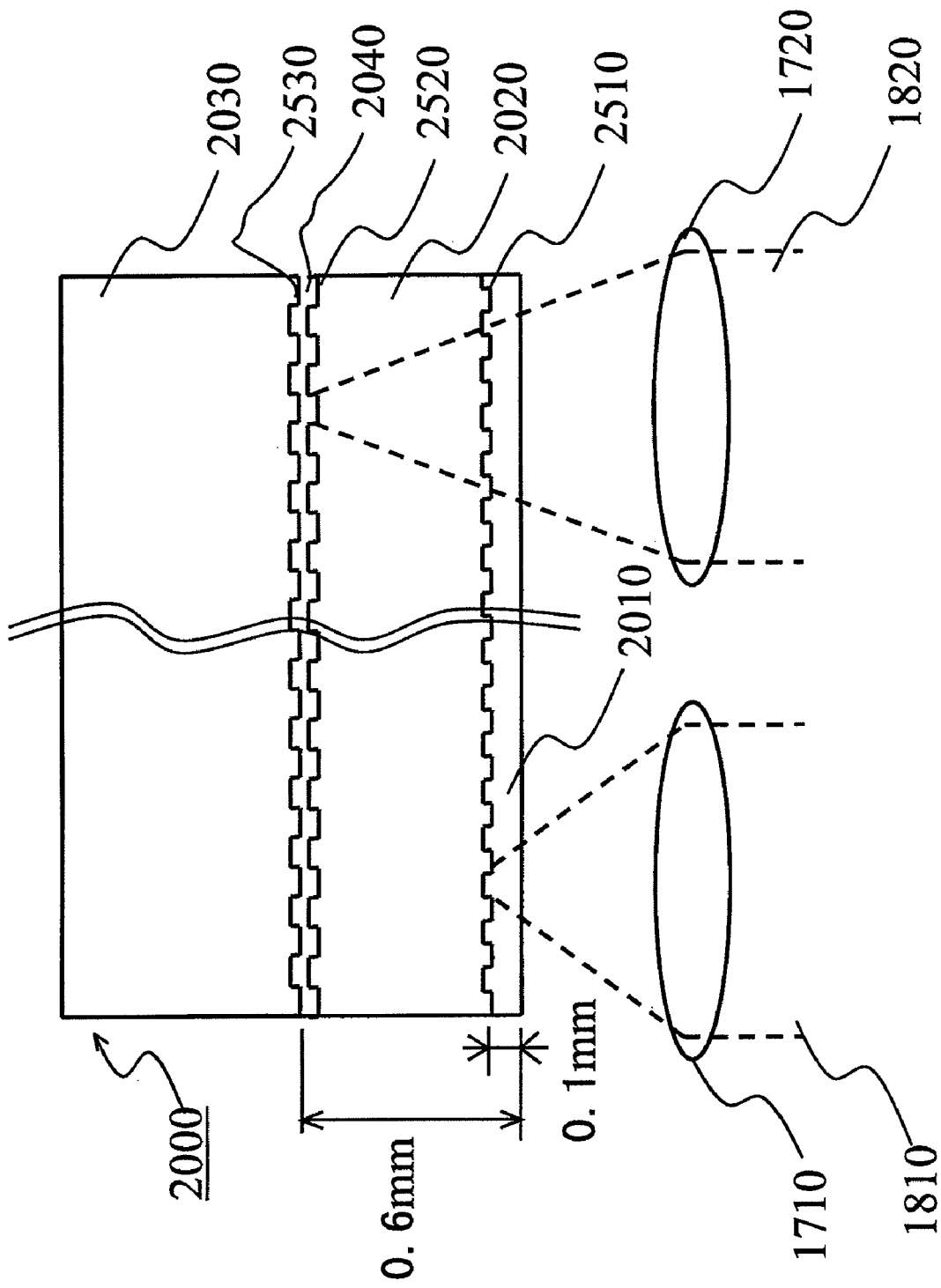
FIG. 15 is a diagram schematically illustrating a cross-section of an optical disk in a second embodiment according to the features.

FIG. 15 is a diagram schematically illustrating a cross-section of an optical disk in a second embodiment according to the features.

A second optical disk 2000 has a configuration in which a first transparent substrate 2010, a first recording layer 2510, a second transparent substrate 2020, a second recording layer 2520, an intermediate layer 2040, a third recording layer 2530, and a third transparent substrate 2030 are laminated together, in order starting with the bottom surface of the disk, as shown in FIG. 15.

Here, the first recording layer 2510 is brought to reproduction by condensing blue laser beam 1810 onto the recording layer through the first transparent substrate, which has a thickness of 0.1 mm, using an objective lens 1710 having a numerical aperture NA of 0.85. The first recording layer 2510 has a first-type optical disk pitted pattern.

The recording capacity of the first recording layer 2510 is approximately 25 Gbyte per layer for a disk approximately 12 cm in diameter.

On the other hand, the second recording layer 2520 and third recording layer 2530 are brought to reproduction by condensing blue laser beam 1820 onto the recording layers through the first transparent substrate, which is 0.1 mm, and the second transparent substrate, which is 0.49 mm, or further through the intermediate layer, using an objective lens 1720 having a numerical aperture NA of 0.65. The second recording layer 2520 has a second-type optical disk pitted pattern. The recording capacity of the recording layers is approximately 15 Gbyte per layer for a disk approximately 12 cm in diameter.

An optical disk according to this configuration is employed when the data amount is not less than 15 Gbyte or exceeds the recording capacity per layer of a second-type optical disk. Data of an amount no greater than 25 Gbyte or up to the recording capacity per layer of a first-type optical disk is recorded to this optical disk. Because up to 25 Gbyte of information can be recorded to the recording layer according to the first-type optical disk, which has a small storage capacity, the exact same information can be recorded onto the first-type optical disk recording layer and the second-type optical disk recording layer.

It should be noted that the 25 Gbyte upper limit of the recording capacity is determined by the capacity of the first recording layer, and thus the upper limit for information that can be recorded to an optical disk having this configuration can be increased in accordance with the capacity of the first recording layer if the capacity of the first recording layer can be increased to, for example, 27 Gbyte and so on through improvements in the manufacturing precision of the optical disk, the information reproduction device, and so on.

Note that details regarding the information can be displayed in an easy-to-understand manner by printing pictures or characters regarding the content of the information on the top side of the third transparent substrate 2030 in FIG. 15, or in other words, on the top surface.

3.3. Third Embodiment According to the Features

Figure 16:
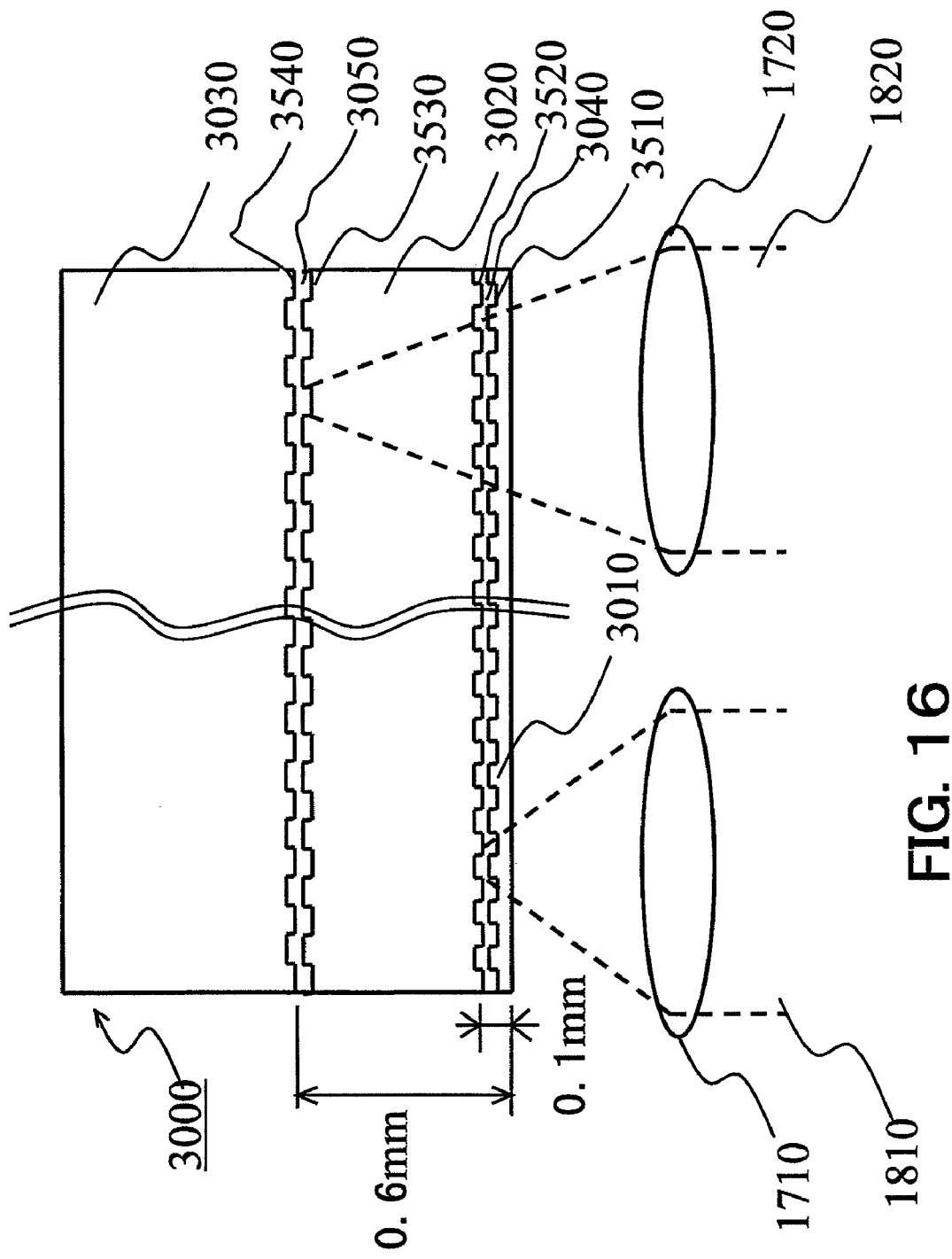
FIG. 16 is a diagram schematically illustrating a cross-section of an optical disk in a third embodiment according to the features.

FIG. 16 is a diagram schematically illustrating a cross-section of an optical disk in a third embodiment according to the features.

A third optical disk 3000 has a configuration in which a first transparent substrate 3010, a first recording layer 3510, a first intermediate layer 3040, a second recording layer 3520, a second transparent substrate 3020, a third recording layer 3530, a second intermediate layer 3050, a fourth recording layer 3540, and a third transparent substrate 3030 are laminated together, in order starting with the bottom surface of the disk, as shown in FIG. 16.

Here, the first recording layer 3510 and second recording layer 3520 are brought to reproduction by condensing blue laser beam 1810 onto the recording layers through the first transparent substrate, which is 0.075 mm, or further through the intermediate layer, using an objective lens 1710 having a numerical aperture NA of 0.85. The recording layers have a first-type optical disk pitted pattern.

The recording capacity of the recording layers is approximately 25 Gbyte per layer for a disk approximately 12 cm in diameter.

On the other hand, the third recording layer 3530 and fourth recording layer 3540 are brought to reproduction by condensing blue laser beam 1820 onto the recording layers through the first transparent substrate, which is 0.075 mm, the first intermediate layer, which is 0.025 mm, and the second transparent substrate, which is 0.49 mm, or further through the intermediate layer, using an objective lens 1720 having a numerical aperture NA of 0.65. The recording layers have a second-type optical disk pitted pattern. The recording capacity of the recording layers is approximately 15 Gbyte per layer for a disk approximately 12 cm in diameter.

An optical disk according to this configuration is employed when the data amount is not less than 25 Gbyte or exceeds the recording capacity per layer of a first-type optical disk. Data of an amount no greater than 30 Gbyte or up to twice the recording capacity per layer of a second-type optical disk is recorded to this optical disk. Because up to 30 Gbyte of information can be recorded to the recording layer according to the second-type optical disk, which has a small storage capacity, the exact same information can be recorded onto the first-type optical disk recording layer and the second-type optical disk recording layer.

It should be noted that the 30 Gbyte upper limit of the recording capacity is determined by the capacity of the third and fourth recording layers, and thus the upper limit for information that can be recorded to an optical disk having this configuration can be increased to 34 Gbyte in accordance with the total capacity of these layers if the capacities of the third and fourth recording layers can each be increased to, for example, 17 Gbyte, for a total of 34 Gbyte, through improvements in the manufacturing precision of the optical disk, the information reproduction device, and so on.

Note that details regarding the information can be displayed in an easy-to-understand manner by printing pictures or characters regarding the content of the information on the top side of the third transparent substrate 3030 in FIG. 16, or in other words, on the top surface.

3.4. Fourth Embodiment According to the Features

Figure 17:
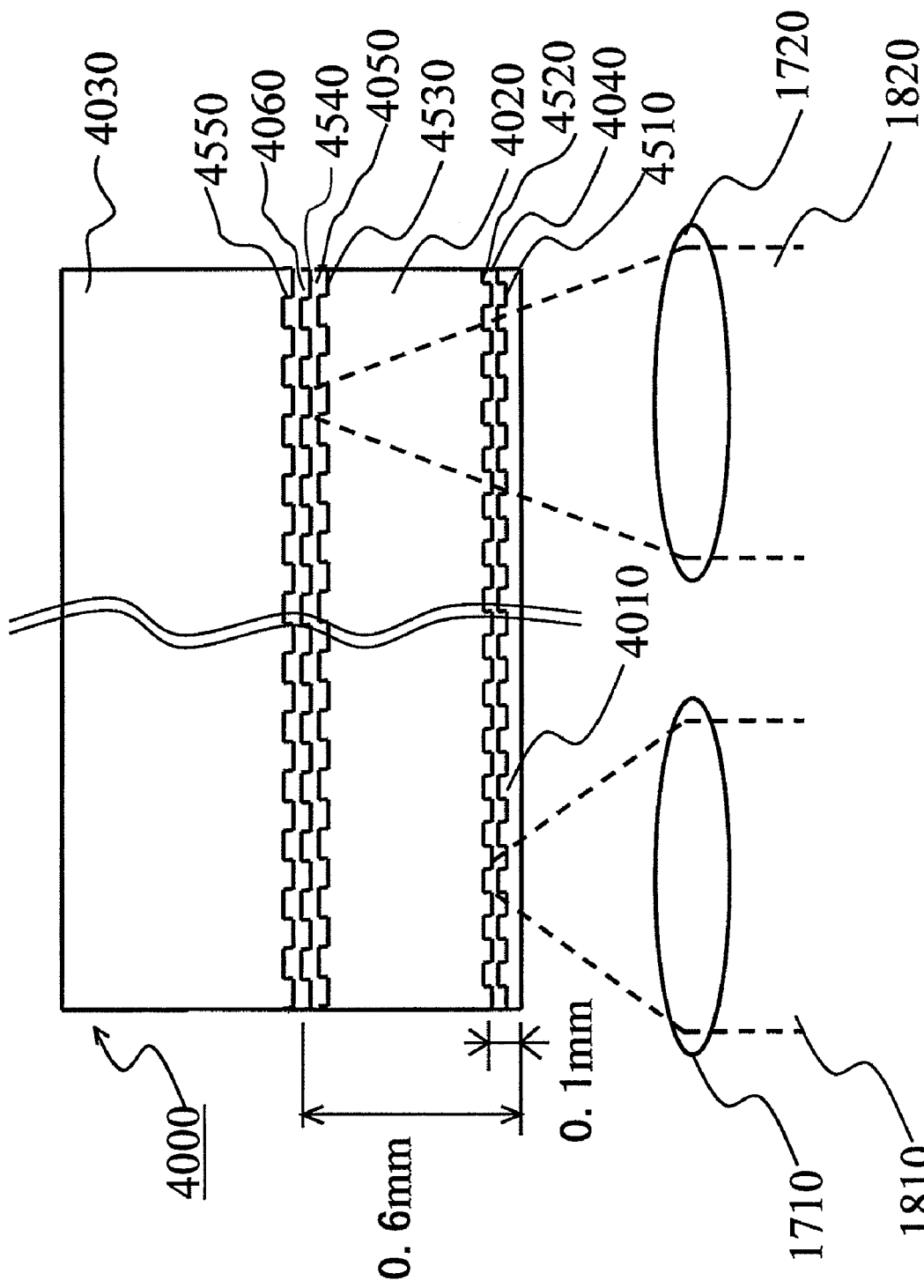
FIG. 17 is a diagram schematically illustrating a cross-section of an optical disk in a fourth embodiment according to the features.

FIG. 17 is a diagram schematically illustrating a cross-section of an optical disk in a fourth embodiment according to the features.

A fourth optical disk 4000 has a configuration in which a first transparent substrate 4010, a first recording layer 4510, a first intermediate layer 4040, a second recording layer 4520, a second transparent substrate 4020, a third recording layer 4530, a second intermediate layer 4050, a fourth recording layer 4540, a third intermediate layer 4060, a fifth recording layer 4550, and a third transparent substrate 4030 are laminated together, in order starting with the bottom surface of the disk, as shown in FIG. 17.

Here, the first recording layer 4510 and second recording layer 4520 are brought to reproduction by condensing blue laser beam 1810 onto the recording layers through the first transparent substrate, which is 0.075 mm, or further through the intermediate layer, using an objective lens 1710 having a numerical aperture NA of 0.85. The recording layers have a first-type optical disk pitted pattern.

The recording capacity of the recording layers is approximately 25 Gbyte per layer for a disk approximately 12 cm in diameter.

However, the third recording layer 4530, fourth recording layer 4540, and fifth recording layer 4550 are brought to reproduction by condensing blue laser beam 1820 onto the recording layers through the first transparent substrate, which is 0.075 mm, the intermediate layer, and the second transparent substrate, which is approximately 0.47 mm, or further through the intermediate layer, using an objective lens 1720 having a numerical aperture NA of 0.65. The recording layers have a second-type optical disk pitted pattern. The recording capacity of the recording layers is approximately 15 Gbyte per layer for a disk 12 cm in diameter.

An optical disk according to this configuration is employed when the data amount is not less than 30 Gbyte or exceeds twice the recording capacity per layer of a second-type optical disk. Data of an amount no greater than 45 Gbyte or up to three times the recording capacity per layer of a second-type optical disk is recorded to this optical disk. Because up to 45 Gbyte of information can be recorded to the recording layer according to the second-type optical disk, which has a small storage capacity, the exact same information can be recorded onto the first-type optical disk recording layer and the second-type optical disk recording layer.

It should be noted that the 45 Gbyte upper limit of the recording capacity is determined by the capacity of the third, fourth, and fifth recording layers, and thus the upper limit for information that can be recorded to an optical disk having this configuration can be increased to 51 Gbyte in accordance with the total capacity of these recording layers if the capacity of the third, fourth, and fifth recording layers can be increased to, for example, 17 Gbyte, for a total of 51 Gbyte, through improvements in the manufacturing precision of the optical disk, the information reproduction device, and so on. In the case where the capacity is increased to 50 Gbyte or more, the first recording layer and second recording layer according to the first-type optical disk are recorded to at a recording density higher than 25 Gbyte per layer of a standard 12 cm disk.

Note that details regarding the information can be displayed in an easy-to-understand manner by printing pictures or characters regarding the content of the information on the top side of the third transparent substrate 4030 in FIG. 4, or in other words, on the top surface.

3.5. Fifth Embodiment According to the Features

Figure 18:
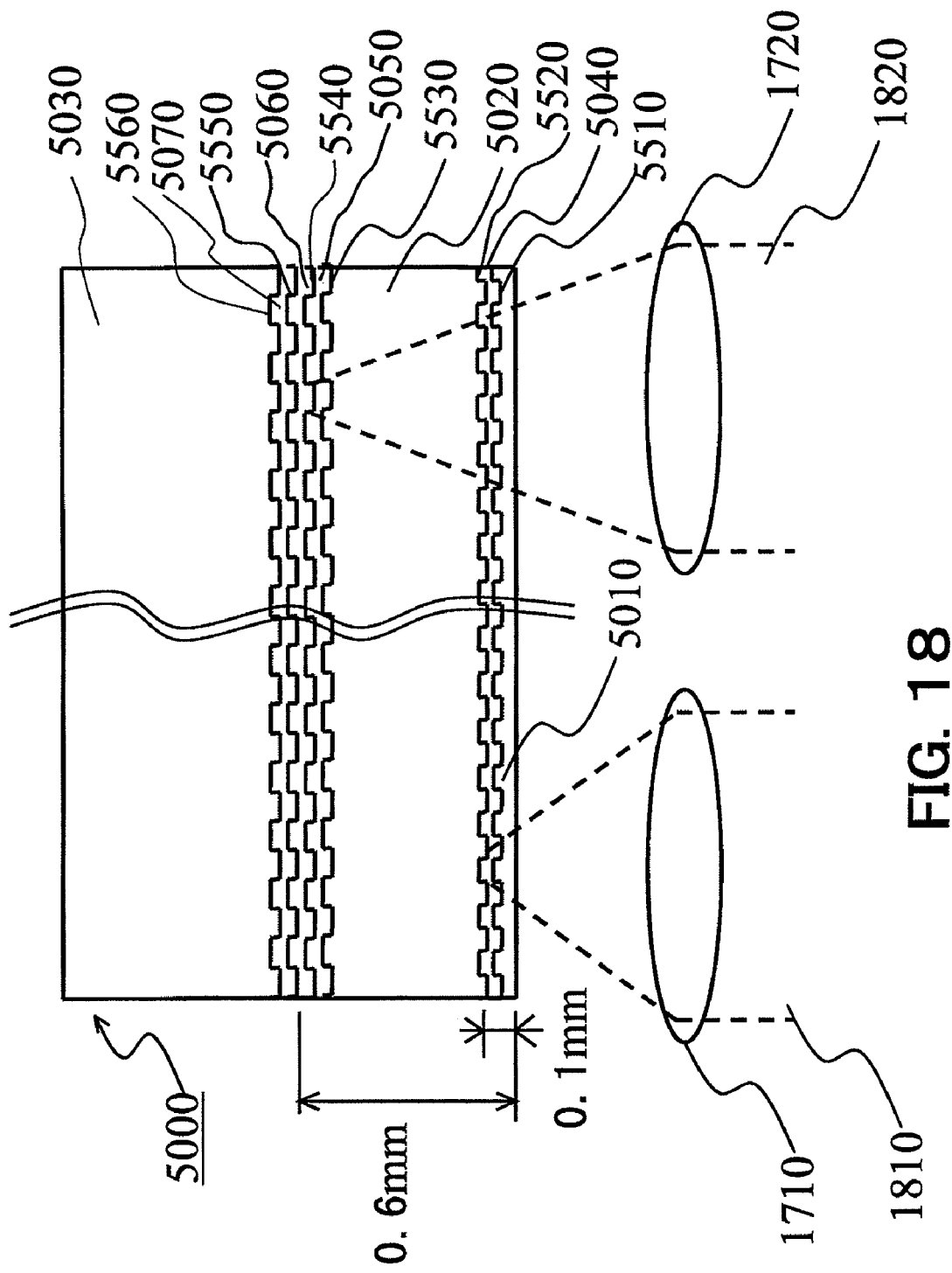
FIG. 18 is a diagram schematically illustrating a cross-section of an optical disk in a fifth embodiment according to the features.

FIG. 18 is a diagram schematically illustrating a cross-section of an optical disk in a fifth embodiment according to the features.

A fifth optical disk 5000 has a configuration in which a first transparent substrate 5010, a first recording layer 5510, a first intermediate layer 5040, a second recording layer 5520, a second transparent substrate 5020, a third recording layer 5530, a second intermediate layer 5050, a fourth recording layer 5540, a third intermediate layer 5060, a fifth recording layer 5550, a fourth intermediate layer 5070, a fifth recording layer 5560, and a third transparent substrate 5030 are laminated together, in order starting with the bottom surface of the disk, as shown in FIG. 18.

Here, the first recording layer 5510 and second recording layer 5520 are brought to reproduction by condensing blue laser beam 1810 onto the recording layers through the first transparent substrate, which is 0.075 mm, or further through the intermediate layer, using an objective lens 1710 having a numerical aperture NA of 0.85. The recording layers have a first-type optical disk pitted pattern.

The recording capacity of the recording layers is approximately 25 Gbyte per layer for a disk approximately 12 cm in diameter.

On the other hand, the third recording layer 5530, fourth recording layer 5540, fifth recording layer 5550, and fifth recording layer 5560 are brought to reproduction by condensing blue laser beam 1820 onto the recording layers through the first transparent substrate, which is 0.075 mm, the intermediate layer, which is 0.025 mm, and the second transparent substrate, which is about 0.46 mm, or further through the intermediate layer, using an objective lens 1720 having a numerical aperture NA of 0.65. The recording layers have a second-type optical disk pitted pattern. The recording capacity of the recording layers is approximately 15 Gbyte per layer for a disk approximately 12 cm in diameter.

An optical disk according to this configuration is employed when the data amount is no less than 45 Gbyte or exceeds three times the recording capacity per layer of a second-type optical disk. Data of an amount no greater than 50 Gbyte or up to twice the recording capacity per layer of a first-type optical disk is recorded to this optical disk. Because up to 50 Gbyte of information can be recorded to the recording layer according to the first-type optical disk, which has a small total storage capacity, the exact same information can be recorded onto the first-type optical disk recording layer and the second-type optical disk recording layer.

It should be noted that the 50 Gbyte upper limit of the recording capacity is determined by the capacity of the first and second recording layers, and thus the upper limit for information that can be recorded to an optical disk having this configuration can be increased to 54 Gbyte in accordance with the capacity of these recording layers if the capacity of the first and second recording layers can be increased to, for example, 27 Gbyte, for a total of 54 Gbyte, through improvements in the manufacturing precision of the optical disk, the information reproduction device, and so on.

Note that details regarding the information can be displayed in an easy-to-understand manner by printing pictures or characters regarding the content of the information on the top side of the third transparent substrate 5030 in FIG. 18, or in other words, on the top surface.

3.6. Sixth Embodiment According to the Features

Figure 19:
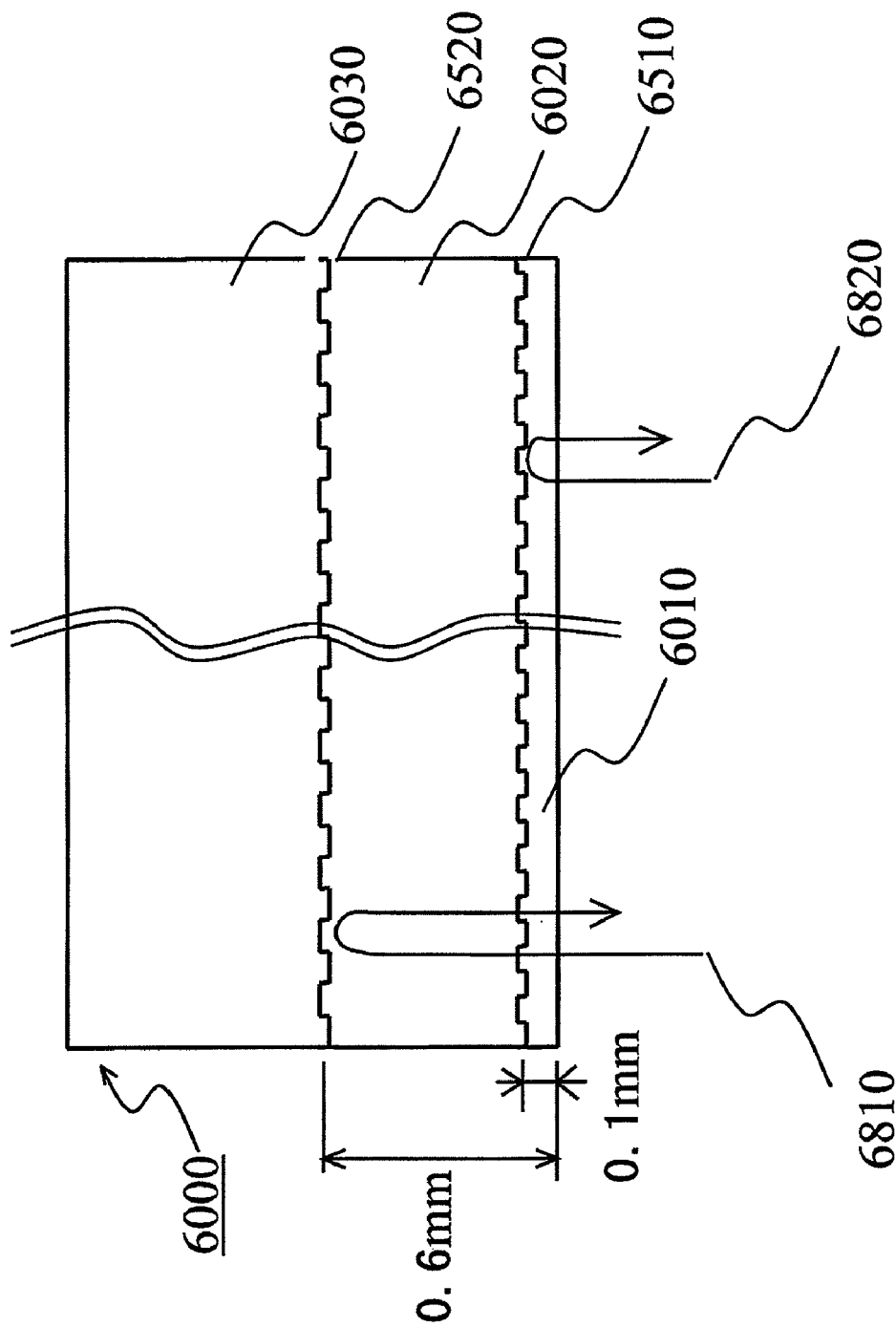
FIG. 19 is a diagram schematically illustrating a cross-section of an optical disk in a sixth embodiment according to the features.

FIG. 19 is a diagram schematically illustrating a cross-section of an optical disk in a sixth embodiment according to the features.

A sixth optical disk 6000 has a configuration in which a first transparent substrate 6010, a first recording layer 6510, a second transparent substrate 6020, a second recording layer 6520, and a third transparent substrate 6030 are laminated together, in order starting with the bottom surface of the disk, as shown in FIG. 19.

Here, the first recording layer 6510 is brought to reproduction by condensing blue laser beam onto the recording layer through the first transparent substrate, which is 0.1 mm, using an objective lens having a numerical aperture NA of 0.85. The recording layer has a first-type optical disk pitted pattern.

The recording capacity of the recording layer is approximately 25 Gbyte per layer for a disk 12 cm in diameter.

On the other hand, the second recording layer 6520 is brought to reproduction by condensing blue laser beam onto the recording layer through the first transparent substrate, which is 0.1 mm, and the second transparent substrate, which is 0.5 mm, using an objective lens having a numerical aperture NA of 0.65. The recording layer has a second-type optical disk pitted pattern. The recording capacity of the recording layer is approximately 15 Gbyte per layer for a disk approximately 12 cm in diameter.

An optical disk according to this configuration is configured for when the data amount is no less than 17 Gbyte or exceeds the recording capacity per layer of a second-type optical disk. Data of an amount no greater than 25 Gbyte or up to the recording capacity per layer of a first-type optical disk is recorded to this optical disk. The data will not fit into the layer according to the second-type optical disk, and thus is recorded with a higher rate of compression than for the first-type optical disk. The video, audio, and so on of the same content is recorded even though the quality will be slightly less than that of the first-type optical disk when the content is reproduced.

While the exact same information cannot be recorded onto both the first-type optical disk recording layer and the second-type optical disk recording layer, this nevertheless allows a customer to enjoy what is essentially the same content and also makes it easier to produce the disks.

It should be noted that the 25 Gbyte upper limit of the recording capacity is determined by the capacity of the first recording layer, and thus the upper limit for information that can be recorded to an optical disk having this configuration can be increased to 27 Gbyte in accordance with this capacity if the capacity of the first recording layer can be increased to, for example, 27 Gbyte and so on through improvements in the manufacturing precision of the optical disk, the information reproduction device, and so on.

Note that details regarding the information can be displayed in an easy-to-understand manner by printing pictures or characters regarding the content of the information on the top side of the third transparent substrate 6030 in FIG. 19, or in other words, on the top surface.

The first recording layer 6510, serving as the first-type optical disk recording layer, may be provided with wavelength properties. For example, a reflective film may be formed on the first recording layer 6510, the reflective film having a property whereby it has a high transmittance when red light 6810 is irradiated but partially reflects blue light 6820 when this blue light is irradiated. Accordingly, reflected light resulting from the first-type optical disk recording light can be obtained when reproducing an optical disk of the present configuration with an information reproduction device for first-type optical disks. Furthermore, in the case where the information reproduction device includes a red light source for backwards compatibility with DVDs, irradiating with the red light first makes it possible to achieve an effect whereby a recording layer present just below the 0.6 mm transparent substrate can be detected easily. Providing the first-type optical disk recording layer with wavelength-dependent characteristics in such a manner is also possible with the optical disks configured as disclosed in the first through fifth embodiments, and the same effects can be achieved thereby.

3.7. Seventh Embodiment According to the Features

Figure 20:
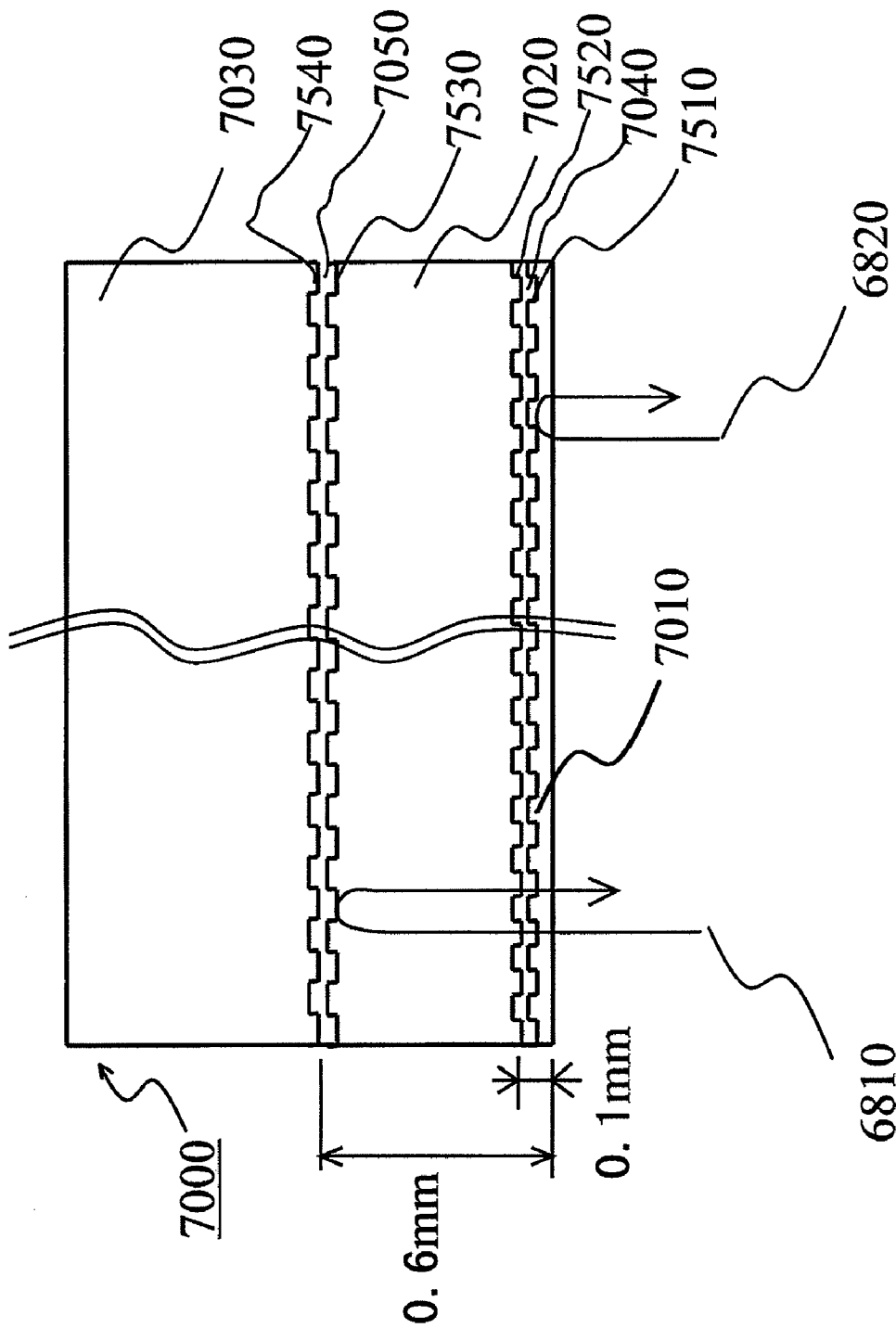
FIG. 20 is a diagram schematically illustrating a cross-section of an optical disk in a seventh embodiment according to the features.

FIG. 20 is a diagram schematically illustrating a cross-section of an optical disk in a seventh embodiment according to the features.

A seventh optical disk 7000 has a configuration in which a first transparent substrate 7010, a first recording layer 7510, a first intermediate layer 7040, a second recording layer 7520, a second transparent substrate 7020, a third recording layer 7530, a second intermediate layer 7050, a fourth recording layer 7540, and a third transparent substrate 7030 are laminated together, in order starting with the bottom surface of the disk, as shown in FIG. 20.

Here, the first recording layer 7510 and second recording layer 7520 are brought to reproduction by condensing blue laser beam onto the recording layers through the first transparent substrate, which is 0.075 mm, or further through the intermediate layer, using an objective lens having a numerical aperture NA of 0.85. The recording layers have a first-type optical disk pitted pattern. The recording capacity of the recording layers is approximately 25 Gbyte per layer for a disk approximately 12 cm in diameter.

However, the third recording layer 7530 and fourth recording layer 7540 are brought to reproduction by condensing blue laser beam onto the recording layers through the first transparent substrate, which is 0.075 mm, the intermediate layer, which is 0.025 mm, and the second transparent substrate, which is 0.49 mm, or further through the intermediate layer, using an objective lens having a numerical aperture NA of 0.65. The recording layers have a second-type optical disk pitted pattern. The recording capacity of the recording layers is approximately 15 Gbyte per layer for a disk approximately 12 cm in diameter.

An optical disk according to this configuration is configured for when the data amount is no less than 34 Gbyte or exceeds the recording capacity per layer of a second-type optical disk. Data of an amount no greater than 50 Gbyte or up to twice the recording capacity per layer of a first-type optical disk is recorded to this optical disk. The data will not fit into the layer according to the second-type optical disk, and thus is recorded with a higher rate of compression than for the first-type optical disk. The video and audio of the same content is recorded even though the quality will be slightly less than that of the first-type optical disk when the content is reproduced.

While the exact same information cannot be recorded onto both the first-type optical disk recording layer and the second-type optical disk recording layer, this nevertheless allows a customer to enjoy what is essentially the same content and also makes it easier to produce the disks.

It should be noted that the 50 Gbyte upper limit of the recording capacity is determined by the total of the capacities of the first and second recording layers, and thus the upper limit that can be recorded to an optical disk having this configuration can be increased to 54 Gbyte in accordance with the total capacity of these recording layers if the capacity of the first and second recording layers can be increased to, for example, 27 Gbyte, through improvements in the manufacturing precision of the optical disk, the information reproduction device, and so on.

Note that details regarding the information can be displayed in an easy-to-understand manner by printing pictures or characters regarding the content of the information on the top side of the third transparent substrate 7030 in FIG. 20, or in other words, on the top surface.

The first recording layer 7510 and the second recording layer 7520, serving as first-type optical disk recording layers, may be provided with wavelength properties. For example, a reflective film may be formed on the first recording layer 7510 and the second recording layer 7520, the reflective film having a property whereby it has a high transmittance when red light 6810 is irradiated but partially reflects blue light 6820 when this blue light is irradiated. Accordingly, reflected light resulting from the first-type optical disk recording light can be obtained when reproducing an optical disk of the present configuration with an information reproduction device for first-type optical disks. Furthermore, in the case where the information reproduction device includes a red light source for backwards compatibility with DVDs, irradiating with the red light first makes it possible to achieve an effect whereby a recording layer present just below the approximately 0.6 mm (about 0.59 mm) transparent substrate can be detected easily. Providing the first-type optical disk recording layer with wavelength-dependent characteristics in such a manner is also possible with the optical disks configured as disclosed in the aforementioned first through fifth embodiments according to the features, and the same effects can be achieved thereby.

3.8. Eighth Embodiment According to the Features

Figure 21:
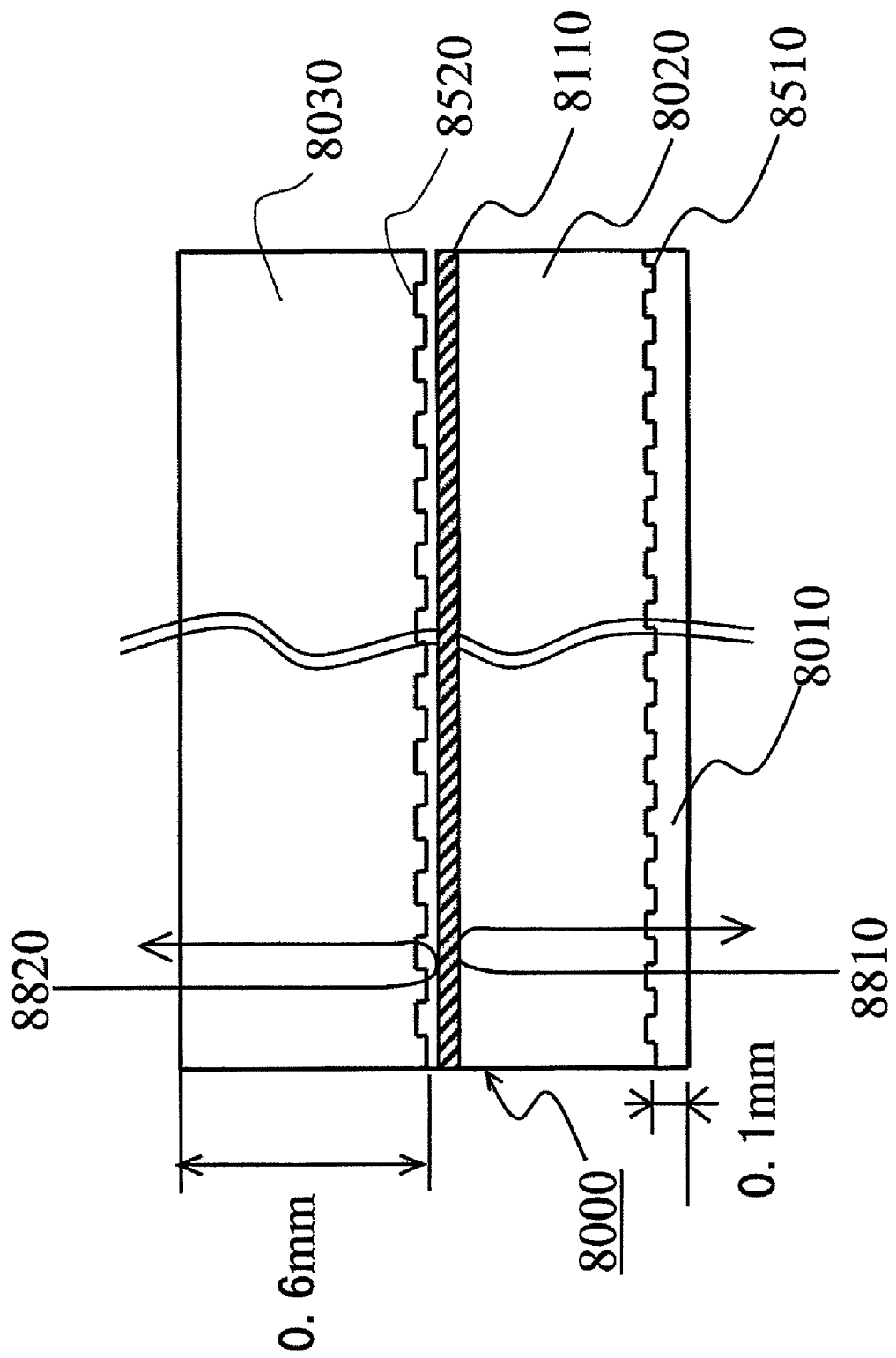
FIG. 21 is a diagram schematically illustrating a cross-section of an optical disk in an eighth embodiment according to the features.

FIG. 21 is a diagram schematically illustrating a cross-section of an optical disk in an eighth embodiment according to the features.

An eighth optical disk 8000 has a configuration in which a first transparent substrate 8010, a first recording layer 8510, a second transparent substrate 8020, and a label layer 8110 are laminated together, in order starting with the bottom surface of the disk, as shown in FIG. 21.

A second recording layer 8520 and a third transparent substrate 8030 are laminated together above the label layer 8110.

Here, the first recording layer 8510 is brought to reproduction by condensing blue laser beam onto the recording layer through the first transparent substrate, which is 0.1 mm, with the bottom surface in FIG. 21 as the light entrance surface, using an objective lens having a numerical aperture NA of 0.85. The recording layer has a first-type optical disk pitted pattern.

The recording capacity of the recording layer is approximately 25 Gbyte per layer for a disk approximately 12 cm in diameter.

On the other hand, the second recording layer 8520 is brought to reproduction by condensing blue laser beam onto the recording layer through the third transparent substrate, which is 0.6 mm, with the top surface in FIG. 21 as the light entrance surface, using an objective lens having a numerical aperture NA of 0.65. The recording layer has a second-type optical disk pitted pattern. The recording capacity of the recording layer is approximately 15 Gbyte per layer for a disk 12 cm in diameter.

Data of an amount no greater than 25 Gbyte or up to the recording capacity per layer of a first-type optical disk is recorded to this optical disk.

The exact same content with the exact same data amount is recorded onto the first-type optical disk recording layer and the second-type optical disk recording layer in the case where the data amount is less than 15 Gbyte or less than the recording capacity per layer of a second-type optical disk. The data will not fit into a second-type optical disk layer and is thus recorded at a higher rate of compression than for the first-type optical disk in the case where the data amount is greater than 17 Gbyte or greater than the recording capacity for a single layer of a second-type optical disk but less than 25 Gbyte or less than the recording capacity per layer of a first-type optical disk. The video and audio of the same content is recorded even though the quality will be slightly less than that of the first-type optical disk when the content is reproduced.

While the exact same information cannot be recorded onto both the first-type optical disk recording layer and the second-type optical disk recording layer, this nevertheless allows a customer to enjoy what is essentially the same content and also makes it easier to produce the disks.

It should be noted that the 25 Gbyte upper limit of the recording capacity is determined by the capacity of the first recording layer, and thus the upper limit for information that can be recorded to an optical disk having this configuration can be increased to 27 Gbyte in accordance with this capacity if the capacity of the first recording layer can be increased to, for example, 27 Gbyte and so on through improvements in the manufacturing precision of the optical disk, the information reproduction device, and so on.

Note that details regarding the information can be displayed in an easy-to-understand manner by printing pictures or characters regarding the content of the information on the label layer 8110 in FIG. 21. In such a case, the pictures and characters expressing the content of the information written on the label layer 8110 are visible due to light 8810 or light 8820 passing through the first recording layer 8510 or the second recording layer 8520. Therefore, in order for the label layer to be visible, the visible light transmittance of the first recording layer 8510 or the second recording layer 8520 should be several percent, preferably 10% or greater, and even more preferably, 20% or greater.

Furthermore, the first recording layer 8510 or the second recording layer 8520 may be provided with wavelength properties. Although it is preferable, for reproducing information, for the blue light reflectance to be 4% or greater, and further preferable for the reflectance to be 10% or greater; however, for red to green light, or in other words, for light with a wavelength of 420 nm or greater, no reflectance is necessary. Accordingly, the blue light reflectance is set to, for example, 4% or greater, and preferably to 10% or greater, and the transmittance of wavelengths of 420 nm or greater is set to be higher than the transmittance of blue light. Alternatively, setting the transmittance to be higher the longer the wavelength makes it possible to see the label more clearly.

The present configuration according to the features, in which pictures, characters, symbols, or the like expressing the content of the information are written between recording layers of an optical disk that can be reproduced from both sides can also be applied when the recording layers are of other format specifications, such as CD, DVD, and so on. Either way, this configuration has an effect in which one of the shortcomings of dual-sided disks, where the space allocated for a label is small, can be ameliorated, making it easy for a customer to understand the details of the information.

In this case, ensuring the visible light transmittance of the recording layer and increasing the transmittance for other wavelength regions aside from the wavelength necessary for reproduction has the effect of making it easier to see the label, regardless of the format specifications of the recording layer.

Furthermore, it is preferable for the transmittance of the label layer 8110 with respect to the wavelength of the light used for reproduction to be 10% or less. For example, if the label layer 8110 has a high transmittance, light used for reproduction entering from the top of the diagram may permeate to the first recording layer 8510 and reflect back. In such a case, there is the chance that a CD recording layer near 1.2 mm in the transparent substrate will be mistakenly detected in the optical disk. However, the light used for reproduction will not permeate to the first recording layer 8510 if the transmittance of the label layer 8110 is reduced, the effect of which makes it possible to avoid a mistaken detection.

3.9. Ninth Embodiment According to the Features

Figure 22:
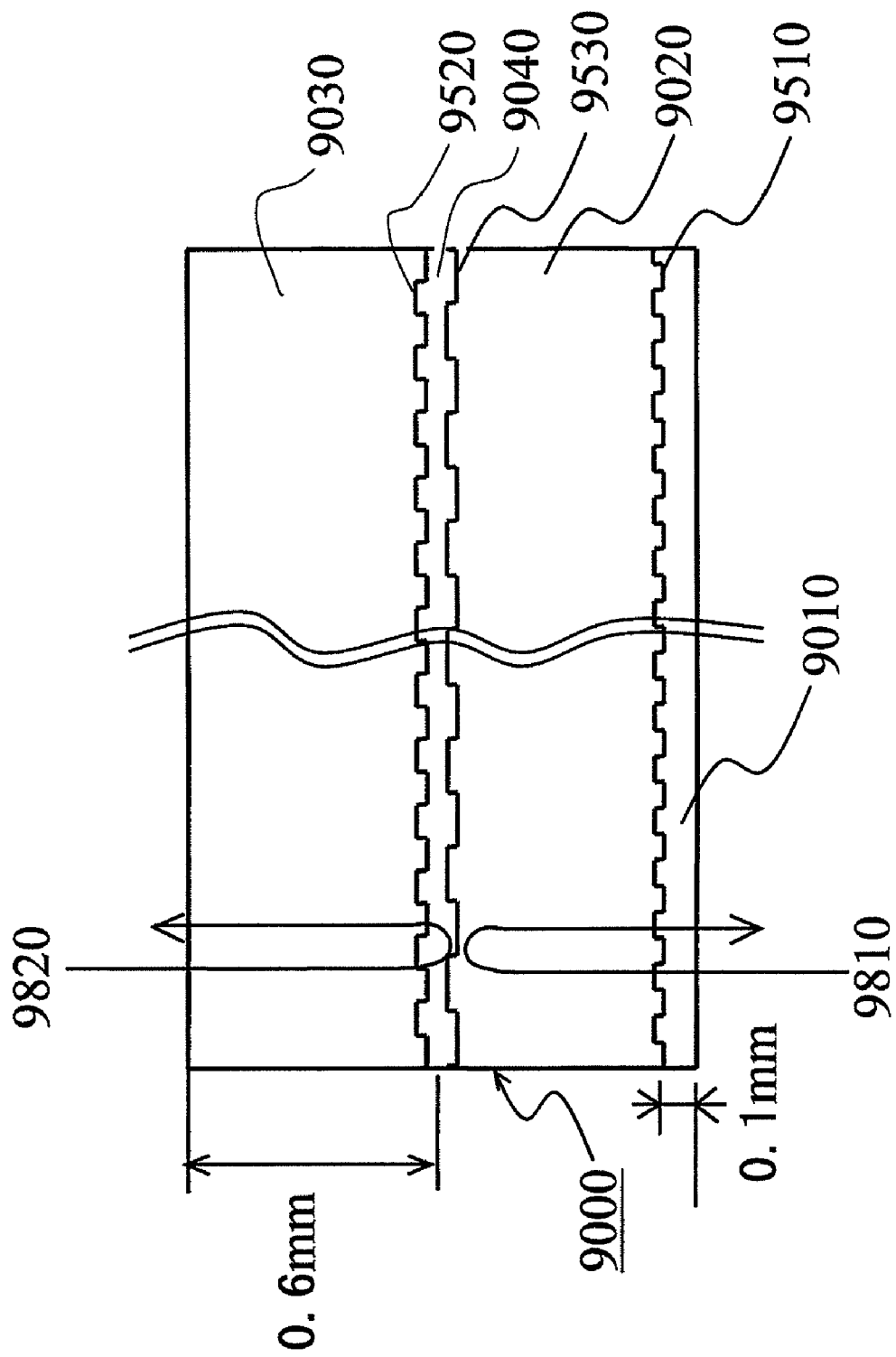
FIG. 22 is a diagram schematically illustrating a cross-section of an optical disk in a ninth embodiment according to the features.

FIG. 22 is a diagram schematically illustrating a cross-section of an optical disk in a ninth embodiment according to the features.

A ninth optical disk 9000 has a configuration in which a first transparent substrate 9010, a first recording layer 9510, a second transparent substrate 9020, and a DVD recording layer 9530 are laminated together, in order starting with the bottom surface of the disk, as shown in FIG. 22.

An intermediate layer 9040, a second recording layer 9520, and a third transparent substrate 9030 are laminated together above the DVD recording layer 9530.

Here, the first recording layer 9510 is brought to reproduction by condensing blue laser beam onto the recording layer through the first transparent substrate, which is 0.1 mm, from the bottom side of FIG. 22, with the bottom surface in FIG. 22 as the light entrance surface, using an objective lens having a numerical aperture NA of 0.85. The recording layer has a first-type optical disk pitted pattern.

The recording capacity of the recording layer is approximately 25 Gbyte per layer for a disk approximately 12 cm in diameter.

On the other hand, the second recording layer 9520 is brought to reproduction by condensing blue laser beam onto the recording layer through the second transparent substrate, which is 0.6 mm, from the top side of FIG. 22, with the top surface in FIG. 22 as the light entrance surface, using an objective lens having a numerical aperture NA of 0.65. The recording layer has a second-type optical disk pitted pattern. The recording capacity of the recording layer is approximately 15 Gbyte per layer for a disk approximately 12 cm in diameter.

Data of an amount no greater than 25 Gbyte or up to the recording capacity per layer of a first-type optical disk is recorded to this optical disk.

The exact same content with the exact same data amount is recorded onto the first-type optical disk recording layer and the second-type optical disk recording layer in the case where the data amount is less than 15 Gbyte or less than the recording capacity per layer of a second-type optical disk. The data will not fit into a second-type optical disk layer and is thus recorded at a higher rate of compression than for the first-type optical disk in the case where the data amount is not less than 17 Gbyte or greater than the recording capacity per layer of a second-type optical disk but no greater than 25 Gbyte or less than the recording capacity per layer of a first-type optical disk. The video and audio of the same content is recorded even though the quality will be slightly less than that of the first-type optical disk when the content is reproduced.

While the exact same information cannot be recorded onto both the first-type optical disk recording layer and the second-type optical disk recording layer, this nevertheless allows a customer to enjoy what is essentially the same content and also makes it easier to produce the disks.

It should be noted that the 25 Gbyte upper limit of the recording capacity is determined by the capacity of the first recording layer, and thus the upper limit for information that can be recorded to an optical disk having this configuration can be increased to 27 Gbyte in accordance with this capacity if the capacity of the first recording layer can be increased to, for example, 27 Gbyte and so on through improvements in the manufacturing precision of the optical disk, the information reproduction device, and so on.

The DVD recording layer 9530 in FIG. 22 is brought to reproduction by condensing red laser beam onto the recording layer through the third transparent substrate 9030, which is 0.6 mm, and the intermediate layer 9040, from the top surface in FIG. 22, using an objective lens having a numerical aperture NA of 0.6. It is also possible to reproduce the DVD recording layer 9530 by condensing red laser beam onto the recording layer through the first transparent substrate 9010, which is 0.1 mm, and the second transparent substrate 9020, which is 0.5 mm, from the bottom of FIG. 22.

In order to ensure that the red light reaches the DVD recording layer 9530 efficiently, it is preferable for the first recording layer 9510 and the second recording layer 9520 to reflect blue light but transmit red light. To put it differently, it is preferable to set the red light transmittance higher than the blue light transmittance.

3.10. Tenth Embodiment According to the Features

Figure 23:
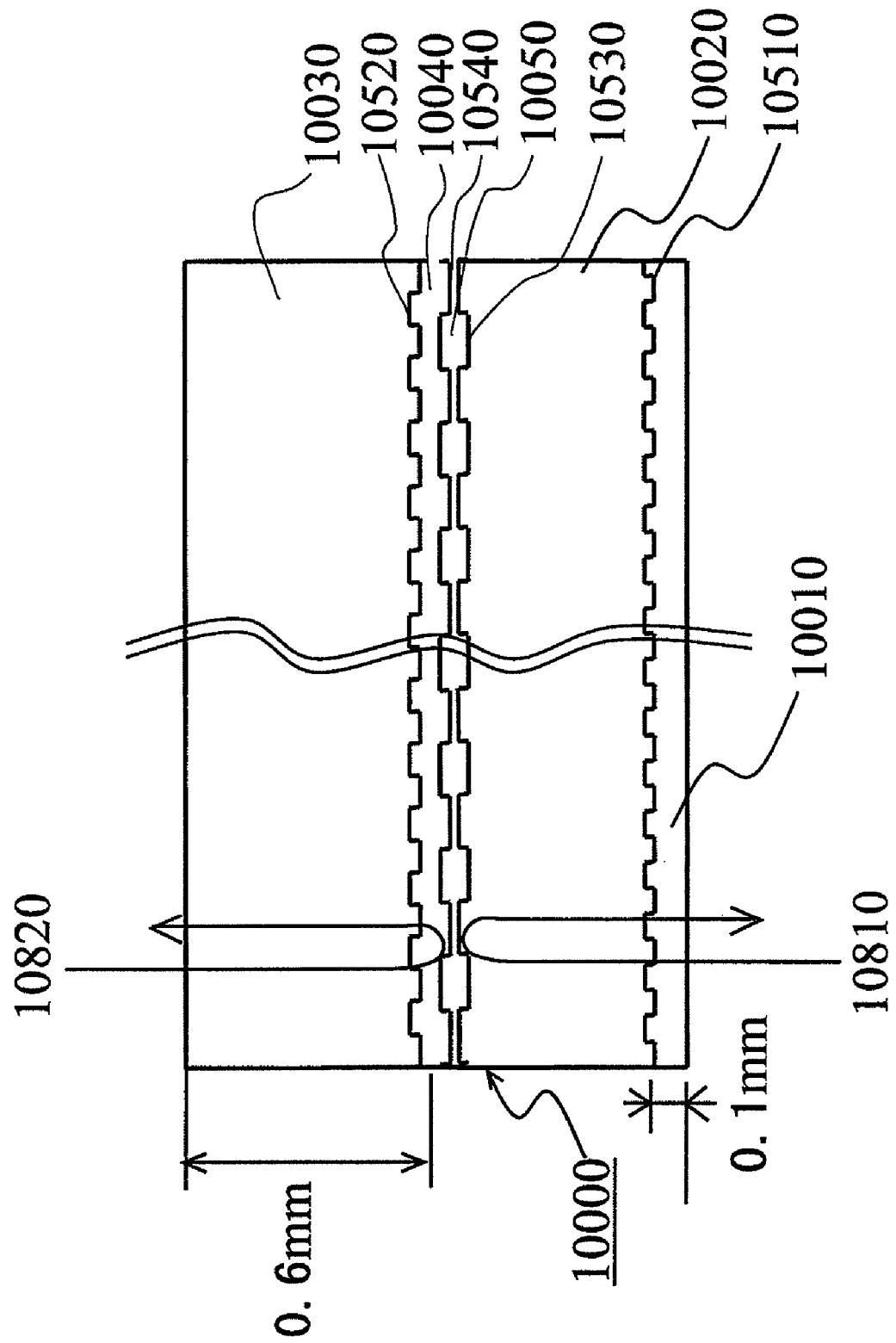
FIG. 23 is a diagram schematically illustrating a cross-section of an optical disk in a tenth embodiment according to the features.

FIG. 23 is a diagram schematically illustrating a cross-section of an optical disk in a tenth embodiment according to the features.

A tenth optical disk 10000 has a configuration in which a first transparent substrate 10010, a first recording layer 10510, a second transparent substrate 10020, and a first DVD recording layer 10530 are laminated together, in order starting with the bottom surface of the disk, as shown in FIG. 23.

A first intermediate layer 10050, a second DVD recording layer 10540, a second intermediate layer 10040, a second recording layer 10520, and a third transparent substrate 10030 are laminated together above the first DVD recording layer 10530.

Here, the first recording layer 10510 is brought to reproduction by condensing blue laser beam onto the recording layer through the first transparent substrate, which is 0.1 mm, from the bottom side in FIG. 23, using an objective lens having a numerical aperture NA of 0.85, where the bottom surface in FIG. 23 is the light entrance surface, The recording layer has a first-type optical disk pitted pattern.

The recording capacity of the recording layer is approximately 25 Gbyte per layer for a disk 12 cm in diameter.

On the other hand, the second recording layer 10520 is brought to reproduction by condensing blue laser beam onto the recording layer through the second transparent substrate, which is 0.6 mm, from the top side of FIG. 23, using an objective lens having a numerical aperture NA of 0.65, where the top surface in FIG. 23 is the light entrance surface. The recording layer has a second-type optical disk pitted pattern. The recording capacity of the recording layer is approximately 15 Gbyte per layer for a disk 12 cm in diameter.

Data of an amount no greater than 25 Gbyte or up to the recording capacity per layer of a first-type optical disk is recorded to this optical disk.

The exact same content with the exact same data amount is recorded onto the first-type optical disk recording layer and the second-type optical disk recording layer in the case where the data amount is less than 15 Gbyte or less than the recording capacity per layer of a second-type optical disk. The data will not fit into a second-type optical disk layer and is thus recorded at a higher rate of compression than for the first-type optical disk in the case where the data amount is no less than 17 Gbyte or greater than the recording capacity per layer of a second-type optical disk but no greater than 25 Gbyte or up to the recording capacity per layer of a first-type optical disk. The video and audio of the same content is recorded even though the quality will be slightly less than that of the first-type optical disk when the content is reproduced.

While the exact same information cannot be recorded onto both the first-type optical disk recording layer and the second-type optical disk recording layer, this nevertheless allows a customer to enjoy what is essentially the same content and also makes it easier to produce the disks.

It should be noted that the 25 Gbyte upper limit of the recording capacity is determined by the capacity of the first recording layer, and thus the upper limit for information that can be recorded to an optical disk having this configuration can be increased to 27 Gbyte in accordance with this capacity if the capacity of the first recording layer can be increased to, for example, 27 Gbyte and so on through improvements in the manufacturing precision of the optical disk, the information reproduction device, and so on.

The second DVD recording layer 10540 in FIG. 23 is bought to reproduction by condensing red laser beam onto the recording layer through the third transparent substrate 10030, which is 0.6 mm, and the intermediate layer 10040, from the top surface in FIG. 23, using an objective lens having a numerical aperture NA of 0.6. The first DVD recording layer 10530 can also be brought to reproduction by condensing red laser beam onto the recording layer through the first transparent substrate 10010, which is 0.1 mm, and the second transparent substrate 10020, which is 0.5 mm, from the bottom surface in FIG. 23.

In order to ensure that the red light reaches the second DVD recording layer 10540 and the first DVD recording layer 10530 efficiently, it is preferable for the first recording layer 10510 and the second recording layer 10520 to reflect blue light but transmit red light. To put it differently, it is preferable to set the red light transmittance higher than the blue light transmittance.

By providing two DVD recording layers on which the same information is recorded on both sides of a disk in an inverted manner, the present configuration makes it possible to ensure that the spiral direction of the track grooves and the protrusions of the pits do not change regardless of which surface the DVD is reproduced from; an effect of this is that the DVD is detected to be a DVD having the exact same content from either surface and is rotated in the same direction, and thus can be reproduced.

3.11. Eleventh Embodiment According to the Features

Figure 24:
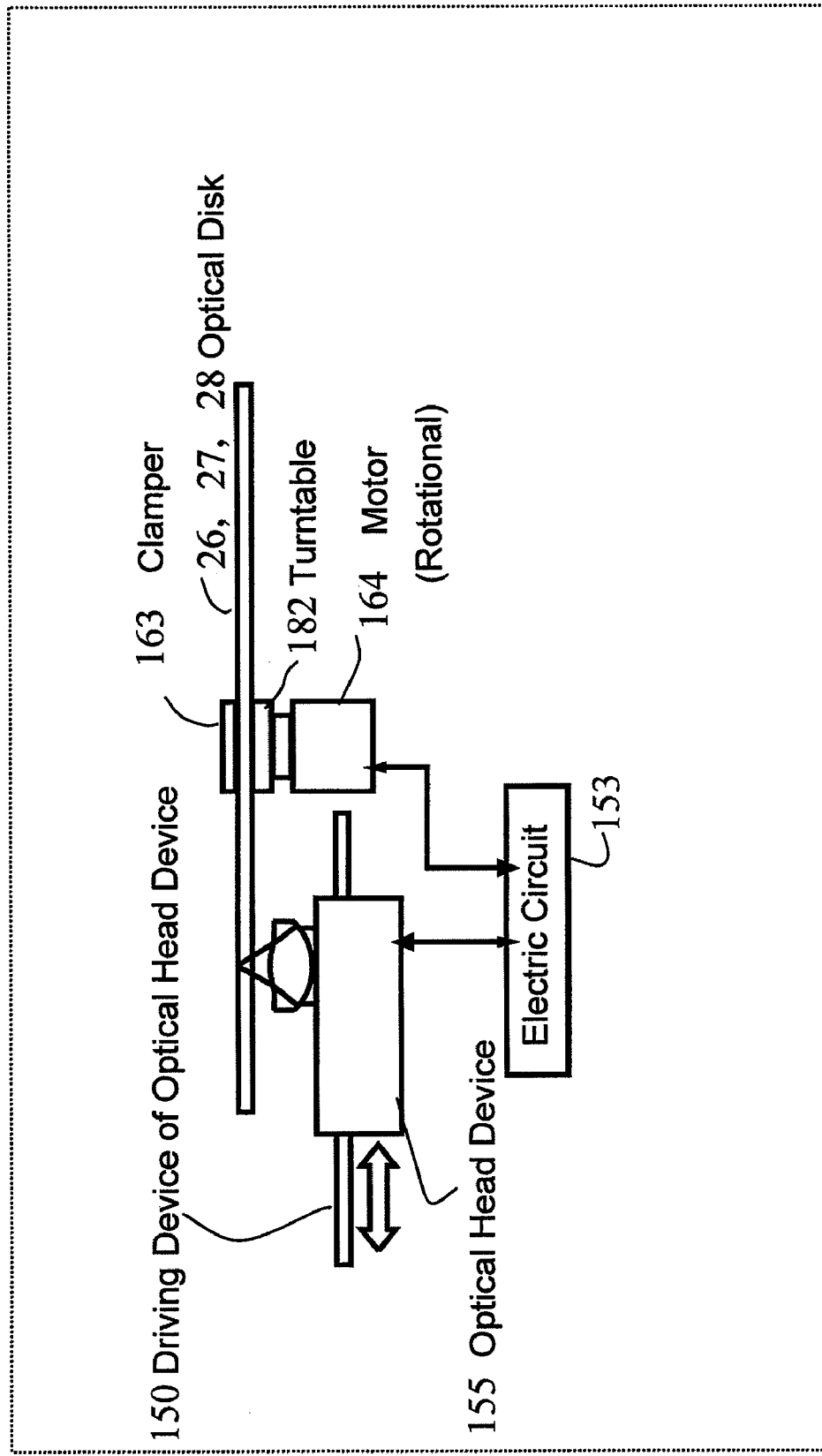
FIG. 24 is a diagrammatic outline of a side view of an optical information device in eleventh and twelfth embodiments according to the features.

Furthermore, a working example of an optical disk drive that reproduces the optical disk according to the eleventh embodiment according to the features is illustrated in FIG. 24. FIG. 24 shows an optical disk 26 placed on a turntable 182, which is rotated by a motor 164. The optical disks indicated in the embodiments mentioned thus far in the present application are included within the scope of the optical disk 26. An optical head device 155 is moved roughly to the area of a track of the optical disk on which a desired piece of information is recorded, and driven by a driving device 150 of the optical head device.

The optical head device 155 includes at least a blue light source and a red light source. Preferably, the optical head device 155 includes an infrared light source as well. Furthermore, the optical head device 155 sends focus error signals, tracking error signals, and the like to an electric circuit 153, in accordance with its positional relationship with the optical disk 26. In accordance with these signals, the electric circuit 153 sends a signal for finely moving the objective lens to the optical head device 155. Based on this signal, the optical head device 155 operates a focus servo (control) and performs tracking control with respect to the optical disk, and information is read, written (recorded), or deleted by the optical head device 155.

The optical disk drive 167 of the present embodiment can serve as a first-type optical disk reproduction information device, a second-type optical disk reproduction information device, and so on according to the specifications of the optical head device 155. A reproduction method shall de described hereinafter, assuming that an optical disk according to the aforementioned embodiments is reproduced in an information device as described here. The reproduction method described hereinafter has an effect that reproduction can be commenced in a short amount of time.

First, descriptions of an information reproduction method that spans from a disk determination method to focus servo pull-in and the like, in accordance with the diagrams. The case described hereinafter is a case where the optical disk drive 167 is applied in reproduction of a first-type optical disk, in which the optical disk drive 167 is a first-type optical disk reproduction information device, or in other words, in which the optical head device 155 includes an objective lens with an NA of 0.85.

Figure 25:
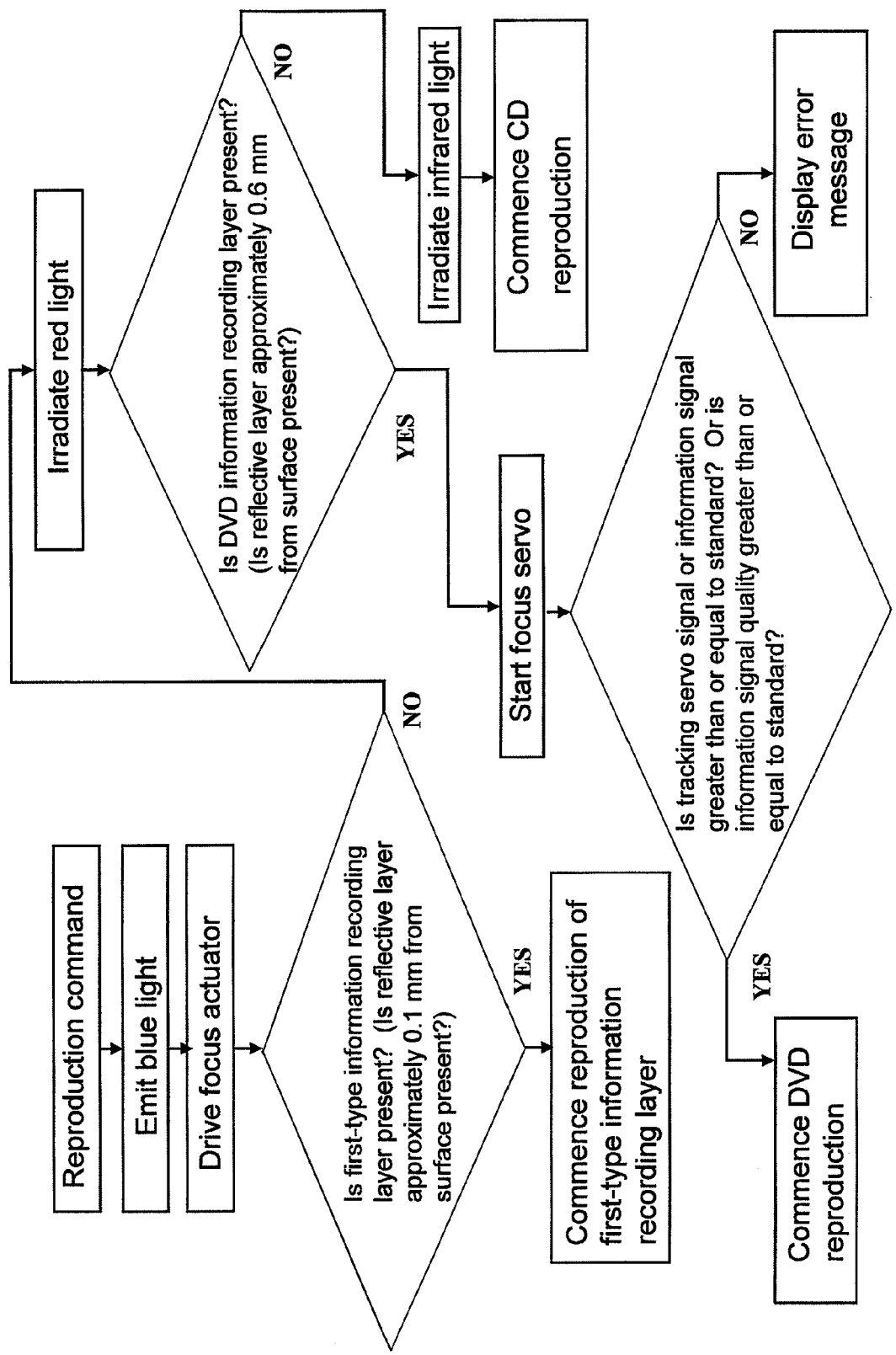
FIG. 25 is a flowchart illustrating an information reproduction method in the eleventh embodiment according to the features.

FIG. 25 is a flowchart illustrating an optical disk determination method, a focus servo pull-in method, and so on in the present embodiment according to the features.

When an optical disk reproduction command is outputted from the electric circuit 153, a blue laser diode provided in the optical head device 155 emits light. Then, a focus driving device provided in the optical head device 155 is driven, causing the objective lens of the optical head device 155 to move in the vertical direction with respect to the information recording layer of the optical disk. At this time, due to the focus driving device, the objective lens moves in the direction that brings it from far away from the optical disk to closer to the optical disk.

Also at this time, the electric circuit 153 monitors focus error signals detected by the optical head device 155 during movement of the objective lens, and sets a slice level voltage G for focus error signal detection; by comparing this voltage G with the focus error signal voltage, the focal point of the condensed beam spot moving closer to the surface of the disk, the recording layer, and so on can be detected. Note that the total sum of the amount of reflected light from the optical disk may be used instead of the focus error signal, or the total sum of the focus error signal and the total sum of the amount of reflected light from the optical disk may be used in combination.

In this manner, the distance between the surface and an adjacent recording layer can be measured from the difference in voltage values added to the focus driving device from when it is detected that the focal point of the condensed beam spot has passed the surface to when it is detected that the focal point of the condensed beam spot has passed the next recording layer; or alternatively, from the difference in the values of current running through the focus driving device.

It is then determined whether or not an information recording layer according to the first-type optical disk is present, or in other words, whether or not a reflective layer is present at a distance of approximately 0.1 mm from the surface. If it is determined that a first-type optical disk recording layer is present, the optical disk is determined to be a first-type optical disk, the focus servo is applied to the recording layer thereof, and reproduction of the first-type optical disk is commenced. As long as the first-type optical disk recording layer of the optical disk of the present application as described in the aforementioned embodiments is mounted facing the optical head device, reproduction of the first-type optical disk can be commenced quickly in this step.

On the other hand, if a first-type optical disk recording layer is not present, blue light emission is terminated, and red light is emitted instead. Then, the focus driving device provided in the optical head device 155 is driven, causing the objective lens of the optical head device 155 to move in the vertical direction with respect to the information recording layer of the optical disk. At this time, due to the focus driving device, the objective lens moves in the direction that brings it from far away from the optical disk to closer to the optical disk.

Also at this time, the electric circuit 153 monitors focus error signals detected by the optical head device 155 during movement of the objective lens, and sets a slice level voltage G2 for focus error signal detection; by comparing this voltage G2 with the focus error signal voltage, the focal point of the condensed beam spot moving closer to the surface of the disk, the recording layer, and so on can be detected. Note that the total sum of the amount of reflected light from the optical disk may be used instead of the focus error signal, or the total sum of the focus error signal and the total sum of the amount of reflected light from the optical disk may be used in combination.

In this manner, the distance between the surface and an adjacent recording layer can be measured from the difference in voltage values added to the focus driving device from when it is detected that the focal point of the condensed beam spot has passed the surface to when it is detected that the focal point of the condensed beam spot has passed the next recording layer; or alternatively, from the difference in the values of current running through the focus driving device.

It is then determined if a reflective layer is present at a distance of approximately 0.6 mm from the surface. If so, the focus servo is applied to that recording layer. Then, it is determined whether or not the recording layer is a DVD layer through a method such as finding whether or not the size and amplitude of a tracking servo signal, an information signal, or the like is greater than or equal to a reference value. If the recording layer can be determined to be a DVD layer, DVD reproduction is commenced. Conversely, if a signal through which the layer can be determined to be a DVD layer cannot be obtained, an error is displayed or an error signal is outputted. Note that the process may return to the step of emitting blue light, or infrared light may be emitted and a CD recording layer may be searched for, prior to determining that an error has occurred.

When it is determined if a reflective layer is present at a distance of approximately 0.6 mm from the surface, and the determination is negative, red light is irradiated and CD reproduction is performed. In the case where the disk cannot be reproduced as a CD, or the case where the optical head device 155 does not include a red light source, an error is displayed or an error signal is outputted. Note that the process may return to the step of emitting blue light prior to determining that an error has occurred.

Using the reproduction step according to the present embodiment has an effect that it is possible to quickly determine the presence of a first-type optical disk recording layer and reproduce the first-type optical disk recording layer with certainty, even for an optical disk that has both first-type optical disk and second-type optical disk recording layers.

3.12. Twelfth Embodiment According to the Features

Next, descriptions of an information reproduction method that spans from a disk determination method to focus servo pull-in and the like, in accordance with the diagrams. The case described hereinafter is a case where the optical disk drive 167 is a second-type optical disk reproduction information device, or in other words, where the optical disk drive 167 shown in FIG. 24 is applied in reproduction of a second-type optical disk, in which the optical head device 155 includes an objective lens that converges blue light at an NA of 0.65.

Figure 26:
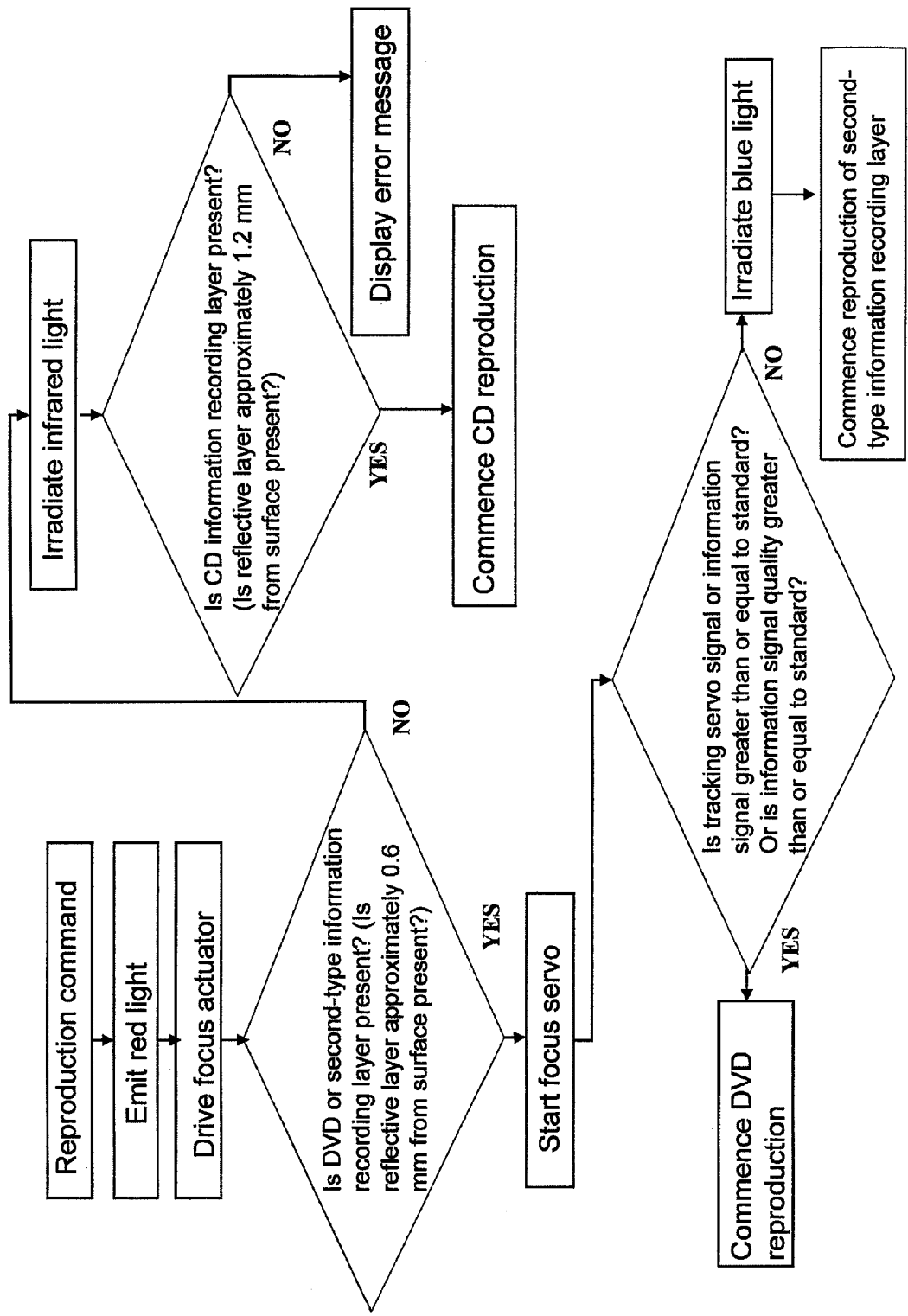
FIG. 26 is a flowchart illustrating an information reproduction method in the twelfth embodiment according to the features.

FIG. 26 is a flowchart illustrating an optical disk determination method, a focus servo pull-in method, and so on in the present embodiment according to the features.

When an optical disk reproduction command is outputted from the electric circuit 153, a red laser diode provided in the optical head device 155 emits light. Then, the focus driving device provided in the optical head device 155 is driven, causing the objective lens of the optical head device 155 to move in the vertical direction with respect to the information recording layer of the optical disk. At this time, due to the focus driving device, the objective lens moves in the direction that brings it from far away from the optical disk to closer to the optical disk.

Also at this time, the electric circuit 153 monitors focus error signals detected by the optical head device 155 during movement of the objective lens, and sets a slice level voltage G for focus error signal detection; by comparing this voltage G with the focus error signal voltage, the focal point of the condensed beam spot moving closer to the surface of the disk, the recording layer, and so on can be detected. Note that the total sum of the amount of reflected light from the optical disk may be used instead of the focus error signal, or the total sum of the focus error signal and the total sum of the amount of reflected light from the optical disk may be used in combination.

In this manner, the distance between the surface and an adjacent recording layer can be measured from the difference in voltage values added to the focus driving device from when it is detected that the focal point of the condensed beam spot has passed the surface to when it is detected that the focal point of the condensed beam spot has passed the next recording layer; or alternatively, from the difference in the values of current running through the focus driving device.

It is then determined whether or not a reflective layer is present at a distance of approximately 0.6 mm from the surface. If so, the focus servo is applied to that recording layer. It should be noted in this step that the embodiments of optical disks as described previously in the present application include examples where a first-type optical disk recording layer is present at a distance of approximately 0.1 mm from the surface of the disk, between the surface and the recording layer that is present at 0.6 mm from the surface. The first-type optical disk recording layer may be passed over even if it is detected. Furthermore, if the red light transmittance of the first-type optical disk recording layer is set to be high as described earlier, first performing the disk determination using red light, as in the present embodiment, makes it possible to not sense the presence of the first-type optical disk recording layer. This has an effect that focus servo pull-in will not be mistakenly performed with respect to the first-type optical disk recording layer, and that reproduction of the optical disk can be commenced in a quick manner.

The focus servo is applied to the recording layer at a distance of approximately 0.6 mm from the surface, and it is determined whether or not the recording layer is a DVD layer through a method such as finding whether or not the size and amplitude of a tracking servo signal, an information signal, or the like is greater than or equal to a reference value. If the recording layer can be determined to be a DVD layer, DVD reproduction is commenced. Conversely, if a signal through which the layer can be determined to be a DVD layer cannot be obtained, the emission of red light is terminated, and blue light is emitted. Then, the focus servo is once again applied to the recording layer at a distance of approximately 0.6 mm from the surface. The embodiments of optical disks as described previously in the present application include examples where a first-type optical disk recording layer is present at a distance of approximately 0.1 mm from the surface of the disk, between the surface and the recording layer that is present at 0.6 mm from the surface. The first-type optical disk recording layer may be passed over even if it is detected. In the present application, red light is emitted first, and the presence of a recording layer at a distance of approximately 0.6 mm from the surface is detected, and thus the focus servo can be applied with certainty to the recording layer at a distance of approximately 0.6 mm from the surface even if the first-type optical disk recording layer present approximately 0.1 mm from the surface is passed over. This has an effect that the lens will not collide with the front surface of the optical disk. Next, it is determined whether or not the recording layer is a second-type optical disk layer through a method such as finding whether or not the size and amplitude of a tracking servo signal, an information signal, or the like is greater than or equal to a reference value. If the recording layer can be determined to be a second-type optical disk layer, second-type optical disk reproduction is commenced. Conversely, if a signal through which the layer can be determined to be a second-type optical disk layer cannot be obtained, an error is displayed or an error signal is outputted. Note that the process may return to the step of emitting red light, or infrared light may be emitted and a CD recording layer may be searched for, prior to determining that an error has occurred.

When it is determined if a reflective layer is present at a distance of approximately 0.6 mm from the surface, and the determination is negative, infrared light is irradiated and CD reproduction is performed. In the case where the disk cannot be reproduced as a CD, or the case where the optical head device 155 does not include an infrared light source, an error is displayed or an error signal is outputted.

Using the reproduction step according to the present embodiment has an effect that it is possible to quickly determine the presence of a second-type optical disk recording layer and reproduce the second-type optical disk recording layer with certainty, even for an optical disk that has both first-type optical disk and second-type optical disk recording layers.

3.13. Thirteenth Embodiment According to the Features

An example of an optical information device such as a computer that includes the optical disk drive 167 as described in the eleventh or twelfth embodiments, and an arithmetic circuit configured to perform an arithmetic operation on or convert information retrieved by the optical disk drive 167 shall be described hereinafter as the thirteenth embodiment according to the features.

An optical information device that includes the optical disk drive according to the aforementioned embodiments or optical information device such as computer, optical disk player, optical disk recorder that employs the aforementioned recording/reproduction methods can perform focus pull-in in a short amount of time with respect to a certain recording layer in a hybrid optical disk that includes a first-type optical disk layer and a second-type optical disk layer; thus a system with less wait time for commencing use of an optical disk and with high usability can be realized.

First, an example of a computer including the optical disk drive 167 described in the eleventh or twelfth embodiments shall be described.

Figure 27:
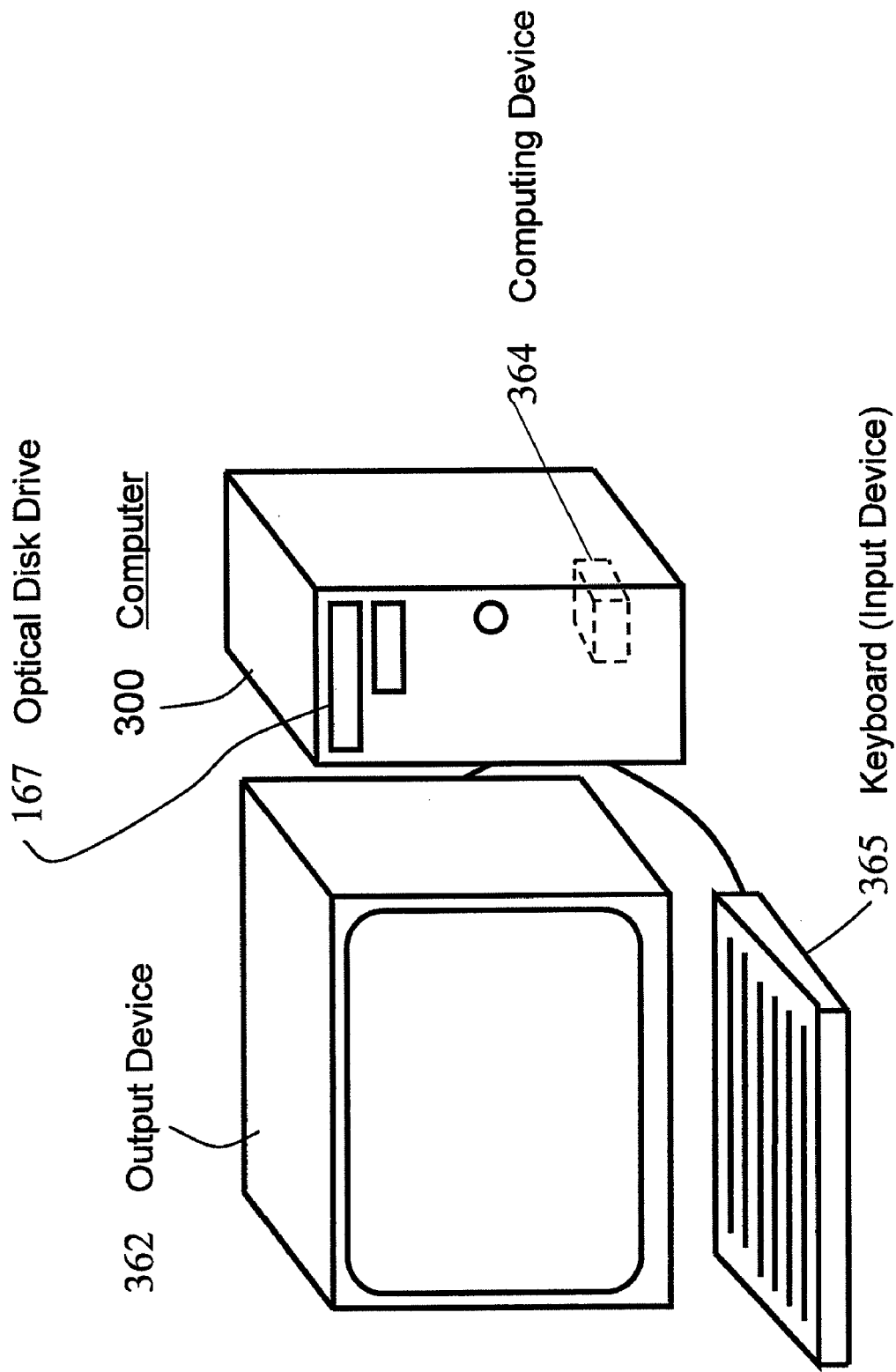
FIG. 27 is a perspective view illustrating an outline of a configuration of a computer in a thirteenth embodiment according to the features.

In FIG. 27, a computer 300 is configured so as to include: the optical disk drive 167 according to the eleventh or twelfth embodiments; an input device 365, such as a keyboard, mouse, touch panel, or the like, for inputting information; a processing device 364, such as a central processing unit (CPU), that performs processing based on information inputted through the input device, information read out from the optical disk drive 167, or the like; and an output device 362, such as a CRT display, liquid-crystal display, or a printer, that displays information such as the results of processing performed by the processing device.

3.14. Fourteenth Embodiment According to the Features

An example of an optical disk player that includes the optical disk drive 167 as described in the eleventh or twelfth embodiments shall be described hereinafter with reference to FIG. 28.

Figure 28:
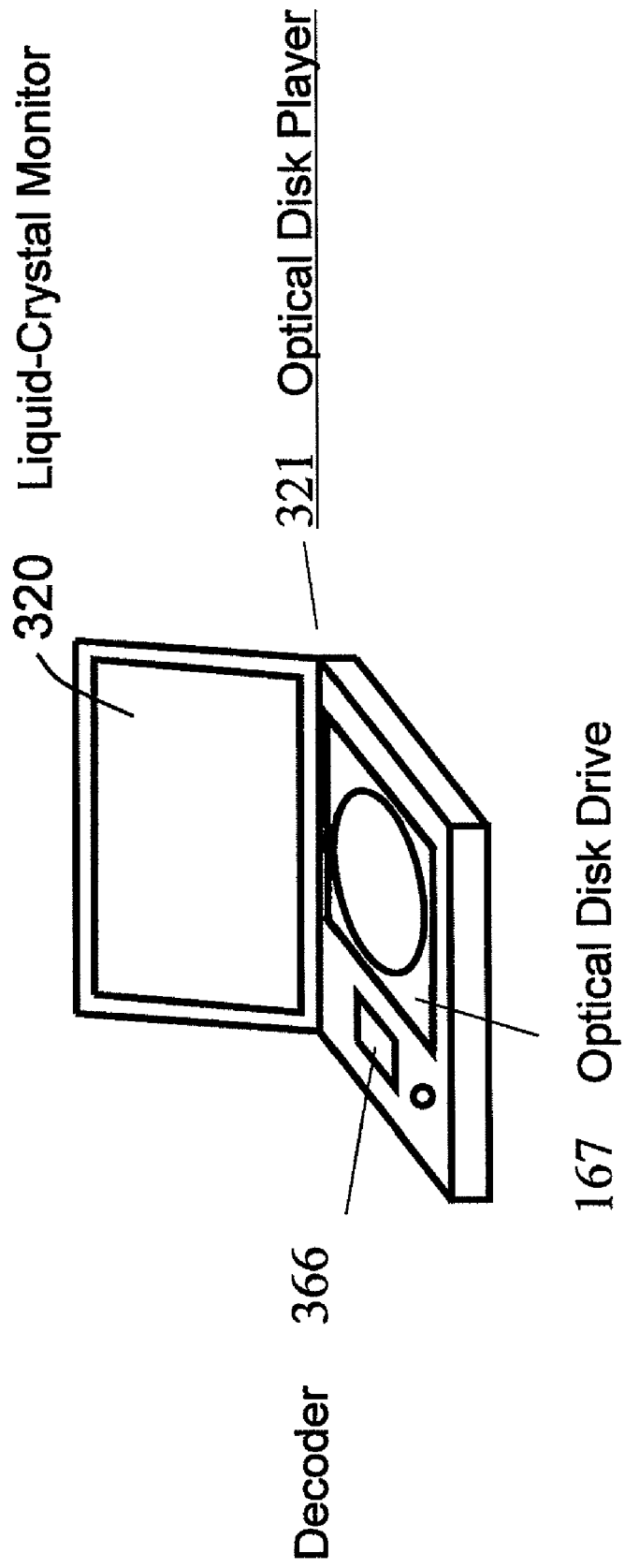
FIG. 28 is a perspective view illustrating an outline of a configuration of an optical disk player and a car navigation system in a fourteenth embodiment according to the features.

FIG. 28 illustrates an optical disk player 321 configured so as to include: the optical disk drive 167 according to the eleventh or twelfth embodiments; and a data-to-image conversion device (such as, for example, a decoder 366) that converts a data signal obtained from the optical disk drive into an image. The present configuration can also be used as a car navigation system by adding a positional sensor such as a GPS, a central processing unit (CPU), and so on. Furthermore, a configuration in which a display device such as a liquid-crystal monitor 320 is added is also possible.

3.15. Fifteenth Embodiment According to the Features

An example of an optical disk recorder that includes the optical disk drive as described in the eleventh or twelfth embodiments according to the features shall be described hereinafter.

Figure 29:
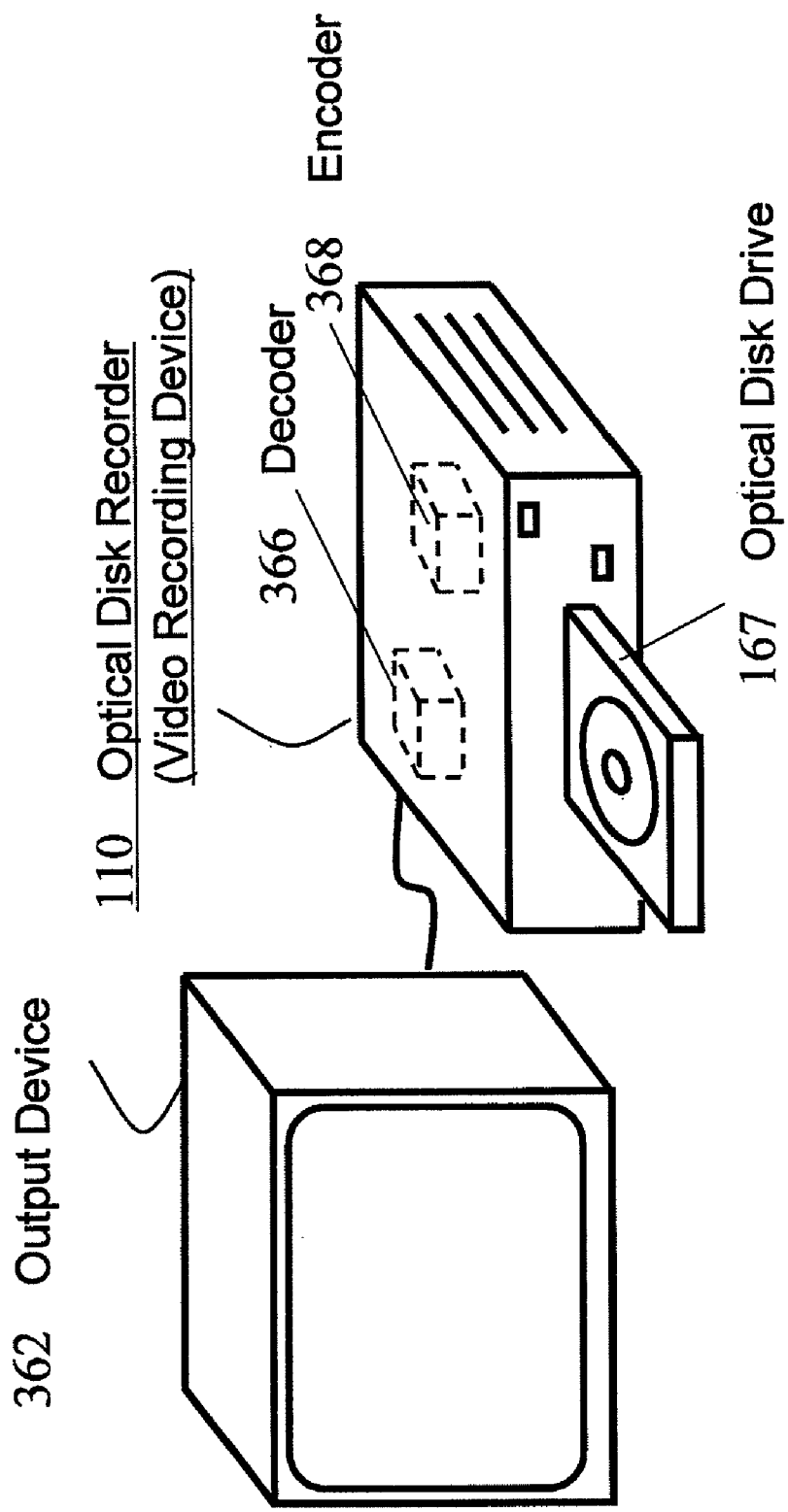
FIG. 29 is a perspective view illustrating an outline of a configuration of an optical disk recorder in a fifteenth embodiment according to the features.

This embodiment shall be described with reference to FIG. 29. FIG. 29 illustrates an optical disk recorder 110 configured so as to include: the optical disk drive 167 according to the eleventh or twelfth embodiments; and an image-to-data conversion device (such as, for example, an encoder 368) that converts image data into data to be recorded onto an optical disk by the optical disk drive. Preferably, a data-to-image conversion device (decoder 366) that converts a data signal obtained from the optical disk drive into an image is also included; through this, reproduction of portions already recorded is also possible. An output device 362, such as a CRT display, liquid-crystal display, or a printer, that displays information may also be included.

3.16. Sixteenth Embodiment According to the Features

Figure 30:
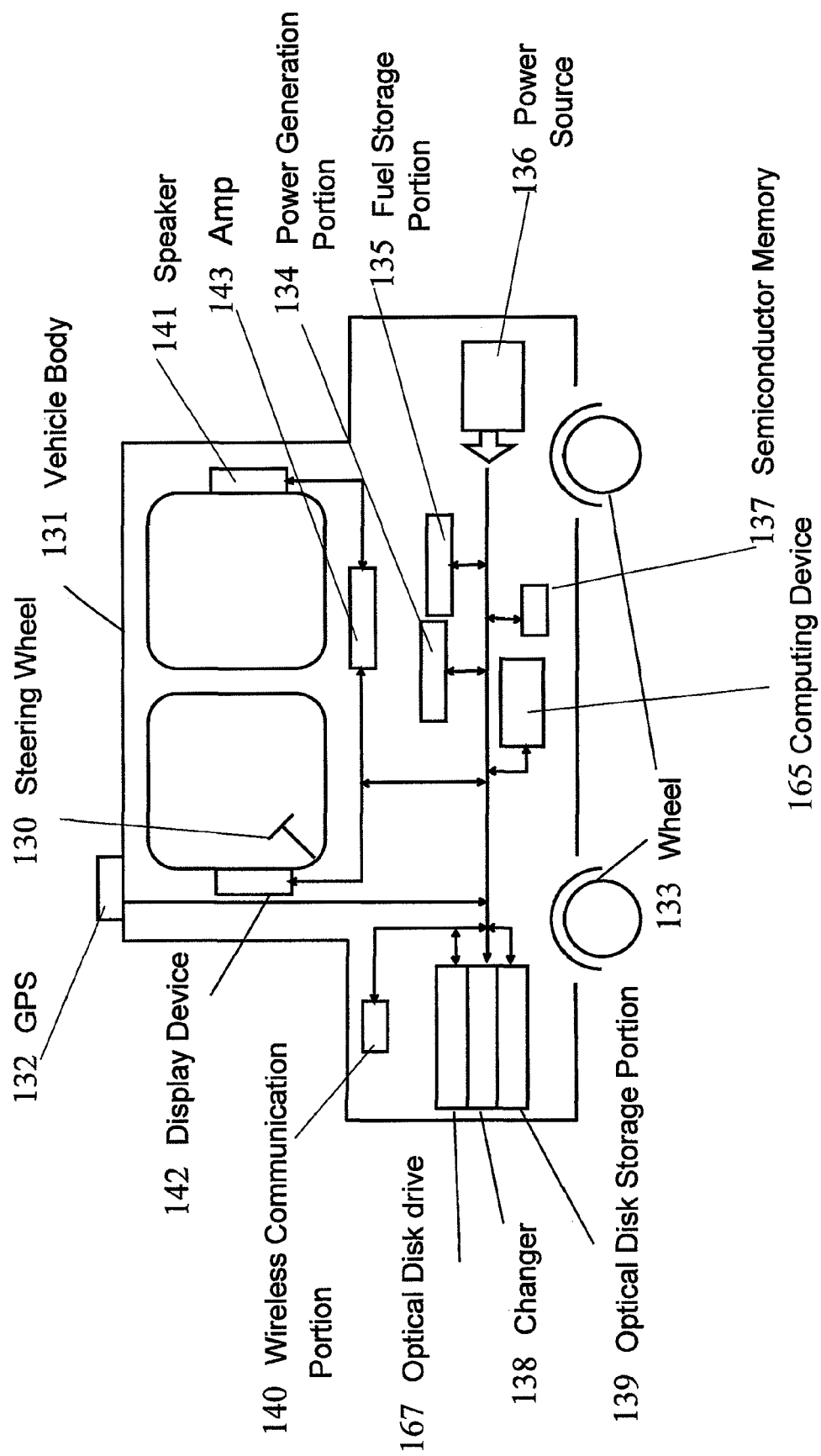
FIG. 30 is a diagram illustrating a configuration of a vehicle in a sixteenth embodiment according to the features.

A sixteenth embodiment shall be described with reference to FIG. 30. The optical disk drive 167 shown in FIG. 30 is the optical disk drive described in the eleventh or twelfth embodiments 131 is a vehicle body in which this optical disk drive 167 is included, and 134 is a power generation portion that generates power for moving the vehicle body 131. Furthermore, the configuration includes a fuel storage portion 135 that stores fuel to be supplied to the power generation portion 134 and/or a power source 136. Including the optical disk drive 167 of the present application in a vehicle body in this manner makes it possible to realize an effect in which it is possible to obtain information from or record information to a variety of types of optical disks in a stable manner while in moving in the vehicle body. Furthermore, in the case of a train, an automobile, or the like, wheels 133, for driving, are also included. Also, in the case of an automobile, a steering wheel, for changing directions, is included.

Including a changer 138, an optical disk storage portion 139, and the like make it possible to utilize many optical disks with ease. Video information can be reproduced from the optical disk by including a processing device 165 that processes information obtained from the optical disk and converts the data into images, a semiconductor memory 137 that temporarily stores information, a display device 142, and so on. Furthermore, including an amp 143 and a speaker 141 makes it possible to reproduce sound, music, and so on from the optical disk. Also, including a positional sensor such as a GPS 132 makes it possible to obtain the current position, direction of travel, and so on along with map information reproduced from the optical disk as an image displayed in a display device 142, audio emitted from the speaker 141, and so on. Furthermore, including a wireless communication portion 140 makes it possible to obtain and utilize information from the exterior to complement the information from the optical disk.

Although the output device 362, liquid crystal monitor 320, and so on have been illustrated in FIGS. 27 to 29 and described in the aforementioned thirteenth to fifteenth embodiments. It goes without saying that the configuration may instead include an output terminal, without the output device 362, liquid crystal monitor 320 and so on, which may be in the form of a product sold separately. Furthermore, although an input device is not shown in FIGS. 15 and 16, a product form that includes an input device such as a keyboard, touch panel, mouse, remote controller, or the like is also possible. Conversely, the abovementioned thirteenth through fifteenth embodiments may instead include only an input terminal, and the input device may be sold separately.

3.17. Effects

An optical disk according to the abovementioned features can be reproduced in both a first-type optical disk reproduction device and a second-type optical disk reproduction device; furthermore, an optical disk drive according to the abovementioned features is capable of quickly reproducing many types of optical disks, including a hybrid disk including first-type optical disk layers and second-type optical disk layers. These can be applied in all systems that can store information, such as computers, optical disk players, optical disk recorders, car navigation systems, editing systems, data servers, A/V components, vehicles, and so on.

As described thus far, the present invention provides an information recording medium compliant with plural differing format specifications, or in other words, an information recording medium that has compatibility between such different format specifications, as well as an information supply system therefor, and an optical information device that reproduces and records from and to the information recording medium.

What is claimed is:

1. An optical disk configured to allow a laser beam to enter and reproduce information, comprising:
   a first-type information recording layer provided at a distance in a range of 0.06 mm to 0.11 mm from a surface of the optical disk;
   a second-type information recording layer provided at a distance in a range of 0.54 mm to 0.65 mm from the surface of the optical disk; and
   a label layer provided between the first-type information recording layer and the second-type information recording layer, the label layer having the same area as the first-type information recording layer and the second-type information recording layer in a radial direction of the optical disk.

2. The optical disk according to claim 1, wherein blue light transmittance of the first-type information recording layer or the second-type information recording layer is lower than transmittance of visible light other than the blue light.

3. An optical information device, comprising:
   an optical head device, the optical head device including
      a blue light source,
      a red light source,
      a light collection optical system configured to converge light emitted from the blue light source onto a first-type information recording layer of an optical disk that is provided at a distance in a range of 0.06 mm to 0.11 mm from a surface of the optical disk, and converge light emitted from the red light source onto a second-type information recording layer of the optical disk that is provided at a distance in a range of 0.54 mm to 0.65 mm from the surface of the optical disk, and
      a light detector configured to receive light reflected by the first-type information recording layer and/or the second-type information recording layer of the optical disk and perform photoelectric conversion converting the received light into an electric signal;
   a motor that rotates the optical disk; and
   an electric circuit configured and arranged to receive the electric signal from the optical head device, and control and drive the motor, the light collection optical system, and/or the light sources based on the signal,
   wherein the optical information device reproduces information from an optical disk having both of the first-type information recording layer and the second-type information recording layer,
   the blue light source of the optical head device emits light upon an instruction for optical disk reproduction being outputted from the electric circuit,
   the distance from the surface of the optical disk to an adjacent recording information layer is measured,
   when it is determined that a reflective layer is present at a distance in the range of 0.06 mm to 0.11 mm from the surface of the optical disk, the reflective layer is determined to be the first-type information recording layer, a focus servo is applied to the first-type information recording layer, and reproduction of the first-type information recording layer is commenced,
   when it is determined that a reflective layer is not present at the distance in the range of 0.06 mm to 0.11 mm from the surface of the optical disk, the red light source is switched from the blue light source and emits light, and the distance from the surface of the optical disk to an adjacent recording layer is measured by the emission of the light from the red light source that has been switched from the blue light source, and
   when it is determined that a reflective layer is present at a distance in the range of 0.54 mm to 0.65 mm from the surface of the optical disk based on the light emitted from the red light source that has been switched from the blue light source, the reflective layer is determined to be the second-type information recording layer, a focus servo is applied to the second-type information recording layer, and reproduction of the second-type information recording layer is commenced.

4. An information reproduction method executed by an optical information device comprising:
   an optical head device which includes
      a blue light source,
      a red light source,
      a light collection optical system configured to converge light emitted from the blue light source onto a first-type information recording layer of an optical disk that is provided at a distance in a range of 0.06 mm to 0.11 mm from a surface of the optical disk, and converge light emitted from the red light source onto a second-type information recording layer of the optical disk that is provided at a distance in a range of 0.54 mm to 0.65 mm from the surface of the optical disk, and
      a light detector configured to receive light reflected by the first-type information recording layer and/or the second-type information recording layer of the optical disk and perform photoelectric conversion converting the received light into an electric signal;
   a motor that rotates the optical disk; and
   an electric circuit configured and arranged to receive the electric signal from the optical head device, and control and drive the motor, the light collection optical system, and/or the light sources based on the signal,
   wherein the optical information device reproduces information from an optical disk having both of the first-type information recording layer and the second-type information recording layer, said method comprising:
   emitting light from the blue light source of the optical head device upon an instruction for optical disk reproduction being outputted from the electric circuit;
   measuring the distance from the surface of the optical disk to an adjacent recording information layer;
   when it is determined that a reflective layer is present at a distance in the range of 0.06 mm to 0.11 mm from the surface of the optical disk, determining that the reflective layer is the first-type information recording layer, applying a focus servo to the first-type information recording layer, and commencing reproduction of the first-type information recording layer;

when it is determined that a reflective layer is not present at the distance in the range of 0.06 mm to 0.11 mm from the surface of the optical disk, switching from the blue light source to the red light source such that the red light source emits light, and measuring the distance from the surface of the optical disk to an adjacent recording layer; and when it is determined that a reflective layer is present at a distance in the range of 0.54 mm to 0.65 mm from the surface of the optical disk based on the light emitted from the red light source that has been switched from the blue light source, determining that the reflective layer is the second-type information recording layer, applying a focus servo to the second-type information recording layer, and commencing reproduction of the second-type information recording layer.

5. A computer comprising:

the optical information device according to claim 3;

an input device for inputting information;

a computation device that performs computation based on information inputted from the input device, or information reproduced by the optical information device; and an output device that displays or outputs the information inputted from the input device, the information reproduced by the optical information device, or results of computation performed by the computation device.

6. An optical disk player comprising:

the optical information device according to claim 3; and a data-to-image decoder that converts a data signal obtained from the optical information device into an image.

7. A car navigation system comprising:

the optical information device according to claim 3;

a data-to-image decoder that converts a data signal obtained from the optical information device into an image; and a positional sensor.

8. An optical disk recorder comprising:

the optical information device according to claim 3; and an image-to-data encoder that converts image data into data to be recorded by the optical information device.

9. A vehicle comprising:

the optical information device according to claim 3;

a vehicle body in which the optical information device is installed; and a power generation portion that generates power to move the vehicle body.

\* \* \* \* \*